US012699311B2

(12) United States Patent
Kadotani et al.

(10) Patent No.: US 12,699,311 B2
(45) Date of Patent: Aug. 4, 2026

(54) TIMING OF PROJECTION DISPLAY

(71) Applicant: SEIKO EPSON CORPORATION, Tokyo (JP)

(72) Inventors: Norikazu Kadotani, Azumino (JP); Takahiro Miyata, Matsumoto (JP)

(73) Assignee: SEIKO EPSON CORPORATION, Tokyo (JP)

( * ) Notice: Subject to any disclaimer, the term of this patent is extended or adjusted under 35 U.S.C. 154(b) by 452 days.

(21) Appl. No.: 18/192,823

(22) Filed: Mar. 30, 2023

(65) Prior Publication Data

US 2023/0314922 A1 Oct. 5, 2023

(30) Foreign Application Priority Data

Mar. 30, 2022 (JP) ................................ 2022-055403

(51) Int. Cl.
*G03B 21/20* (2006.01)
*G02F 1/13* (2006.01)
*G03B 21/16* (2006.01)

(52) U.S. Cl.
CPC ............. *G03B 21/204* (2013.01); *G02F 1/13* (2013.01); *G03B 21/16* (2013.01)

(58) Field of Classification Search
CPC .... G03B 21/204; G03B 21/16; G03B 21/006; G03B 21/20; G03B 21/208; G02F 1/13
USPC ........................................................ 353/31
See application file for complete search history.

(56) References Cited

U.S. PATENT DOCUMENTS

| | | | |
|---|---|---|---|
| 2015/0253654 A1 | 9/2015 | Hu et al. | |
| 2016/0170199 A1* | 6/2016 | Inoue ................... | H04N 9/3158 |
| | | | 353/31 |
| 2016/0241821 A1* | 8/2016 | Kuroi ................... | H04N 9/3111 |
| 2020/0186762 A1 | 6/2020 | Takahashi et al. | |
| 2022/0260899 A1 | 8/2022 | Yagi | |

FOREIGN PATENT DOCUMENTS

| | | | | | |
|---|---|---|---|---|---|
| CN | 109844636 A | | 6/2019 | | |
| CN | 113970873 A | | 1/2022 | | |
| JP | 2006086098 A | * | 3/2006 | ............. | G03B 21/14 |
| JP | 2007-199349 A | | 8/2007 | | |
| JP | 2007-304395 A | | 11/2007 | | |
| JP | 2013-041015 A | | 2/2013 | | |
| JP | 2021-026089 A | | 2/2021 | | |
| JP | 2021-179500 A | | 11/2021 | | |

* cited by examiner

*Primary Examiner* — Magda Cruz
(74) *Attorney, Agent, or Firm* — Dority & Manning, P.A

(57) ABSTRACT

A projector according to the present disclosure includes: a light source device configured to output blue light and fluorescence in time series; a wavelength selection element configured to transmit or reflect the blue light, separate the fluorescence into different colored light, transmit light of one color of the different colored light, and reflect the other colored light; a first liquid crystal panel configured to receive the blue light and the light of one color and output blue image light and image light of one color; a second liquid crystal panel configured to receive the other colored light and output image light of another color; an optical element configured to output the blue image light, the image light of the one color, and the image light of the other color to a common optical path; and a projection optical system.

20 Claims, 25 Drawing Sheets

TIMING OF PROJECTION DISPLAY

The present application is based on, and claims priority from JP Application Serial Number 2022-055403, filed Mar. 30, 2022, the disclosure of which is hereby incorporated by reference herein in its entirety.

BACKGROUND

1. Technical Field

The present disclosure relates to a projector.

2. Related Art

In a projector, light of different colors emitted from a light source is modulated in accordance with image information by an optical modulator, light of a plurality of colors after modulation is synthesized, and the obtained light is projected onto a screen by a projection lens, thereby displaying an image on the screen. For example, in a projector disclosed in JP-A-2007-199349, a dichroic mirror transmits blue light and red light from white light emitted from a lamp light source, and reflects green light. In the projector disclosed in JP-A-2007-199349, the blue light and the red light are incident on a common liquid crystal panel via a polarization switching panel, the green light is incident on a liquid crystal panel different from the above-described liquid crystal panel, and red image light, blue image light, and green image light emitted from the two liquid crystal panels are synthesized by a prism and projected.

For example, in a projector disclosed in JP-A-2007-304395, white light emitted from a lamp light source transmits through, in a time division manner, a color filter configured to transmit red and blue light and a color filter configured to transmit cyan and green light, and the red and blue light and the cyan and green light are incident on different liquid crystal panels. In the projector disclosed in JP-A-2007-304395, driving of the two color filters are synchronized with image data on two liquid crystal panels, and red image light and blue image light, and cyan image light and green image light are projected in a time division manner.

In the projector disclosed in JP-A-2007-199349 described above, since the polarization switching panel is required, the cost is increased, and an adjustment member and a holding member are complicated in order to dispose the polarization switching panel and the liquid crystal panel at appropriate positions. In the projector disclosed in JP-A-2007-304395 described above, a device for controlling the movement of the color filters is required in order to transmit the red light, the blue light, the cyan light, and the green light in a time division manner, and the structure of the entire device is complicated. In the projector disclosed in JP-A-2007-304395, since the amount of light after transmitting through the color filters is reduced, the efficiency of image light projected onto the screen is lowered consequently as compared with a case where the color filter is not used.

SUMMARY

In order to solve the above problems, a projector according to an aspect of the present disclosure includes: a light source device including a plurality of light emitting elements configured to output blue light and a wavelength conversion element configured to perform fluorescence conversion on the blue light output by the light emitting elements to output fluorescence, and configured to output the blue light and the fluorescence in time series; a wavelength selection element configured to transmit or reflect the blue light, separate the fluorescence into different colored light, transmit light of one color of the different colored light, and reflect the other colored light; a first liquid crystal panel configured to receive the blue light and the light of one color and output blue image light and image light of one color; a second liquid crystal panel configured to receive the other colored light and output image light of another color; an optical element configured to output the blue image light, the image light of the one color, and the image light of the other color to a common optical path; and a projection optical system configured to project the blue image light, the image light of the one color, and the image light of the other color.

BRIEF DESCRIPTION OF THE DRAWINGS

Figure 1:
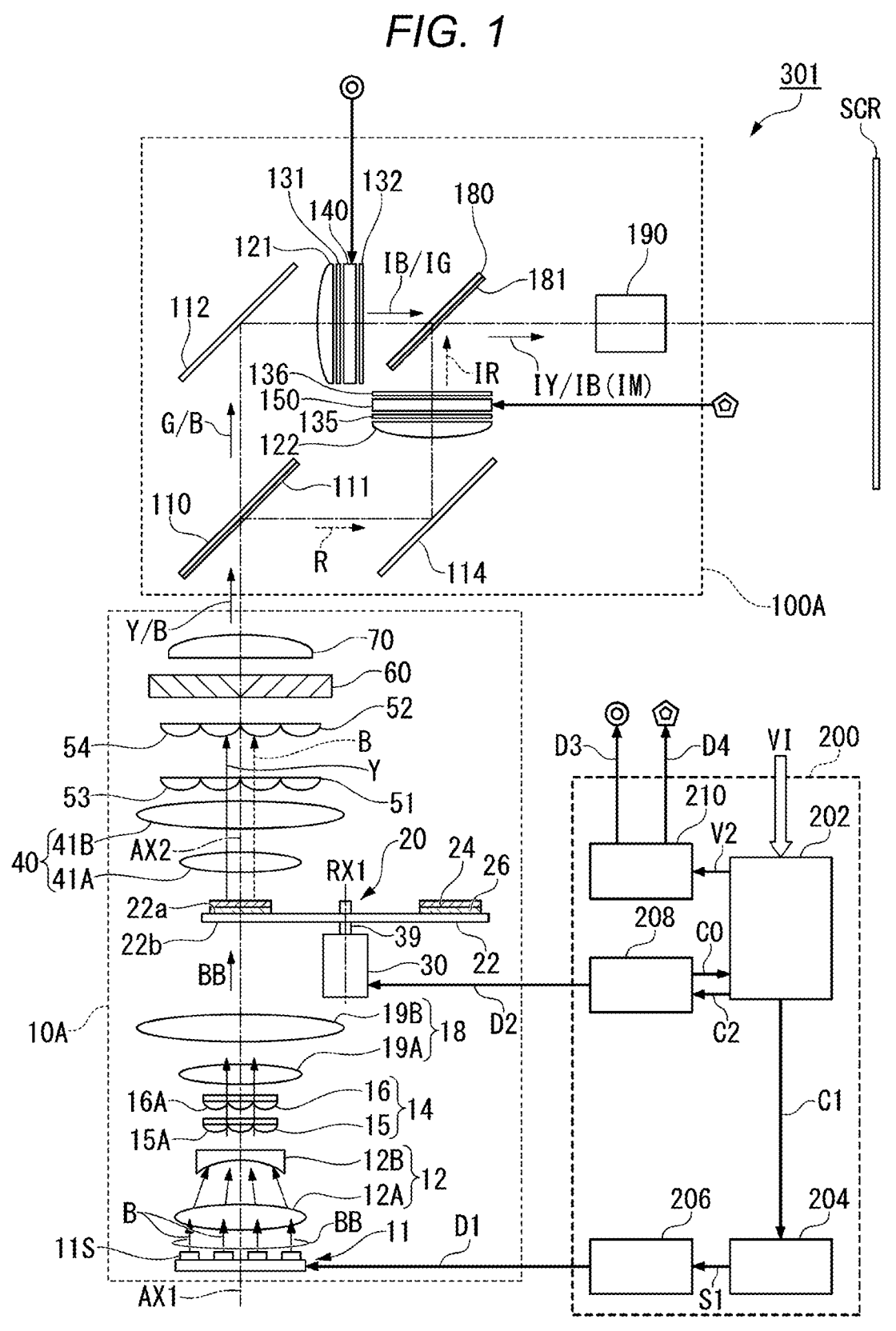

FIG. 1 is a configuration diagram of a projector according to a first embodiment.

FIG. 11 is a block diagram of the projector in FIG. 1.

FIG. 18 is a configuration diagram of a modification of an image light generation device of the projector in FIG. 17.

FIG. 20 is a block diagram of the projector in FIG. 17.

FIG. 21 is a configuration diagram of a projector according to a third embodiment.

DESCRIPTION OF EXEMPLARY EMBODIMENTS

Figures 2, 3:
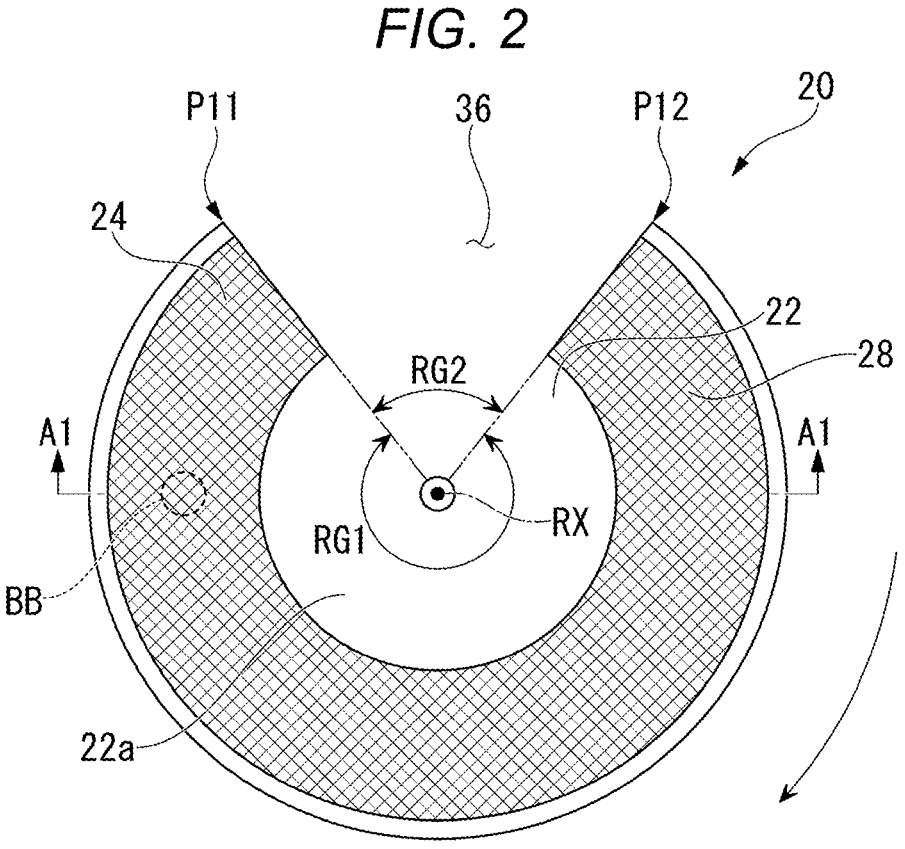
FIG. 2 is a plan view of a rotary fluorescent plate of a light source device provided in the projector in FIG. 1.
FIG. 3 is a cross-sectional view of the rotary fluorescent plate in FIG. 2.

In the drawings below, the scale of dimensions may be changed according to components in order to make the components easy to see.

First Embodiment

Hereinafter, a first embodiment of the present disclosure will be described with reference to FIGS. 1 to 16.
Projector
FIG. 1 is a schematic diagram illustrating a configuration of a projector 301 according to the first embodiment. The projector 301 is an image display device using a liquid crystal panel as an optical modulator.

As illustrated in FIG. 1, the projector 301 includes a light source device 10A, an image light generation device 100A, and a control device 200. The projector 301 is a device that projects image light corresponding to an image signal V1 received from an external image input device (not illustrated) toward a screen SCR and displays an enlarged image on the screen SCR. The image input device (not illustrated) is, for example, a personal computer.

The light source device 10A includes a light source 11, an afocal optical system 12, a homogenizer optical system 14, a condensing optical system 18, a rotary fluorescent plate 20, a collimating optical system 40, a first lens array 51, a second lens array 52, a polarization conversion element 60, and a superimposing lens 70.

The light source 11 includes a plurality of light emitting elements 11S, and outputs a blue light beam BB that is blue light. The light emitting element 11S emits blue light B. A peak wavelength of an emission intensity of the blue light B is included in a wavelength band of 455 nm to 465 nm, for example. The light emitting element 11S is, for example, a laser diode (LD) that is a semiconductor laser capable of emitting the blue light B. The LD has a higher luminance, a higher output and a longer life as compared with a lamp in the related art used as a light source in an image display device of a projector, and can efficiently generate fluorescence from a fluorescent layer 24 described later.

The plurality of light emitting elements 11S are arranged in an array form or a matrix form at appropriate intervals from each other in a plane orthogonal to an optical axis AX1 of the blue light beam BB. The blue light B emitted from the plurality of light emitting elements 11S is collected along the optical axis AX1 to form the blue light beam BB.

The afocal optical system 12 includes, for example, a convex lens 12A and a concave lens 12B, and reduces a light beam diameter of the blue light beam BB output from the light source 11. Since the light beam diameter of the blue light beam BB is reduced by the afocal optical system 12, space saving and weight reduction of the condensing optical system 18 are achieved.

A collimator optical system (not illustrated) may be disposed on the optical axis AX1 between the light source 11 and the afocal optical system 12, and the blue light beam BB incident on the afocal optical system 12 may be collimated.

The homogenizer optical system 14 includes multi-lens arrays 15 and 16, and converts light intensity distribution of the blue light beam BB emitted from the afocal optical system 12 into a uniform distribution state. The homogenizer optical system 14 cooperates with the condensing optical system 18 to superimpose a plurality of narrow blue light beams emitted from a plurality of micro lenses 15A of the multi-lens array 15 on each other at the fluorescent layer 24 that is a wavelength conversion element to be described later.

Accordingly, the fluorescent layer 24 is irradiated with the blue light beam BB having a light intensity distribution of a top hat shape.

The multi-lens array 15 includes the plurality of micro lenses 15A that are arranged in a matrix form adjacent to each other in a plane orthogonal to the optical axis AX1. The multi-lens array 16 is disposed in front of the multi-lens array 15 in a traveling direction of the blue light beam BB, and includes a plurality of micro lenses 16A that are arranged in a matrix form adjacent to each other in a plane orthogonal to the optical axis AX1. The plurality of micro lenses 16A are arranged corresponding to the plurality of micro lenses 15A in a direction parallel to a plane orthogonal to the optical axis AX1, at positions overlapping the plurality of micro lenses 15A.

The condensing optical system 18 is disposed in an optical path of the blue light beam BB between the homogenizer optical system 14 and the rotary fluorescent plate 20, condenses the blue light beam BB emitted from the homogenizer optical system 14, and causes the condensed blue light beam BB to be incident on the fluorescent layer 24 of the rotary fluorescent plate 20. The condensing optical system 18 includes, for example, a first lens 19A and a second lens 19B. Each of the first lens 19A and the second lens 19B is, for example, a convex lens.

The condensing optical system 18 may include an aspheric lens (not illustrated) in order to sufficiently obtain the effect of making the light intensity distribution of the blue light beam BB uniform that is obtained by the homogenizer optical system 14.

FIG. 2 is a plan view of the rotary fluorescent plate 20. FIG. 3 is a cross-sectional view of the rotary fluorescent plate 20, and is a cross-sectional view taken along a line A1-A1 illustrated in FIG. 2.

As illustrated in FIGS. 1 to 3, the rotary fluorescent plate 20 includes a substrate 22, the fluorescent layer 24, a dichroic film 26, and a motor 30. As illustrated in FIG. 1, the rotary fluorescent plate 20 outputs yellow light Y including red light R and green light G toward a side opposite to an incident side of the blue light beam BB.

As illustrated in FIGS. 1 to 3, the motor 30 rotates the substrate 22 in a circumferential direction centering on a rotation axis RX. The substrate 22 is formed of a plate having an angular range RG1 that remains after removing a fan-shaped plate corresponding to an angular range RG2 in the circumferential direction from a circular plate having the rotation axis RX as a center.

The fluorescent layer 24 is provided at a front surface 22a of the substrate 22, and is provided in the angular range RG1 in the circumferential direction centering on the rotation axis RX. A through hole (not illustrated) through which a shaft member 39 of the motor 30 (not illustrated) can be inserted may be formed at a center of the substrate 22, and the shaft member 39 of the motor 30 may be inserted through the through hole. The front surface 22a is a surface opposite to a back surface 22b on which the blue light beam BB from the homogenizer optical system 14 is incident with respect to the substrate 22. A space is present in the angular range RG2 other than the angular range RG1 in the circumferential direction centering on the rotation axis RX. The substrate 22 is made of a material that transmits the blue light beam BB. Examples of the material of the substrate 22 include quartz glass, quartz crystal, sapphire, optical glass, and transparent resin.

The fluorescent layer 24 performs fluorescence conversion on the blue light beam BB incident as excitation light, and emits the yellow light Y generated by the fluorescence conversion. The fluorescent layer 24 is, for example, a layer containing $(Y, Gd)_3(Al, Ga)_5O_{12}$:Ce that is a YAG-based fluorescent body.

The dichroic film 26 is disposed between the substrate 22 and the fluorescent layer 24 in a thickness direction of the substrate 22 and the fluorescent layer 24 along the optical axis AX1. The dichroic film 26 transmits incident blue light and reflects yellow light that is fluorescence.

The rotation axis RX of the substrate 22 is located at a position different from the optical axis AX1 in a plane orthogonal to the optical axis AX1 of the blue light beam BB output from the homogenizer optical system 14.

An axis of the motor 30 overlaps the rotation axis RX in a plane orthogonal to the optical axis AX1. The substrate 22 and the motor 30 are disposed with respect to the homogenizer optical system 14 such that the blue light beam BB emitted from the homogenizer optical system 14 can be radiated to the fluorescent layer 24 in a region between the rotation axis RX and an outer peripheral edge of the substrate 22 in a radial direction centering on the rotation axis RX.

The substrate 22 includes, at the front surface 22a thereof, a fluorescence output region 28 in which the fluorescent layer 24 is provided. The fluorescence output region 28 is provided in the angular range RG1 of the front surface 22a in the circumferential direction centering on the rotation axis RX, and is provided in a region including at least a radiation region of the blue light beam BB between the outer peripheral edge and a center or an inner peripheral edge of the substrate 22 in the radial direction centering on the rotation axis RX.

A state in which the radiation region of the blue light beam BB overlaps the substrate 22, the fluorescent layer 24, and the dichroic film 26 in the angular range RG1 in the circumferential direction centering on the rotation axis RX when the substrate 22 is rotated about the rotation axis RX by the motor 30, as viewed from a direction parallel to the optical axis AX1, is defined as a first state. In addition, a state in which the radiation region of the blue light beam BB passes through the space of the angular range RG2 in the circumferential direction centering on the rotation axis RX and does not overlap the fluorescent layer 24 or the dichroic film 26 when the substrate 22 is rotated about the rotation axis RX by the motor 30, as viewed from the direction parallel to the optical axis AX1, is defined as a second state.

In the first state, the blue light beam BB output from the homogenizer optical system 14 is incident on the substrate 22 from the back surface 22b, transmits through the substrate 22 and the dichroic film 26, and is incident on the fluorescent layer 24. The fluorescent layer 24 is excited by the incident blue light beam BB, converts a wavelength of the blue light beam BB into that of the yellow light Y, and emits the yellow light Y to a side facing the dichroic film 26 and a side opposite to the side facing the dichroic film 26 in the thickness direction of the fluorescent layer 24.

The yellow light Y emitted from the fluorescent layer 24 toward the dichroic film 26 is reflected by the dichroic film 26, transmits through the fluorescent layer 24, and is emitted from the fluorescent layer 24 to the side opposite to the side facing the dichroic film 26.

That is, in the first state, as illustrated in FIG. 1, the yellow light Y is output from the rotary fluorescent plate 20 to the side opposite to the incident side of the blue light beam BB with respect to the rotary fluorescent plate 20.

It is assumed that, by adjusting conditions including a bubble fraction of the material of the fluorescent layer 24, the whole blue light beam BB incident on the fluorescent layer 24 is subjected to wavelength conversion and no blue light beam BB transmits through the fluorescent layer 24.

As will be described later, in order to favorably output image light IM and prevent the occurrence of color mixture in an image projected from a projection optical system 190, it is necessary to emit only one of the yellow light Y and the blue light B from the rotary fluorescent plate 20.

Therefore, when there is a possibility that a part of the blue light of the blue light beam BB incident on the fluorescent layer 24 transmits through the fluorescent layer 24 without being subjected to fluorescence conversion, it is preferable to provide a dichroic film (not illustrated), which reflects the incident blue light and transmits the yellow light, at a surface of the fluorescent layer 24 on a side opposite to a bottom surface of the fluorescent layer 24 in contact with the dichroic film 26.

As a result, in the first state, only the yellow light Y is output to the side opposite to the incident side of the blue light beam BB with respect to the rotary fluorescent plate 20 as described above.

Although not illustrated, in the second state, the blue light beam BB passes through the space of the angular range RG2 in the circumferential direction centering on the rotation axis RX. In the second state, it is considered that only the blue light beam BB is output to the side opposite to the incident side of the blue light beam BB with respect to the rotary fluorescent plate 20.

In the following description, the blue light beam BB emitted from the light source 11 and the blue light beam BB output from the rotary fluorescent plate 20 in the second state may be referred to as the blue light B.

As illustrated in FIG. 1, the collimating optical system 40 includes a first lens 41A and a second lens 41B, and collimates the yellow light Y or the blue light B output from the rotary fluorescent plate 20. Each of the first lens 41A and the second lens 41B is, for example, a convex lens.

The first lens array 51 includes a plurality of micro lenses 53, and the plurality of micro lenses 53 split the yellow light Y or the blue light B incident from the collimating optical system 40 into partial light beams of the same number as the number of the micro lenses 53. The plurality of micro lenses 53 are arranged in a matrix form without gaps therebetween in a plane orthogonal to an optical axis AX2 of the yellow light Y or the blue light B output from the rotary fluorescent plate 20.

The second lens array 52 includes a plurality of micro lenses 54, and causes, together with the superimposing lens 70, a plurality of partial light beams of the yellow light Y or the blue light B emitted from the first lens array 51 to form an image on an image forming region 142 of a first liquid crystal panel 140 and an image forming region 152 of a second liquid crystal panel 150 of the image light generation device 100A described later.

The plurality of micro lenses 54 are arranged in a matrix form without gaps therebetween in a plane orthogonal to the optical axis AX2. The plurality of micro lenses 54 correspond to the plurality of micro lenses 53 in a direction parallel to a plane orthogonal to the optical axis AX2, and overlap the plurality of micro lenses 53.

The polarization conversion element 60 converts polarized light of the plurality of partial light beams emitted from the first lens array 51 into linearly polarized light in a predetermined polarization direction. The linearly polarized light in the predetermined polarization direction is S-polarized light or P-polarized light. The polarization conversion element 60 includes a polarization separation layer, a reflecting layer, and a retardation plate. The polarization separation layer transmits a predetermined linearly polarized light component among polarized light components included in the yellow light Y or the blue light B output from the rotary fluorescent plate 20, and reflects, in a direction orthogonal to the optical axis AX2, another linearly polarized light component whose polarization direction is 90° with respect to the predetermined polarization direction among the polarized light components included in the yellow light Y or the blue light B. The reflecting layer reflects, in a direction parallel to the optical axis AX2, the other linearly polarized light component reflected by the polarization separation layer. The retardation plate converts the other linearly polarized light component reflected by the reflecting layer into the predetermined linearly polarized light component. Although reference signs are not assigned in FIG. 1, the polarization separation layer, the reflecting layer, and the retardation plate of the polarization conversion element 60 are illustrated in a simplified manner.

The superimposing lens 70 condenses a plurality of partial light beams of the yellow light Y or the blue light B emitted from the polarization conversion element 60 and superimposes the condensed light on the image forming region 142 of the first liquid crystal panel 140 and the image forming region 152 of the second liquid crystal panel 150. The first lens array 51, the second lens array 52, and the superimposing lens 70 constitute an integrator optical system that brings the light intensity distribution of the yellow light Y or the blue light B output from the rotary fluorescent plate 20 into a uniform state. The blue light B or the yellow light Y is output from the light source device 10A having the above-described configuration in time series according to the angular ranges RG1 and RG2.

The image light generation device 100A is disposed in the optical path of the blue light B or the yellow light Y output from the light source device 10A. The yellow light Y includes the red light R and the green light G that are different colored light. The image light generation device 100A includes a dichroic mirror 110, reflecting mirrors 112 and 114, condenser lenses 121 and 122, first polarizing plates 131 and 132, second polarizing plates 135 and 136, the first liquid crystal panel 140, the second liquid crystal panel 150, a dichroic mirror 180 that is an optical element, and the projection optical system 190.

Of the incident blue light B or yellow light Y, the dichroic mirror 110, which is a wavelength selection element, transmits the blue light B or the green light G and reflects the red light R. A reflection dichroic coat 111 is applied to a surface of a substrate of the dichroic mirror 110 on an incident side of the blue light B or the yellow light Y. The blue light B or the yellow light Y output from the light source device 10A is incident on the dichroic mirror 110. Of the blue light B or the yellow light Y, the blue light B or the green light G transmits through the dichroic mirror 110, and the red light R is reflected by the dichroic mirror 110 in a direction different from that of the blue light B or the green light G. That is, the blue light B or the yellow light Y output from the light source device 10A is branched into the blue light B or the green light G and the red light R by the dichroic mirror 110.

The reflecting mirror 112 is disposed in an optical path of the blue light B or the green light G transmitted through the dichroic mirror 110, and reflects the incident blue light B or the green light G toward the image forming region of the first liquid crystal panel 140. The reflecting mirror 114 is disposed in an optical path of the red light R reflected by the dichroic mirror 110, and reflects the incident red light R toward the image forming region of the second liquid crystal panel 150.

The optical path of the blue light B or the green light G reflected by the reflecting mirror 112 and the optical path of the red light R reflected by the reflecting mirror 114 intersect at a predetermined position. The dichroic mirror 180 is disposed at the predetermined position described above. The condenser lens 121, the first polarizing plate 131, the first liquid crystal panel 140, and the first polarizing plate 132 are sequentially disposed in the optical path of the blue light B or the green light G between the reflecting mirror 112 and the dichroic mirror 180. The condenser lens 122, the second polarizing plate 135, the second liquid crystal panel 150, and the second polarizing plate 136 are sequentially disposed in the optical path of the red light R between the reflecting mirror 114 and the dichroic mirror 180.

The condenser lens 121 condenses the blue light B or the green light G reflected by the reflecting mirror 112 on the image forming region of the first liquid crystal panel 140. The first polarizing plate 131 adjusts a polarization direction of the blue light B or the green light G emitted from the condenser lens 121 to a direction appropriate for generating image light at the first liquid crystal panel 140.

The first liquid crystal panel 140 modulates the blue light B or green light G emitted from the condenser lens 121 and incident thereon in accordance with an image signal related to blue or an image signal related to green received from the control device 200, and generates and outputs blue image light IB or green image light IG. The generation of the image light IB and IG will be described in detail later.

The first liquid crystal panel 140 is, for example, a transmissive liquid crystal optical modulator implemented by enclosing liquid crystal, which is an electro-optical substance, between a pair of transparent glass substrates and sealing the pair of transparent glass substrates. The first liquid crystal panel 140 includes, for example, a polysilicon thin film transistor (TFT) as a switching element. The polarization direction of the blue light B or the green light G emitted from the first polarizing plate 131 is modulated by a switching operation of the switching element provided in the first liquid crystal panel 140, whereby the blue image light IB corresponding to the image signal related to blue or the green image light IG corresponding to the image signal related to green is generated. The first polarizing plate 132 adjusts a polarization direction of the image light IB or the image light IG output from the first liquid crystal panel 140 to a desired direction.

The condenser lens 122 condenses the red light R reflected by the reflecting mirror 114 on the image forming region of the second liquid crystal panel 150. The second polarizing plate 135 adjusts a polarization direction of the red light R emitted from the condenser lens 122 to a direction appropriate for generating image light at the second liquid crystal panel 150.

The second liquid crystal panel 150 modulates the red light R emitted from the condenser lens 122 and incident thereon in accordance with an image signal related to red received from the outside, and generates and outputs red image light IR. The generation of the image light IR will be described in detail later. The second liquid crystal panel 150 is, for example, a transmissive liquid crystal optical modulator implemented similarly to the first liquid crystal panel 140, and includes a polysilicon TFT as a switching element. The polarization direction of the red light R emitted from the second polarizing plate 135 is modulated by a switching operation of the switching element provided in the second liquid crystal panel 150, whereby the red image light IR corresponding to the image signal related to red is generated. The second polarizing plate 136 adjusts the polarization direction of the image light IR output from the second liquid crystal panel 150 to a desired direction.

The dichroic mirror 180, which is an optical element, transmits the incident blue image light IB or green image light IG and reflects the red image light IR. A reflection dichroic coat 181 is applied to a surface of a substrate of the dichroic mirror 180 on an incident side of the red image light IR. The blue image light IB or the green image light IG emitted from the first polarizing plate 132 and the red image light IR emitted from the second polarizing plate 136 are incident on the dichroic mirror 180. The image light IB or the image light IG incident on the dichroic mirror 180 transmits through the dichroic mirror 180. The image light IR incident on the dichroic mirror 180 is reflected by the reflection dichroic coat 181 toward the same optical path as the image light IB or the image light IG. That is, the image light IG output from the first liquid crystal panel 140 and the image light IR output from the second liquid crystal panel 150 are synthesized by the dichroic mirror 180 to form the yellow image light IY. The dichroic mirror 180 outputs the image light IY and the image light IB to a common optical path in time series. In the following description, the image light IY or the image light IB may be collectively referred to as image light IM.

The projection optical system 190 is disposed in an optical path of the image light IM emitted from the dichroic mirror 180, and projects the incident image light IM toward the screen SCR in an enlarged manner to form an image on the screen SCR. The projection optical system 190 includes, for example, a plurality of convex lenses or concave lenses.

The control device 200 includes a signal processing device 202, a pulse width modulation (PWM) signal generation device 204, a light source drive device 206, a rotary fluorescent plate drive device 208, and a liquid crystal drive device 210. The control device 200 performs signal processing on an image signal V1 received from the outside, and controls the light source 11 of the light source device 10A, the motor 30 of the rotary fluorescent plate 20, and the first liquid crystal panel 140 and the second liquid crystal panel 150 of the image light generation device 100A by using information obtained by the signal processing. The control device 200 controls the amount of light of the blue light beam BB emitted from the light source 11 by performing PWM control on the light source 11. The control device 200 is implemented by, for example, a computer or an integrated circuit in which processing of each of the signal processing device 202, the PWM signal generation device 204, the light source drive device 206, the rotary fluorescent plate drive device 208, and the liquid crystal drive device 210 is incorporated as a program.

The signal processing device 202 performs signal processing on the image signal V1 received from the outside of the projector 301 by, for example, an image input device (not illustrated), and obtains information necessary for controlling the light source 11, the motor 30, the first liquid crystal panel 140, and the second liquid crystal panel 150.

The signal processing device 202 calculates a parameter indicating a representative value of brightness of an image to be displayed based on the image signal V1, and outputs a control signal C1 for controlling the light source 11 based on the calculated parameter. The signal processing device 202 performs expansion processing on the image signal V1 based on a parameter extracted from the image signal V1, and outputs the image signal subjected to the expansion processing as an image signal V2. For example, when a gradation of an image that can be displayed based on the image signal V1 is 255 gradations and the extracted parameter indicates the brightness of the 200th gradation, the image signal V1 is multiplied by a coefficient $\alpha=(255/200)$. By performing the expansion processing described above, it is possible to perform image display with high contrast by making full use of a dynamic range of each of the first liquid crystal panel 140 and the second liquid crystal panel 150.

The signal processing device 202 acquires a rotation detection signal C0 output from the rotary fluorescent plate drive device 208, and outputs a rotation control signal C2 for controlling the number of rotations of the motor 30. The rotation detection signal C0 is, for example, a detection signal indicating the number of rotations of the rotary fluorescent plate 20 about the rotation axis RX, that is, the number of rotations of the motor 30. In order to prevent an occurrence of flicker caused by rotationally driving the rotary fluorescent plate 20, the signal processing device 202 outputs the control signal C1 and the rotation control signal C2 for controlling a frequency at the time the light source 11 being PWM-controlled and the number of rotations of the rotary fluorescent plate 20 so that the PWM control frequency of the light source 11 and the number of rotations of the rotary fluorescent plate 20 satisfy a predetermined relationship. The predetermined relationship is, for example, a relationship in which the number of rotations of the rotary fluorescent plate 20 is an integral multiple of the frequency at the time the light source 11 being PWM-controlled.

The PWM signal generation device 204 determines a duty ratio of the light source 11 based on the control signal C1 output from the signal processing device 202, and generates a PWM signal S1 having the determined duty ratio. The duty ratio of the light source 11 represents a ratio between a light emission time and a light off time in a control cycle of the light source 11. For example, the PWM signal generation device 204 stores a data table (not illustrated) indicating a relationship between the amount of light of the blue light beam BB emitted from the light source 11 and the duty ratio. The PWM signal generation device 204 determines the duty ratio of the light source 11 according to the control signal C1 by using the data table.

The control cycle of the light source 11 is a cycle in which the light source 11 is PWM-controlled by the control device 200, and is a reciprocal of the PWM control frequency. The PWM control frequency is a frequency equal to or higher than a frame frequency of an image displayed on the screen SCR. The frame frequency of the image is, for example, 48 [Hz]. An upper limit of the frame frequency of the image is, for example, about several MHz. By setting the PWM control frequency to a frequency equal to or higher than the frame frequency, the occurrence of flicker is prevented when the light source 11 is PWM-controlled.

Based on the PWM signal S1 generated by the PWM signal generation device 204, the light source drive device 206 generates a drive signal D1 for driving the light source 11. The drive signal D1 generated by the light source drive device 206 is a pulse signal and is a signal supplied to the light emitting elements 11S of the light source 11. A frequency, a duty ratio, and a phase of the drive signal D1 are defined based on the PWM signal S1. A current value of the drive signal D1 is constant when a signal level of the PWM signal S1 is a high (H) level.

The rotary fluorescent plate drive device 208 detects the number of rotations of the motor 30 and outputs the detected number of rotations to the signal processing device 202 as the rotation detection signal C0. The rotary fluorescent plate drive device 208 generates, based on the rotation control signal C2 output from the signal processing device 202, a drive signal D2 for driving the motor 30 and outputs the drive signal D2 to the motor 30. As a result, the substrate 22 is rotated about the rotation axis RX at an optimum rotation speed ORS according to the rotation control signal C2.

Based on the image signal V1 subjected to the expansion processing by the signal processing device 202, the liquid crystal drive device 210 generates a drive signal D3 for driving the first liquid crystal panel 140 and a drive signal D4 for driving the second liquid crystal panel 150.

Figure 4:
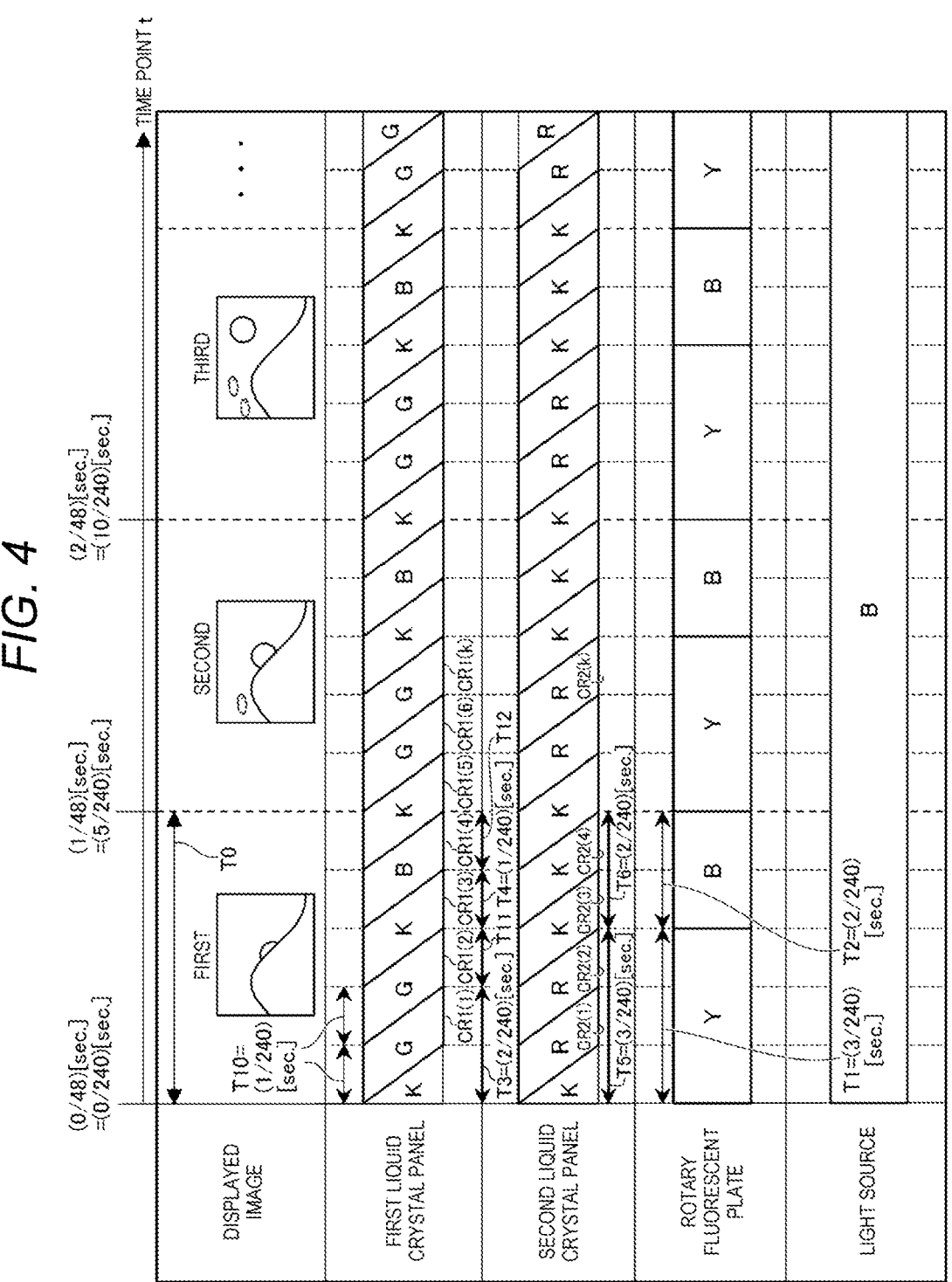
FIG. 4 is a timing chart illustrating signals used in the projector in FIG. 1 and blue light and yellow light emitted from the light source device.

Next, the control of the light source 11, the motor 30, the first liquid crystal panel 140, and the second liquid crystal panel 150 and the generation of the image light IB, IG, and IR by the control device 200 will be described. FIG. 4 is a timing chart of the blue light B or the yellow light Y emitted from the light source device 10A, the image light IG or the image light IB output from the first liquid crystal panel 140, and the image light IR output from the second liquid crystal panel 150 in the projector 301 according to the first embodiment. Here, it is assumed that a frame frequency of an image displayed from the projector 301 is set to 48 [Hz] as described above. The frame frequency in the projector 301 represents a so-called frame rate. The frame rate of the projector 301 is set to 48 [fps]. In addition, it is assumed that a drive frequency of each of the first liquid crystal panel 140 and the second liquid crystal panel 150 is set to 240 [Hz].

As illustrated in FIG. 4, a display period T0 necessary for displaying one image is $\frac{1}{48}$ [sec.] based on the frame frequency and the frame rate, and is $\frac{5}{240}$ [sec.] when converted in order to take a driving schedule of the first liquid crystal panel 140 and the second liquid crystal panel 150 into consideration. Within a time period in which the light source 11, the motor 30, the first liquid crystal panel 140, and the second liquid crystal panel 150 are controlled by the control device 200 and an image is displayed from the projector 301, the drive signal D1 is always at an H level and is supplied to each of the plurality of light emitting elements 11S of the light source 11.

That is, during displaying an image from the projector 301, the control device 200 constantly outputs the drive signal D1 to the light source 11 and causes the light source 11 to output the blue light B.

In order to display one image brightly and prevent a degradation in durability of the first liquid crystal panel 140, it is assumed that, in the display period T0, a display period T3 of the green image light IG in each pixel 144 of the first liquid crystal panel 140 is set to two times a display period T4 of the blue image light IB. That is, a ratio of the display period T3 to the display period T4 is 2:1. In order to sequentially display a plurality of images from the first image, the signal processing device 202 of the control device 200 calculates the optimum rotation speed ORS of the motor 30 for outputting the yellow light Y from the rotary fluorescent plate 20 in an output period T1 corresponding to T0×($\frac{3}{5}$) of the display period T0 of each image and outputting the blue light B from the rotary fluorescent plate 20 in an output period T2 corresponding to the remaining T0×($\frac{2}{5}$) after elapse of the output period T1. According to the setting of the frame frequency of the image, the drive frequency of each of the first liquid crystal panel 140 and the second liquid crystal panel 150, and the setting of the ratio between the display periods T3 and T4, T1=$\frac{3}{240}$ [sec.] and T2=$\frac{2}{240}$ [sec.].

When the rotation of the rotary fluorescent plate 20 is controlled by the control device 200, the blue light B or the yellow light Y is output from the light source device 10A of the projector 301 in time series. The signal processing device 202 outputs the optimum rotation speed ORS of the motor 30 to the rotary fluorescent plate drive device 208 as the rotation control signal C2. The drive signal D2 includes information on the optimum rotation speed ORS necessary for operating the motor 30. The calculation of the optimum rotation speed ORS will be described later.

In order to sequentially display a plurality of images from the first image, the liquid crystal drive device 210 of the control device 200 outputs the drive signal D3 to the first liquid crystal panel 140 and the drive signal D4 to the second liquid crystal panel 150 based on the image signal V1 subjected to the expansion processing performed by the signal processing device 202 for each image. The drive signal D3 causes the first liquid crystal panel 140 to output the green image light IG during the output period T1 in the display period T0 of each image. The drive signal D4 causes the second liquid crystal panel 150 to output the red image light IR during the output period T1 in the display period T0 of each image.

In addition, the drive signal D3 causes the first liquid crystal panel 140 to output the blue image light IB during the output period T2 in the display period T0 of each image. The drive signal D4 does not cause the second liquid crystal panel 150 to output any color of image light during the output period T2 in the display period T0 of each image.

Figure 5:
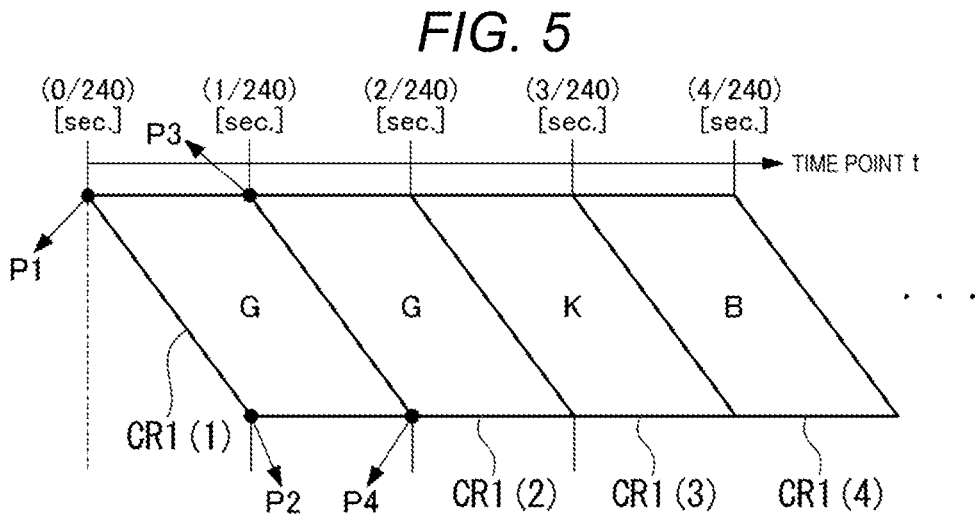
FIG. 5 is an enlarged view of a part of the timing chart of FIG. 4.
Figure 6:
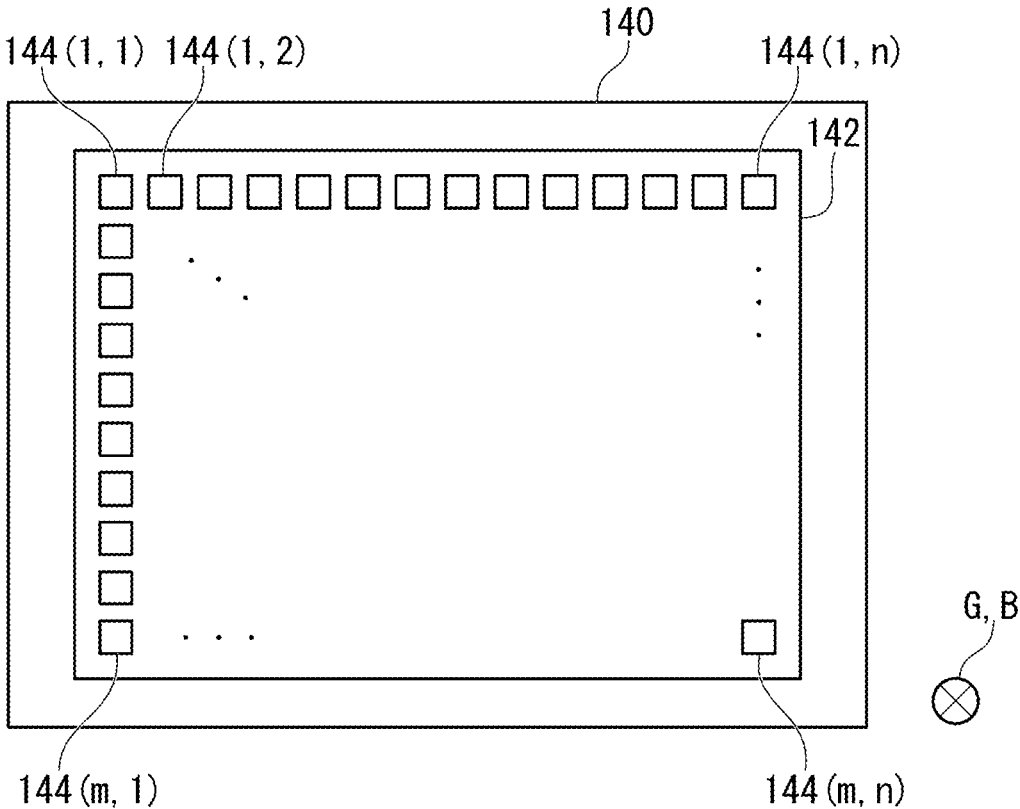
FIG. 6 is a front view of a first liquid crystal panel of the projector in FIG. 1.

FIG. 5 is an enlarged view of a part of the timing chart illustrated in FIG. 4. FIG. 6 is a front view of the first liquid crystal panel 140 as viewed from an incident side of the green light G and the blue light B. As illustrated in FIG. 6, a plurality of pixels 144 are arranged in the image forming region 142 of the first liquid crystal panel 140. The image forming region 142 is formed parallel to a plane orthogonal to the optical axis of the green light G or the blue light B incident on the first liquid crystal panel 140. The plurality of pixels 144 are arranged in m rows and n columns along a vertical direction and a transverse direction of the plane orthogonal to each other in the rectangular image forming region 142.

That is, the plurality of pixels 144 are arranged in a matrix form on a plane orthogonal to the optical axis of the green light G or the blue light B. The total number of pixels 144 is m×n. In the following description and drawings, the pixel 144 in the i-th row and the j-th column may be referred to as the pixel 144 (i, j).

As illustrated in FIGS. 4 to 6, in the first liquid crystal panel 140 that receives the drive signal D3, an electric signal corresponding to a light emission intensity of the pixel 144 (1, 1) of the green image light IG of the first image is written to the pixel 144 (1, 1) at a time point of t=0/240 [sec.]. Each of control states CR1(k) shown in FIGS. 4 and 5 represents one flow serving as a unit in controlling the plurality of pixels 144 of the first liquid crystal panel 140. The k is any natural number, and is a number indicating a sequence of the flow.

A letter in a frame of the control state CR1(k) represents a predetermined color of green (G) or blue (B), which is a color of image light output from the first liquid crystal panel 140, or black (K) indicating that no image light is displayed. A start point P1 of the control state CR1(k) indicates that an electric signal corresponding to an image of the predetermined color indicated by the letter in the frame of the control state CR1(k) is written to the first pixel 144 (1, 1) of the first liquid crystal panel 140.

A start point P2 of the control state CR1(k) indicates that an electric signal corresponding to the image light of the predetermined color is written to the pixel 144 (m, 1) of the last line of the first liquid crystal panel 140. In the control state CR1(k) of the first image, subsequently to the first pixel 144 (1, 1), electric signals corresponding to light emission intensities of respective pixels of the green image light IG of the first image are sequentially written to the pixel 144 (1, 2), the pixel 144 (1, 3), . . . , and the pixel 144 (m, n).

In each of the pixels 144, the written electric signal is held at least during a holding period T10, and the image light of the predetermined color is emitted according to the electric signal. The holding period T10 represents a unit time in which the electric signal is held, and is, for example, ⅟240 [sec.].

At a time point when the electric signals corresponding to the image light of the predetermined color are written to the pixels 144 (1, 1) to 144 (1, n), that is, a time point when the holding period T10=⅟240 [sec.] elapses from a time point of the start point P1, the writing in the pixels 144 (m, 1) to 144 (m, n) ends.

That is, a state in which electric signals are written to all the pixels of the first liquid crystal panel 140 is established, and a time point thereof is P4. At time P2, since the display period (T10) of the image light of the predetermined color ends for the pixels 144 (1, 1) to 144 (1, n), an electric signal corresponding to the next image light starts to be written to the pixels 144 (1, 1) to 144 (1, n). That is, the time for writing the electric signal to each of the pixels 144 from the first pixel 144 (1, 1) to the last pixel 144 (m, n) is substantially the same as the time for holding the written electric signal. By repeating this, the writing can be performed at intervals of the holding period T10 that is a display period of image light.

In the first liquid crystal panel 140, when the holding period T10 elapses after the electric signal is written in each of the plurality of pixels 144, the next writing is started. Therefore, in a control state CR1(k+1) of the second image, as a start point P3, electric signals are written to the pixels 144 (1, 1) to 144 (1, n), and as a start point P4, electric signals are written to the last pixels 144 (m, 1) to 144 (m, n). This means that the writing of the electric signal is performed so that each pixel is overwritten after elapse of the holding period T10.

Here, as can be seen from FIGS. 1 and 4, the green light G or the blue light B, of the yellow light Y or the blue light B output from the light source device 10A, is incident on the first liquid crystal panel 140. In order to express a full-color image, it is necessary to output the green image light IG or the blue image light IB from the first liquid crystal panel 140 in time series in the display period T0 for displaying one image.

In the timing chart shown in FIGS. 4 and 5, in the first control state CR1(1) from a time point t at the start of the control, that is, from t=0/240 [sec.], the plurality of pixels 144 of the first liquid crystal panel 140 are scanned with the electric signal corresponding to the green image light IG of the green image light IG and the blue image light IB constituting the first image, and the green image light IG is displayed from the first liquid crystal panel 140.

As described above, the electric signal corresponding to the green image light IG in a control state CR1(2) is written to the first pixel 144 (1, 1) at a timing when the electric signal corresponding to the green image light IG in the control state CR1(1) is written to the last pixel 144 (m, n) of the plurality of pixels 144.

In the control state CR1(2) from t=⅟240 [sec.], the plurality of pixels 144 of the first liquid crystal panel 140 are scanned again with the electric signals corresponding to the green image light IG constituting the first image, and the green image light IG is output from the first liquid crystal panel 140 following the control state CR1(1).

When the blue image light IB is displayed from the first liquid crystal panel 140 in a control state CR1(3) following the control state CR1(2), at a timing of writing the electric signals corresponding to the green image light IG in the control state CR1(2) to one or more pixels 144 including the last pixel 144 (m, n), electric signals corresponding to the blue image light IB in the control state CR1(3) are written to the remaining pixels 144 including the pixel 144 (1, 1). Accordingly, a display portion of the green image light IG and a display portion of the blue image light IB are mixed in the image forming region 142, and color mixture of the image light in the first liquid crystal panel 140 occurs.

In order to prevent the occurrence of color mixture of the image light in the first liquid crystal panel 140, the control device 200 causes the first liquid crystal panel 140 to perform black display without displaying any of the image lights IG and IB in the control state CR1(3) after the control state CR1(2).

In the timing chart shown in FIGS. 4 and 5, in the control state CR1(3) from t=²/240 [sec.], the plurality of pixels 144 from the pixel 144 (1, 1) to the pixel 144 (m, n) of the first liquid crystal panel 140 are not scanned sequentially with electric signals corresponding to image light of any color, and the first liquid crystal panel 140 displays black K.

Thereafter, in a control state CR1(4) from t=³/240 [sec.], the plurality of pixels 144 of the first liquid crystal panel 140 are scanned with electric signals corresponding to the blue image light IB constituting the first image, and the blue image light IB is displayed from the first liquid crystal panel 140. In the first liquid crystal panel 140, the control state CR1(3) in which black display is performed is between the control state CR1(2) in which the green image light IG is displayed and the control state CR1(4) in which the blue image light IB is displayed.

As a result, at the timing of writing the electric signals corresponding to the green image light IG in the control state CR1(2) to one or more pixels 144 including the last pixel 144 (m, n), the electric signals corresponding to the blue image light IB in the control state CR1(3) are not written to the remaining pixels 144 including the pixel (1, 1), and the black display is performed in the remaining pixels 144, and thus color mixture of the image light does not occur.

In the timing chart shown in FIG. 4, in a control state CR1(6) from t=⁵/240 [sec.], the pixel 144 (1, 1) to the remaining pixels 144 of the first liquid crystal panel 140 are scanned sequentially with electric signals corresponding to the green image light IG constituting the second image. In order to prevent the occurrence of color mixture in the first liquid crystal panel 140, the control device 200 causes the first liquid crystal panel 140 to perform black display without displaying any of the image lights IG and IB in a control state CR1(5) after the control state CR1(4).

Therefore, in the control state CR1(5) from t=$\frac{4}{240}$ [sec.], the plurality of pixels 144 from the pixel 144 (1, 1) to the pixel 144 (m, n) of the first liquid crystal panel 140 are not sequentially scanned with electric signals corresponding to image light of any color, and the first liquid crystal panel 140 displays black K.

The control device 200 outputs the drive signal D3 corresponding to each of the second and subsequent images to the plurality of pixels 144 of the first liquid crystal panel 140 at the same schedule and timing as those of the first image described above, and displays the green image light IG or the blue image light IB corresponding to the plurality of images from the first liquid crystal panel 140 in time series at a timing corresponding to a predetermined frame frequency as illustrated in FIG. 4. For each image, the green image light IG is output from the first liquid crystal panel 140 in the display period T3=$\frac{2}{240}$ [sec.], and the blue image light IB is output from the first liquid crystal panel 140 in the display period T4=$\frac{1}{240}$ [sec.].

Figure 7:
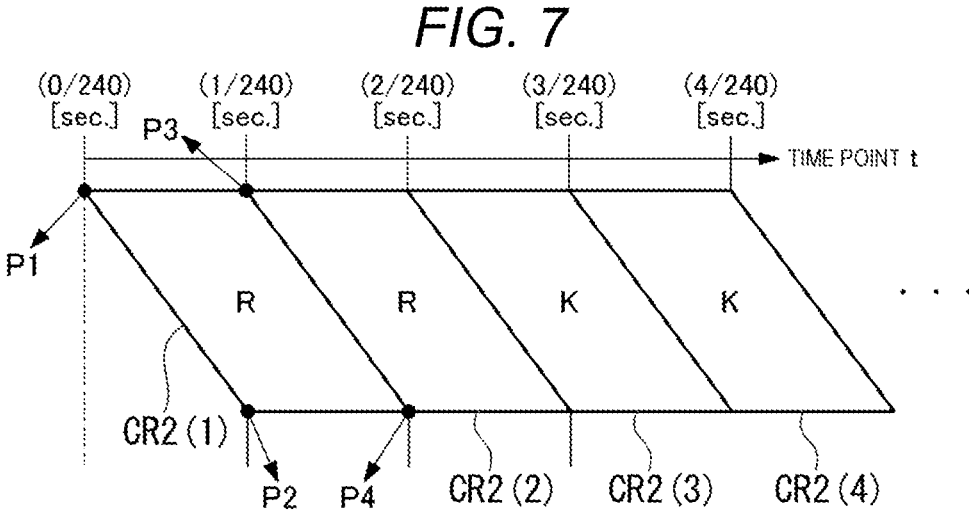
FIG. 7 is another enlarged view of a part of the timing chart of FIG. 4.
Figure 8:
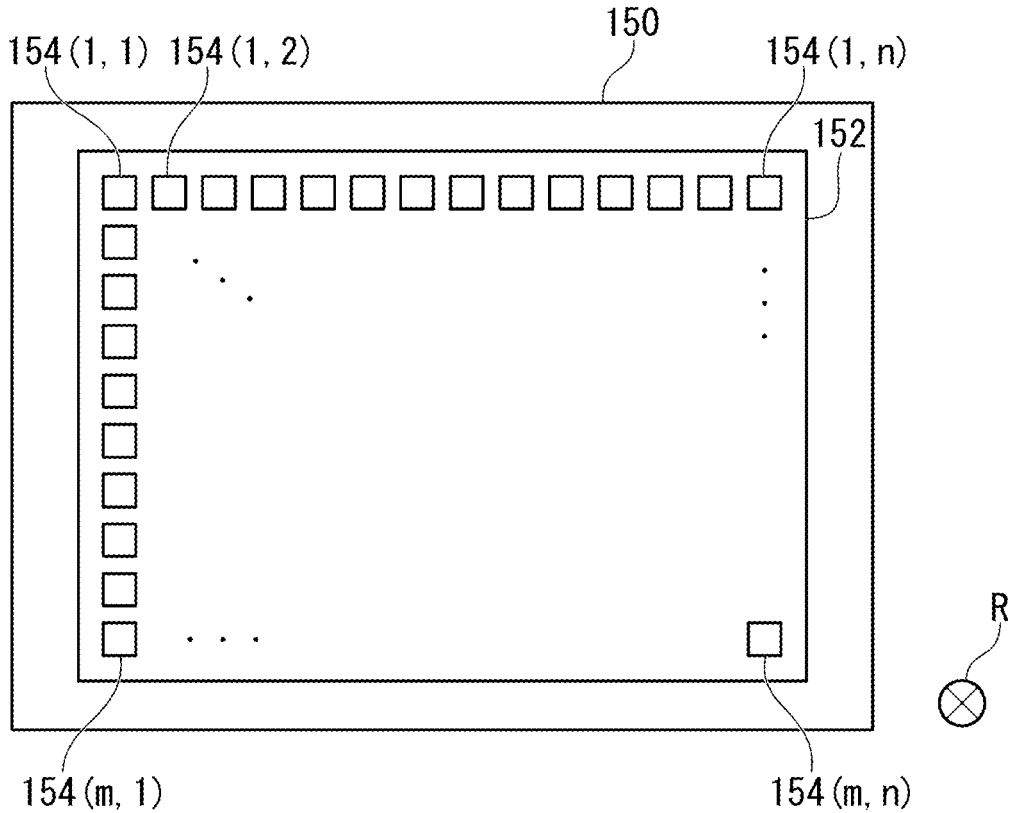
FIG. 8 is a front view of a second liquid crystal panel of the projector in FIG. 1.

FIG. 7 is an enlarged view of a part of the timing chart illustrated in FIG. 4. FIG. 8 is a front view of the second liquid crystal panel 150.

As illustrated in FIG. 8, the second liquid crystal panel 150 has the same configuration as the first liquid crystal panel 140. The image forming region 152 of the second liquid crystal panel 150 is formed parallel to a plane orthogonal to the optical axis of the red light R incident on the second liquid crystal panel 150. In the rectangular image forming region 152, a plurality of pixels 154 are arranged in m rows and n columns in a matrix form along a vertical direction and a transverse direction orthogonal to each other. In the following description and drawings, the pixel 154 in the i-th row and the j-th column may be referred to as the pixel 154 (i, j).

Each of control states CR2(k) shown in FIG. 4 represents one flow serving as a unit in controlling the plurality of pixels 154 of the second liquid crystal panel 150. A letter in a frame of the control state CR2(k) represents a predetermined color of red (R), which is a color of image light output from the second liquid crystal panel 150, or black (K) indicating that no image light is displayed. The start point P1 of the control state CR2(k) indicates that an electric signal corresponding to an image of the predetermined color indicated by the letter in the frame of the control state CR2(k) is written to the first pixel 154 (1, 1) of the second liquid crystal panel 150. The start point P2 of the control state CR2(k) indicates that an electric signal corresponding to the image light of the predetermined color indicated by the letter in the frame of the control state CR2(k) is written to the pixel 154 (m, 1) of the last line of the second liquid crystal panel 150.

The electric signal written to each of the plurality of pixels 154 of the second liquid crystal panel 150 is included in the drive signal D4.

In the control state CR2(k), the pixel 154 (1, 2), the pixel 154 (1, 3), . . . , and the pixel 154 (m, n) are sequentially scanned and written with electric signals corresponding to light emission intensities of respective pixels of image light having a predetermined color of the k-th image, subsequently to the first pixel 154 (1, 1).

In each of the pixels 154, the written electric signal is held during the same holding period T10 as in the first liquid crystal panel 140, and the image light of the predetermined color is emitted according to the electric signal. In the second liquid crystal panel 150, when the holding period T10=$\frac{1}{240}$ [sec.] elapses from a time point at which electric signals corresponding to the image light of the predetermined color in the control state CR2(k) are written to the pixels 154 as described above, the electric signals written to the pixels 154 are temporarily erased in the same order and speed as those at the time of writing, and are instantaneously reset.

An end point P3 of the control state CR2(k) indicates that the electric signal written to the pixel 154 (1, n) of the second liquid crystal panel 150 is erased and display of the image light of the predetermined color in the pixel 154 (1, n) is ended.

An end point P4 of the control state CR2(k) indicates that the electric signal written to the pixel 154 (m, n) of the second liquid crystal panel 150 is erased and display of the image light of the predetermined color in the pixel 154 (m, n) is ended.

Here, as can be seen from FIGS. 1 and 4, the red light R output from the light source device 10A can be incident on the second liquid crystal panel 150. In order to express a full-color image by displaying and switching the yellow image light IY and the blue image light IB in time series at a speed higher than the human visual recognition speed, in the display period T0 for displaying one image, it is necessary to cause the second liquid crystal panel 150 to output the red image light IR simultaneously with the green image light IG output from the first liquid crystal panel 140, and not to cause the second liquid crystal panel 150 to output the red image light IR when the blue image light IB is output from the first liquid crystal panel 140.

As illustrated in FIGS. 4 and 7, in the control state CR2(1) from t=0/240 [sec.], the plurality of pixels 154 from the pixel 154 (1, 1) to the pixel 154 (m, n) of the second liquid crystal panel 150 are sequentially scanned with the electric signals corresponding to the red image light IR constituting the first image, and the red image light IR is displayed from the second liquid crystal panel 150.

In the control state CR2(2) from t=$\frac{1}{240}$ [sec.], the plurality of pixels 154 of the second liquid crystal panel 150 are scanned again with the electric signals corresponding to the red image light IR constituting the first image, and the red image light IR is output from the second liquid crystal panel 150 following the control state CR2(1).

Similarly to the first liquid crystal panel 140, in the second liquid crystal panel 150 as well, in order to prevent the occurrence of color mixture of image light, after the control state CR2(2), the image light IR is not displayed from the second liquid crystal panel 150 in the control state CR2(3), and the second liquid crystal panel 150 performs black display.

In the control state CR2(4) subsequent to the control state CR2(3), since the blue image light IB is output from the first liquid crystal panel 140 in the corresponding control state CR1(4) at the time point t, the image light IR is not displayed from the second liquid crystal panel 150, and the second liquid crystal panel 150 performs black display as illustrated in FIGS. 4 and 7.

The control device 200 outputs the drive signal D4 corresponding to the second and subsequent images to the plurality of pixels 154 of the second liquid crystal panel 150 at the same schedule and timing as those of the first image described above, and causes the second liquid crystal panel 150 to display the red image light IR corresponding to the plurality of images in synchronization with the first liquid crystal panel 140 at a timing corresponding to a predetermined frame frequency as illustrated in FIG. 4. For each image, the red image light IR is output from the second liquid crystal panel 150 in the display period T3=$\frac{2}{240}$ [sec.].

As described above, a time difference equivalent to the holding period T10 occurs between the time point at which writing is performed in the first pixel 144 (1, 1) of the plurality of pixels 144 of the first liquid crystal panel 140 and the time point at which writing is performed in the last pixel 144 (m, n).

A time difference equivalent to the holding period T10 also occurs between the time point when the writing is erased in the first pixel (1, 1) among the plurality of pixels 144 of the first liquid crystal panel 140 and the time point when the writing is erased in the last pixel 144 (m, n).

In addition, a time difference equivalent to the holding period T10 occurs between the time point when writing is performed in the first pixel 154 (1, 1) among the plurality of pixels 154 of the second liquid crystal panel 150 and the time point when writing is performed in the last pixel 154 (m, n). A time difference equivalent to the holding period T10 also occurs between the time point when the writing is erased in the first pixel 154 (1, 1) among the plurality of pixels 154 of the second liquid crystal panel 150 and the time point when the writing is erased in the last pixel 154 (m, n).

The green image light IG output from the first liquid crystal panel 140 and the red image light IR output from the second liquid crystal panel 150 are synthesized by the dichroic mirror 180 of the image light generation device 100A illustrated in FIG. 1, and are output from the dichroic mirror 180 as the yellow image light IY.

Considering the display period T3 in which the green image light IG of the predetermined color and the red image light IR of the predetermined color are output and displayed from at least a part of the pixels 144 and 154 of the plurality of pixels 144 and 154, and the time difference occurred when the same operation is performed at the first pixel 144 (1, 1) and 154 (1, 1) and the last pixel 144 (m, n) and 154 (m, n) of the plurality of pixels 144 and 154, that is, the holding period T10, the time in which the yellow image light IY is output from the dichroic mirror 180 is T3+T10=T5=$\frac{3}{240}$ [sec.].

The blue image light IB output from the first liquid crystal panel 140 is output through the dichroic mirror 180 of the image light generation device 100A. Considering the display period T4 of the blue image light IB in the plurality of pixels 144 and the time difference occurred when the same operation is performed at the first pixels 144 (1, 1) and 154 (1, 1) and the last pixels 144 (m, n) and 154 (m, n) of the plurality of pixels 144 and 154, that is, the holding period T10, the time in which the blue image light IB is output from the dichroic mirror 180 is T4+T10=T6=$\frac{2}{240}$ [sec.].

Therefore, in the display period T0 of each image, the period T5=$\frac{3}{240}$ [sec.] is secured in order to output the yellow image light IY from the projection optical system 190 of the image light generation device 100A over the pixels 144 (1, 1) and 154 (1, 1) to the pixels 144 (m, n) and 154 (m, n). In addition, in order to output the blue image light IB from the projection optical system 190 over the pixels 144 (1, 1) to 144 (m, n), the period T6=$\frac{2}{240}$ [sec.] is secured.

As described above, for example, in the display period T0 of the first image, in a period from the signal processing device 202 illustrated in FIG. 1 causing the yellow image light IY to be emitted from the pixels 144 (1, 1) and 154 (1, 1) by starting writing the electric signals to the pixels 144 (1, 1) and 154 (1, 1) at the start point P1 of the control states CR1(1) and CR2(1), to causing the emission of the yellow image light IY from the pixels 144 (m, n) and 154 (m, n) to be completed by resetting the electric signals for the pixels 144 (m, n) and 154 (m, n) at the end point P4 of the control states CR1 (2) and CR2(2), the yellow light Y is output from the rotary fluorescent plate 20 of the light source device 10A in T0×($\frac{3}{5}$)=T1=T5=$\frac{3}{240}$ [sec.].

Further, for example, in the display period T0 of the first image, in a period from the signal processing device 202 causing the blue image light IB to be emitted from the pixel 144 (1, 1) by starting writing the electric signal to the pixel 144 (1, 1) at the start point P1 of the control states CR1(4) and CR2(4), to causing the emission of the blue image light IB from the pixel 144 (m, n) to be completed by resetting the electric signal for the pixel 144 (m, n) at the end point P4 of the control states CR1(4) and CR2(4), the blue light B is output from the rotary fluorescent plate 20 of the light source device 10A in T0×($\frac{2}{5}$)=T2=T6=$\frac{2}{240}$ [sec.].

As illustrated in FIG. 2, the fluorescent layer 24 is provided in the angular range RG1 of the front surface 22a of the substrate 22 in the circumferential direction centering on the rotation axis RX of the rotary fluorescent plate 20.

Therefore, when the rotary fluorescent plate 20 takes one round of rotation around the rotation axis RX with respect to a position where the blue light beam BB is incident on the rotary fluorescent plate 20, the yellow light Y is output from the rotary fluorescent plate 20 in the angular range RG1 and the blue light B is output from the rotary fluorescent plate 20 in the angular range RG2 in the one round of rotation, that is, 360°=2π [rad.]. For example, it is assumed that a ratio of the angular range RG1 to the angular range RG2 in one round of rotation is 3:2.

That is, the angular range RG1 is 216°=(6π/5) [rad.], and the angular range RG2 is 144°=(4π/5) [rad.]. When the angular range RG1 is set to the period T5 in which the green light G is incident on the first liquid crystal panel 140 and the red light R is incident on the second liquid crystal panel 150, and the angular range RG2 is set to the period T6 in which the blue light is incident on the first liquid crystal panel 140, the optimum rotation speed ORS of the substrate 22 of the rotary fluorescent plate 20 is 48×60=2880 [rpm] based on 60 [Hz] that is the frame frequency of the image displayed on the screen SCR and 48 [Hz] that is the drive frequency of the first liquid crystal panel 140 and the second liquid crystal panel 150.

The motor 30 is driven to rotate at 2880 [rpm], and the rotation of the motor 30 is synchronized with the driving of the first liquid crystal panel 140 and the second liquid crystal panel 150.

As a result, the rotary fluorescent plate 20 can rotate at the same frequency and speed as the frame frequency and frame rate of the image displayed from the projector 301, can output the green light G and the red light R toward the first liquid crystal panel 140 and the second liquid crystal panel 150 in the period T5 of the display period T0 of each image, and can output the blue light B toward the first liquid crystal panel 140 in the period T6 of the display period T0 of each image.

As described above, "the rotation of the motor 30 and the rotary fluorescent plate 20 is synchronized with the driving of the first liquid crystal panel 140 and the second liquid crystal panel 150" has the following meaning: the motor 30 rotates in the circumferential direction centering on the rotation axis RX at the optimum rotation speed ORS, and a timing, at which the blue light beam BB incident on the rotary fluorescent plate 20 and a start point P11 of the angular range RG1 overlap with each other in the circumferential direction, coincides with a timing of the start point P1 of the first control states CR1(k) and CR2(k) in the display period T0 for displaying each image.

Figure 9:
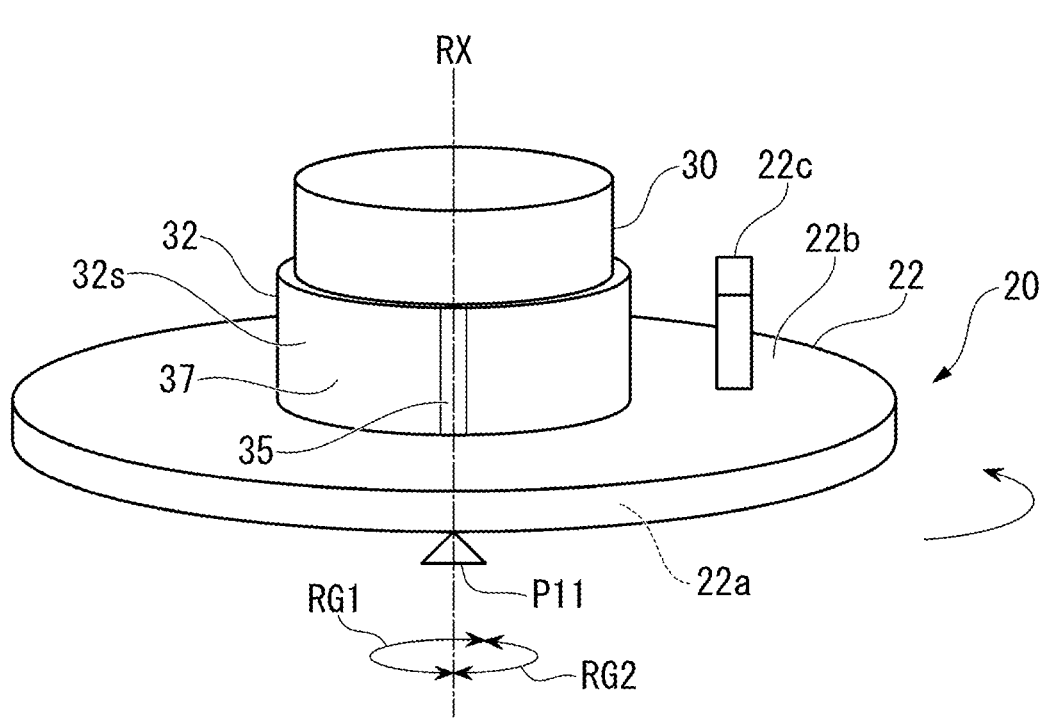
FIG. 9 is a perspective view of the rotary fluorescent plate of the projector in FIG. 1.

FIG. 9 is a perspective view of the rotary fluorescent plate 20 of the light source device 10A illustrated in FIG. 1 as viewed from the incident side of the blue light beam BB. In the projector 301, the start point P11 of the angular range RG1 can be detected when the rotary fluorescent plate 20 rotates in the circumferential direction centering on the rotation axis RX.

As illustrated in FIG. 9, the motor 30 is provided with, for example, a wheel 32 disposed coaxially with the rotation axis RX. A light emission sensor 22c is disposed at a position facing an outer peripheral surface 32s of the wheel 32. The light emission sensor 22c includes a light emitting element (not illustrated) that emits light for position detection (not illustrated) toward the outer peripheral surface 32s of the wheel 32, and a light receiving element (not illustrated) that receives light reflected from the outer peripheral surface 32s.

The wheel 32 rotates in the circumferential direction centering on the rotation axis RX in conjunction with the substrate 22 by the operation of the motor 30. The light emission sensor 22c is fixed in the circumferential direction without interlocking with the substrate 22 or the wheel 32. The outer peripheral surface 32s of the wheel 32 is divided into a first reflecting surface 35 and a second reflecting surface 37 in the circumferential direction centering on the rotation axis RX. The first reflecting surface 35 has a predetermined reflectance with respect to the light for position detection emitted from the light emission sensor 22c, and overlaps the angular range RG1 in the circumferential direction centering on the rotation axis RX. The second reflecting surface 37 has a reflectance different from that of the first reflecting surface 35 with respect to the light for position detection.

When the substrate 22 of the rotary fluorescent plate 20 and the wheel 32 are rotated in the circumferential direction at the optimum rotation speed ORS by driving of the motor 30, the light emission sensor 22c continuously acquires an intensity of the light for position detection reflected from the outer peripheral surface 32s of the wheel 32.

As a result, the intensity of the light for position detection changes when a boundary between the first reflecting surface 35 and the second reflecting surface 37 faces the light emission sensor 22c, and thus the start point P11 and an end point P12 of the angular range RG1 are easily detected. The light emission sensor 22c converts the acquired intensity of the light for position detection into an electric signal, and outputs the generated electric signal to the rotary fluorescent plate drive device 208 of the control device 200 illustrated in FIG. 1. The rotary fluorescent plate drive device 208 receives the electric signal (not illustrated) from the light emission sensor 22c, and outputs a timing signal indicating the same timing as the start point P11 of the angular range RG1 to the liquid crystal drive device 210 via the signal processing device 202.

It is sufficient that the start point P11 and the end point P12 of the angular range RG1 can be easily detected in the rotary fluorescent plate 20, and a configuration for detecting the start point P11 and the end point P12 in the rotary fluorescent plate 20 is not limited to the above-described configuration. For example, a first reflecting line in a thin linear shape may be provided only at positions overlapping the start point P11 and the end point P12 in the circumferential direction on the outer peripheral surface 32s of the wheel 32, and the outer peripheral surface 32s other than the first reflecting line may be the second reflecting surface 37.

The liquid crystal drive device 210 outputs the drive signal D3 to the first liquid crystal panel 140 and the drive signal D4 to the second liquid crystal panel 150 in accordance with the timing signal from the rotary fluorescent plate drive device 208. Specifically, the drive signal D3 is input to the first liquid crystal panel 140 at the same timing as the timing when the start point P11 of the angular range RG1 is detected by the light emission sensor 22c in the circumferential direction centering on the rotation axis RX, and an electric signal for outputting the green image light IG of each image is written to the pixel 144 (1, 1) of the first liquid crystal panel 140. At the same timing as the timing when the electric signal for outputting the green image light IG is written in the first liquid crystal panel 140, an electric signal for outputting the red image light IR of each image is written in the pixel 154 (1, 1) of the second liquid crystal panel 150.

The control device 200 makes the timing, at which the start point P11 of the angular range RG1 is detected by the light emission sensor 22c, coincide with a start timing of the display period T3 and the period T5 in each display period T0 of the timing chart illustrated in FIG. 4. In the signal processing device 202, the ratio between the angular ranges RG1 and RG2 in the rotary fluorescent plate 20 is stored in advance. The control device 200 makes a timing, at which the end point P12 of the angular range RG1 is detected by the light emission sensor 22c, coincide with a start timing of the display period T4 and the output period T6 in each display period T0 of the timing chart illustrated in FIG. 4.

The timing at which the end point P12 of the angular range RG1 faces the light emission sensor 22c can be calculated based on the timing at which the start point P11 of the angular range RG1 is detected by the light emission sensor 22c, the optimum rotation speed ORS, and the ratio between the angular ranges RG1 and RG2.

The control device 200 detects a difference between a timing, at which the end point P12 of the angular range RG1 is actually detected by the light emission sensor 22c and a timing signal from the rotary fluorescent plate drive device 208 is output to the signal processing device 202, and a timing calculated based on the timing at which the start point P11 of the angular range RG1 is detected and the optimum rotation speed ORS and the ratio between the angular ranges RG1 and RG2 as described in the signal processing device 202, whereby whether the rotary fluorescent plate 20 is rotating at the optimum rotation speed ORS can be confirmed.

The control device 200 can output the drive signal D2 for correcting the timing and speed of rotation of the substrate 22 in the circumferential direction to the motor 30 of the rotary fluorescent plate 20 so as to reduce the above-described difference in timing to zero.

As described above, the rotation of the motor 30 and the rotary fluorescent plate 20 at the optimum rotation speed ORS and the driving of the first liquid crystal panel 140 and the second liquid crystal panel 150 are synchronized with each other under the control of the control device 200, so that the yellow image light IY and the blue image light IB are output from the projection optical system 190 in time series without being mixed with each other according to the timing chart illustrated with reference to FIG. 4. A switching speed between the yellow image light IY and the blue image light IB is set to be higher than a speed of human image recognition. Therefore, a user and an observer of the projector 301 can observe a full-color image on the screen SCR.

Since a ratio between the periods T5 and T6 of the yellow image light IY and the blue image light IB is set to 3:2, and a ratio between the display periods T3 and T4 of the green image light IG and the blue image light IB for each image in the first liquid crystal panel 140 is set to 2:1, the image light IG and IB output from the first liquid crystal panel 140 can be brightened.

However, when a full-color image is to be displayed by the projector 301, in order to optimize the color balance or white balance of the image, a light amount ratio between the yellow image light IY and the blue image light IB is set to a predetermined ratio. The light amount ratio (predetermined ratio) between the yellow image light IY and the blue image light IB is not limited to a specific ratio, and is appropriately set according to the use application of the projector 301 including presentation, lecture, and movie appreciation.

Specifically, the light amount ratio between the yellow image light IY and the blue image light IB is set to, for example, x=0.270 to 0.340 and y=0.265 to 0.390 at the chromaticity coordinates x and y, although not illustrated. When it is necessary to satisfy the range of 0.270 to 0.340 for x and the range of 0.265 to 0.390 for y at the chromaticity coordinates x and y, the light amount ratio between the yellow image light IY and the blue image light IB is set within a range of 4:1 to 1:1. Here, it is assumed that the light amount ratio between the yellow image light IY and the blue image light IB is set to, for example, 4:1.

The ratio between the display periods T3 and T4 of the green image light IG and the red image light IR and the blue image light IB in each pixel 144 of the first liquid crystal panel 140 of the image light generation device 100A illustrated in FIG. 1 is set to 2:1 as described above. Therefore, in order to set the light amount ratio between the yellow image light IY and the blue image light IB output from the projection optical system 190 to 4:1, it is preferable to set a light intensity ratio between the yellow light Y and the blue light B output from the rotary fluorescent plate 20 to 2:1.

Therefore, when the optical loss at the time of fluorescence conversion from the blue light beam BB to the yellow light Y is ignored, an output intensity of the blue light beam BB in a period in which the fluorescence conversion is not performed is reduced to 2/4 of an output intensity of the blue light beam BB in a period in which the fluorescence conversion to the yellow light Y is performed, that is, to 50%.

Figure 10:
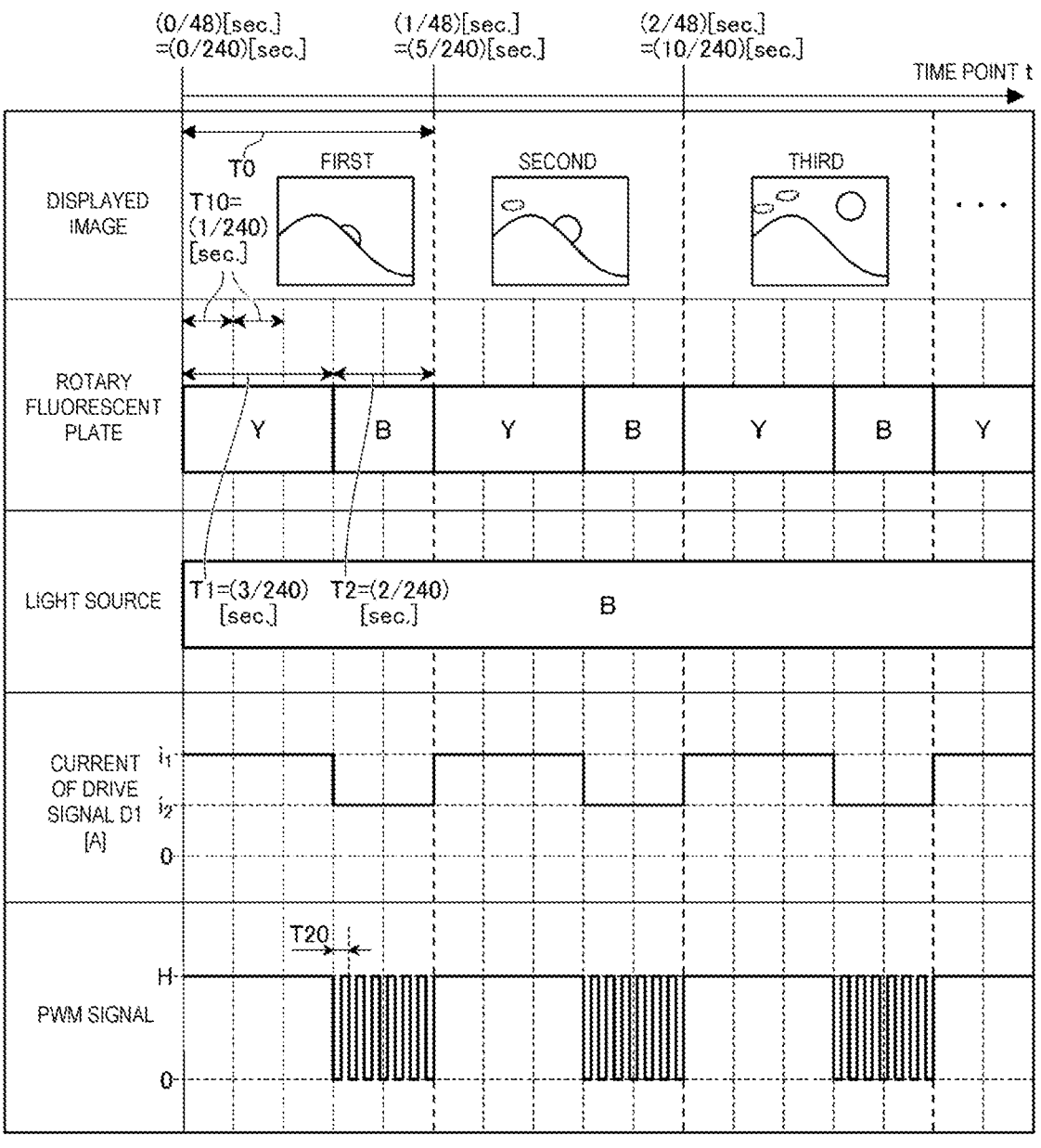
FIG. 10 is a timing chart illustrating signals used in the projector in FIG. 1, blue light and yellow light emitted from the light source device, and signals supplied to a light source.

FIG. 10 is a timing chart illustrating a correspondence relationship between a current value and a frequency of the drive signal D1 output from the light source drive device 206 of the control device 200 to the light source 11 and the blue light beam BB output from the light source 11 and the yellow light Y or the blue light B output from the rotary fluorescent plate 20.

As illustrated in FIG. 10, for example, in the display period T0 of each image, in a period in which the blue light B emitted from the light source 11 is radiated to the fluorescent layer 24 of the rotary fluorescent plate 20 and the yellow light Y is output from the rotary fluorescent plate 20, that is, in the output period T1, the light source drive device 206 outputs the drive signal D1 for causing each of the light emitting elements 11S of the light source 11 to output the blue light B for forming the blue light beam BB having a predetermined light intensity.

A current value i1 of the drive signal D1 in the output period T1 is set in consideration of the brightness required for the image output from the projector 301 and the specifications of the components constituting the image light generation device 100A and the light source device 10A. In the output period T1, the PWM signal generation device 204 outputs the PWM signal S1 of a high level having a duty ratio of 100% to the light source drive device 206.

That is, in the output period T1, the ratio between the light emission time and the light off time of the light source 11 is 1:0, and the light source 11 is in a turned-on state of being driven at the current value i1.

Subsequently, in the display period T0 of each image, in a period in which the blue light B emitted from the light source 11 passes through the space, in which the rotary fluorescent plate 20 is not present, without being radiated to the fluorescent layer 24, that is, in the output period T2, the light source drive device 206 outputs the drive signal D1 for causing each of the light emitting elements 11S of the light source 11 to output the blue light B for forming the blue light beam BB having a light intensity half the predetermined light intensity.

A current value i2 of the drive signal D1 at this time is (i1/2). In order to set the current value of the drive signal D1 to i2, in the output period T2, the PWM signal generation device 204 outputs the PWM signal S1 of a high level having a duty ratio of 50% to the light source drive device 206.

That is, in the output period T2, the ratio between the light emission time and the light off time of the light source 11 is 1:1, and the light source 11 is in a state equivalent to the turned-on state of being driven by the current value i2.

A cycle T20 of the PWM signal S1 in the output period T2 is preferably an integer fraction of the holding period T10 of the electric signal in each pixel 144 of the first liquid crystal panel 140 and the holding period T10 of the electric signal in each pixel 154 of the second liquid crystal panel 150.

By setting the cycle T20 in this manner, the occurrence of flicker in each of the yellow image light IY and the blue image light IB is favorably prevented.

As described above, since the light source 11 is controlled by the PWM signal generation device 204 and the light source drive device 206, the light intensity of the blue light B from the rotary fluorescent plate 20 of the light source device 10A in the output period T2 is reduced to 2/4 times the light intensity of the yellow light Y in the output period T1, that is, to 50%.

Accordingly, even when the ratio between the display period T3 of the green image light IG and the display period T4 of the blue image light IB is set to 2:1 in the first liquid crystal panel 140 of the image light generation device 100A, the light amount ratio between the yellow image light IY and the blue image light IB output from the projection optical system 190 is 4:1.

As described above, the rotation of the motor 30 and the rotary fluorescent plate 20 at the optimum rotation speed ORS is synchronized with the driving of the first liquid crystal panel 140 and the second liquid crystal panel 150 by being controlled by the control device 200, and the output intensity of the blue light beam BB output from the light source 11 is adjusted in accordance with the ratio between the angular ranges RG1 and RG2 of the rotary fluorescent plate 20, whereby the image light IG and IB of two colors output from the first liquid crystal panel 140 can be kept bright, and the color balance or the white balance of an image output from the projection optical system 190 can be favorably maintained.

In the above description, the ratio between the display periods T3 and T4 of the image light IG and IB for each image in the first liquid crystal panel 140, the ratio between the periods T5 and T6 of the image light IY and IB output from the projection optical system 190, the ratio between the angular ranges RG1 and RG2 of the rotary fluorescent plate 20, and the ratio between the output intensities of the yellow light Y and the blue light B from the rotary fluorescent plate 20 based on the optimal color balance or white balance of the image output from the projection optical system 190 are described with specific numerical examples. The various ratios set in the projector 301 are appropriately changed according to a use purpose and an installation environment of the projector 301, specifications of an optical element and an electrical component used in the projector 301, and the like.

Figure 11:
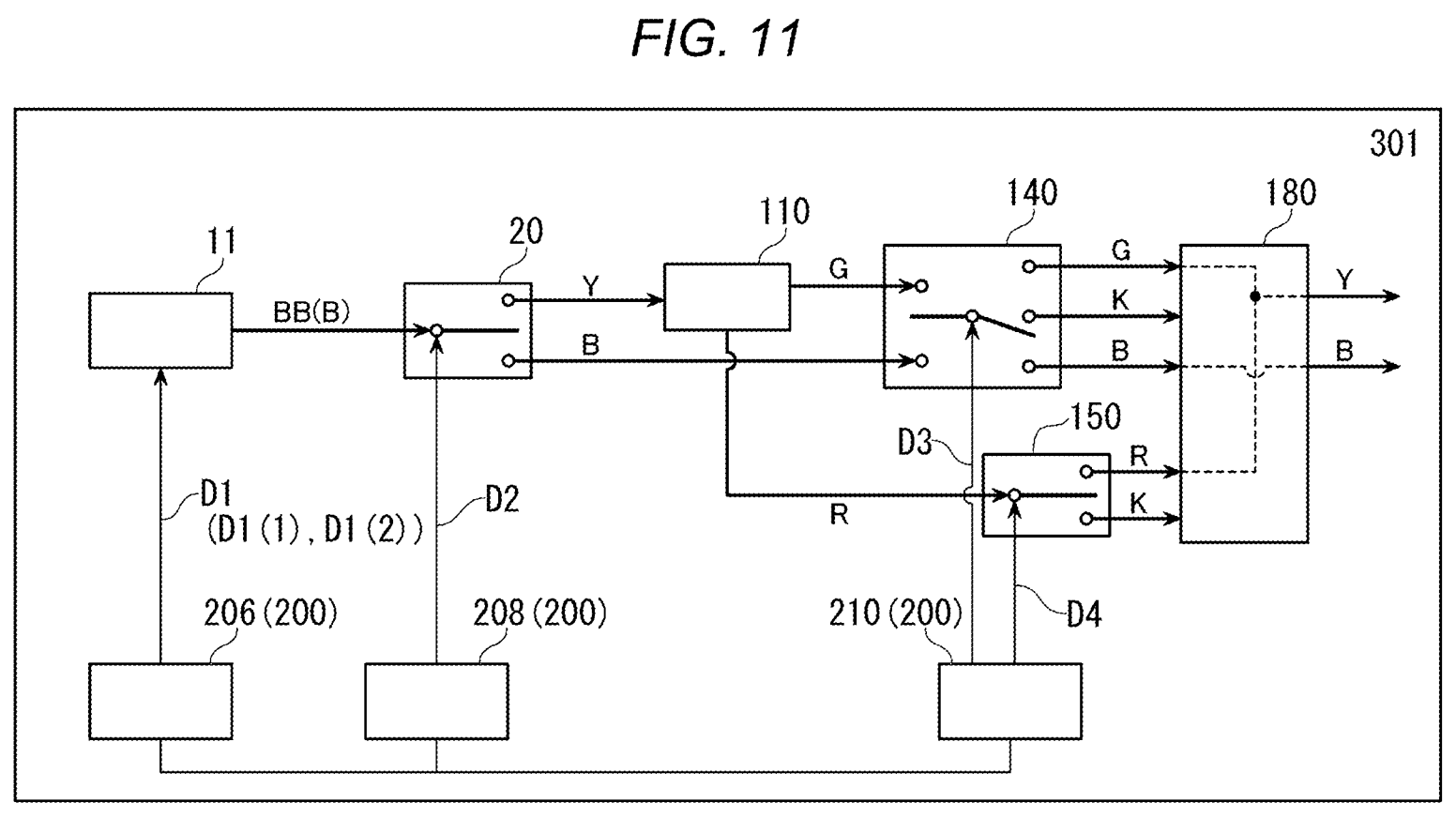

FIG. 11 is a block diagram illustrating a configuration for optimizing various settings in the projector 301 and displaying an image. It is assumed that the settings in the projector 301 are as follows. For example, N1 to N10 below are any set natural numbers.

Ratio between output periods T1 and T2 of yellow light Y and blue light B from rotary fluorescent plate 20 . . . N1:N2

Ratio between display periods T3 and T4 of green image light IG and blue image light IB in pixels 144 of first liquid crystal panel 140 in each image . . . N3:N4

Ratio between periods T5 and T6 of yellow light Y and blue light B emitted from rotary fluorescent plate 20 . . . N5:N6

Drive frequency of first liquid crystal panel 140 and second liquid crystal panel 150 . . . N7 [Hz]=(1/N7) [sec.]

Frame frequency and frame rate of image output from projection optical system 190 . . . N8 [Hz]=(1/N8) [sec.], N8 [fps]

Light amount ratio between yellow image light IY and blue image light IB from dichroic mirror 180 based on white balance . . . N9:N10

As illustrated in FIG. 11, the light source drive device 206 of the control device 200 outputs, to the light source 11, the drive signal D1 for emitting the blue light beam BB having a predetermined light intensity I1 in the output period T1={(N7/N8)/N7}×{N5/(N5+N6)} [sec.] in the display period T0 of each of the plurality of images displayed from the projector 301. The drive signal D1 at this time is referred to as a drive signal D1(1).

In the output period T2={(N7/N8)/N7}×{N6/(N5+N6)} [sec.] subsequent to the output period T1, the light source drive device 206 outputs the drive signal D1 for emitting the blue light beam BB having a light intensity I2=I1×{(N3×N10)/(N4×N9)} to the light source 11. The drive signal D1 at this time is referred to as a drive signal D1(2).

As described above, the drive signals D1(1) and D1(2) are output to the light source 11 in time series in the output periods T1 and T2.

The rotary fluorescent plate drive device 208 of the control device 200 outputs the drive signal D2 to the motor 30 of the rotary fluorescent plate 20 in synchronization with the light source drive device 206 outputting the drive signal D1(1) in the output period T1. The drive signal D2 at this time is referred to as a drive signal D2(1).

In accordance with the drive signal D2(1), the substrate 22 is rotated at the optimum rotation speed ORS=N8×60 [rpm] by the driving and rotation of the motor 30, and a position of the blue light beam BB is aligned with a position of the start point P11 of the rotary fluorescent plate 20 on the substrate 22 in the circumferential direction centering on the rotation axis RX at a start time-point of the output period T1. The yellow light Y is output from the rotary fluorescent plate 20 to which the drive signal D2(1) is input.

The rotary fluorescent plate drive device 208 outputs the drive signal D2 to the rotary fluorescent plate 20 in synchronization with the light source drive device 206 outputting the drive signal D1(2) in the output period T2. The drive signal D2 at this time is referred to as a drive signal D2(2).

In accordance with the drive signal D2(2) similar to the drive signal D2(1), the substrate 22 is rotated at the optimum rotation speed ORS by the driving and rotation of the motor 30, and the position of the blue light beam BB is aligned with a position of the end point P12 on the substrate 22 in the circumferential direction centering on the rotation axis RX at a start time-point of the output period T2. The blue light B is output from the rotary fluorescent plate 20 to which the drive signal D2(2) is input.

The yellow light Y output from the rotary fluorescent plate 20 in the angular range RG1 in the output period T1 is separated into the green light G and the red light R by the dichroic mirror 110 as described above. The separated green light G is input to the first liquid crystal panel 140, and the separated red light R is input to the second liquid crystal panel 150. The blue light B passed through the space of the angular range RG2 in the output period T2 is input to the first liquid crystal panel 140.

The liquid crystal drive device 210 of the control device 200 outputs the drive signal D3 to the first liquid crystal panel 140 in the period T5 in synchronization with the output period T1. That is, T5=T1−1/N7. The drive signal D3 at this time is referred to as a drive signal D3(1). In accordance with the drive signal D3(1), the green light G incident on the first pixel 144 (1, 1) of the first liquid crystal panel 140 in the display period T3=[{(N7/N8)−2}/N7]×{N3/(N3+N4)} [sec.] is modulated, and the green image light IG corresponding to the pixel 144 (1, 1) is output based on the image signal V2.

Subsequently, the remaining pixels 144 other than the pixel 144 (1, 1) are scanned with the drive signal D3(1), and in accordance with the drive signal D3(1), the green light G incident on each pixel 144 in the display period T3 is modulated and the image light IG is output from each pixel 144.

Immediately after the green image light IG is output in the display period T3 in the first pixel 144 (1, 1) of the first liquid crystal panel 140, black display is performed without outputting image light of any color in the same shortest period as the holding period T10 in accordance with the drive signal D3. The shortest period described above is equivalent to 1/N7 [sec.]. The drive signal D3 at this time is referred to as a drive signal D3(2). The remaining pixels 144 other than the pixel 144 (1, 1) are scanned sequentially with the drive signal D3(2), and each pixel 144 displays black in the shortest period according to the drive signal D3(2).

The liquid crystal drive device 210 of the control device 200 outputs the drive signal D3 to the first liquid crystal panel 140 in the period T6 in synchronization with the output period T2. That is, T6=T2−1/N7. The drive signal D3 at this time is referred to as a drive signal D3(3).

In accordance with the drive signal D3(3), the blue light B incident on the first pixel 144 (1, 1) of the first liquid crystal panel 140 in the display period T4=[{(N7/N8)−2}/N7]×{N4/(N3+N4)} [sec.] is modulated, and the blue image light IB corresponding to the pixel 144 (1, 1) is output based on the image signal V2.

Subsequently, the remaining pixels 144 other than the pixel 144 (1, 1) are scanned with the drive signal D3(3), and in accordance with the drive signal D3(3), the green light G incident on each pixel 144 in the display period T4 is modulated and the image light IG is output from each pixel 144.

Immediately after the blue image light IB is output in the display period T4 in the first pixel 144 (1, 1) of the first liquid crystal panel 140, black display is performed without outputting image light of any color in the same shortest period as the holding period T10 in accordance with the drive signal D3. The drive signal D3 at this time is referred to as a drive signal D3(4). The remaining pixels 144 other than the pixel 144 (1, 1) are scanned sequentially with the drive signal D3(4), and each pixel 144 displays black in the shortest period according to the drive signal D3(4).

The liquid crystal drive device 210 of the control device 200 outputs the drive signal D4 to the second liquid crystal panel 150 in the period T5 in synchronization with the output period T1. The drive signal D4 at this time is referred to as a drive signal D4(1). In accordance with the drive signal D4(1), the red light R is modulated in the display period T3 in the first pixel 154 (1, 1) of the second liquid crystal panel 150, and the red image light IR corresponding to the pixel 154 (1, 1) is output based on the image signal V2.

Subsequently, the remaining pixels 154 other than the pixel 154 (1, 1) are scanned with the drive signal D4(1), and in accordance with the drive signal D4(1), the red light R incident on each pixel 154 in the display period T3 is modulated and the image light IR is output from each pixel 154.

Immediately after the green image light IG is output in the display period T3 in the first pixel 154 (1, 1) of the second liquid crystal panel 150, black display is performed without outputting image light of any color in the pixel 154 (1, 1) in the same shortest period as the holding period T10 in accordance with the drive signal D4. The drive signal D4 at this time is referred to as a drive signal D4(2). The remaining pixels 154 other than the pixel 154 (1, 1) are sequentially scanned with the drive signal D4(2), and each pixel 154 displays black in the shortest period according to the drive signal D4(2).

After black display is performed in the display period T3 in the first pixel 154 (1, 1) of the second liquid crystal panel 150, black display is performed without outputting image light of any color in the pixel 154 (1, 1) in the display period T4 in which the blue image light IB is displayed by the pixel 144 (1, 1) in the first liquid crystal panel 140 in accordance with the drive signal D4. The drive signal D4 at this time is referred to as a drive signal D4(3).

The remaining pixels 154 other than the pixel 154 (1, 1) are sequentially scanned with the drive signal D4(3), and each pixel 154 displays black in the display period T4 according to the drive signal D4(3). Thereafter, the pixel 154 (1, 1) displays black without outputting image light of any color in the shortest period described above according to the drive signal D4. The drive signal D4 at this time is referred to as a drive signal D4(4).

The remaining pixels 154 other than the pixel 154 (1, 1) are sequentially scanned with the drive signal D4(4), and each pixel 154 displays black in the shortest period according to the drive signal D4(4).

As described above, the drive signals D1(1) and D1(2) are output from the light source drive device 206 of the control device 200 to the light source 11, the drive signal D2(1) is output from the rotary fluorescent plate drive device 208 to the motor 30 of the rotary fluorescent plate 20 in synchronization with the drive signal D1(1), and the drive signal D2(2) is output in synchronization with the drive signal D1(2).

In addition, as described above, the liquid crystal drive device 210 causes a timing of the drive signal D3 (p) and a timing of the drive signal D4 (p) (p=1 to 4) to coincide with each other in the display period T0 of each image among the plurality of images displayed from the projector 301.

The drive signals D3(1) and D3(2) are sequentially output from the liquid crystal drive device 210 to the first liquid crystal panel 140 in synchronization with the drive signals D1(1) and D2(1), and the drive signals D4 (1) and D4 (2) are sequentially input to the second liquid crystal panel 150 in synchronization with the drive signals D1(1) and D2(1). The drive signals D3(3) and D3(4) are sequentially output from the liquid crystal drive device 210 to the first liquid crystal panel 140 in synchronization with the drive signals D1(2) and D2(2).

As a result, the yellow image light IY and the blue image light IB are output from the image light generation device 100A in time series at timings and light amounts optimized according to the various ratios and the various setting values described above, the occurrence of color mixture in the full-color image light is prevented, and the full-color image light can be observed on the screen SCR.

The projector 301 according to the first embodiment described above includes at least the light source device 10A, the dichroic mirror 110, the first liquid crystal panel 140, the second liquid crystal panel 150, the dichroic mirror 180, and the projection optical system 190. The light source device 10A includes the plurality of light emitting elements 11S that output the blue light B, and the fluorescent layer 24 that performs fluorescence conversion on the blue light B output from the light emitting elements 11S to output the yellow light Y. The light source device 10A outputs the blue light B and the yellow light Y in time series. The fluorescent layer 24 performs fluorescence conversion on the blue light B output from the light emitting element 11S and outputs the yellow light Y. The dichroic mirror 110 is a wavelength selection element. The yellow light Y is fluorescence. The fluorescent layer 24 is a wavelength conversion element.

The dichroic mirror 110 transmits the blue light B output from the light source device 10A, and separates the yellow light Y into the green light G that is light of one color and the red light R that is light of another different color.

For the incident light of two colors different from each other, the dichroic mirror 110 transmits the green light G and reflects the red light R, which is different from the green light G.

The blue light B and the green light G are incident on the first liquid crystal panel 140. The red light R is incident on the second liquid crystal panel 150. The first liquid crystal panel 140 outputs the blue image light IB and the green image light IG that is image light of one color, and the second liquid crystal panel 150 outputs the image light IR that is image light of the other color. The dichroic mirror 180 outputs the image light IB, IG, and IR to the common optical path. The projection optical system 190 projects the image light IB, IG, and IR.

With the projector 301 according to the first embodiment, the blue light B and the yellow light Y that is fluorescence output from the light source device 10A in time series are dispersed into the first liquid crystal panel 140 and the second liquid crystal panel 150 by the dichroic mirror 110, and full-color image light is displayed.

According to the projector 301 of the first embodiment, it is possible to adopt an optimal configuration for efficiently generating the blue light B and the yellow light Y by using a solid light source as the light emitting element 11S and displaying a full-color image by using two liquid crystal panels. According to the projector 301 of the first embodiment, since two liquid crystal panels are sufficient, it is not necessary to use the same number of liquid crystal panels as the number of colors of light, and it is possible to reduce a size of the image light generation device 100A and the entire device.

The projector 301 according to the first embodiment includes the substrate 22 that is a rotary plate. The substrate 22 has the fluorescence output region 28 in which the fluorescent layer 24 is provided. According to the projector 301 of the first embodiment, since the yellow light Y can be output by rotationally driving the substrate 22, the same region of the fluorescent layer 24 is not excessively irradiated with the blue light beam BB, and the fluorescent layer 24 can be efficiently cooled.

In the projector 301 according to the first embodiment, the substrate 22 outputs the blue light B in the angular range RG1 and the yellow light Y in the angular range RG2 by the rotation about the rotation axis RX, and thus can easily output the blue light B and the yellow light Y, which are light having different colors, in time series.

In a modification of the projector 301 according to the first embodiment, only the substrate 22 that transmits the blue light beam BB, which is blue light, may not be cut in the angular range RG2 in the circumferential direction centering on the rotation axis RX.

Figure 12:
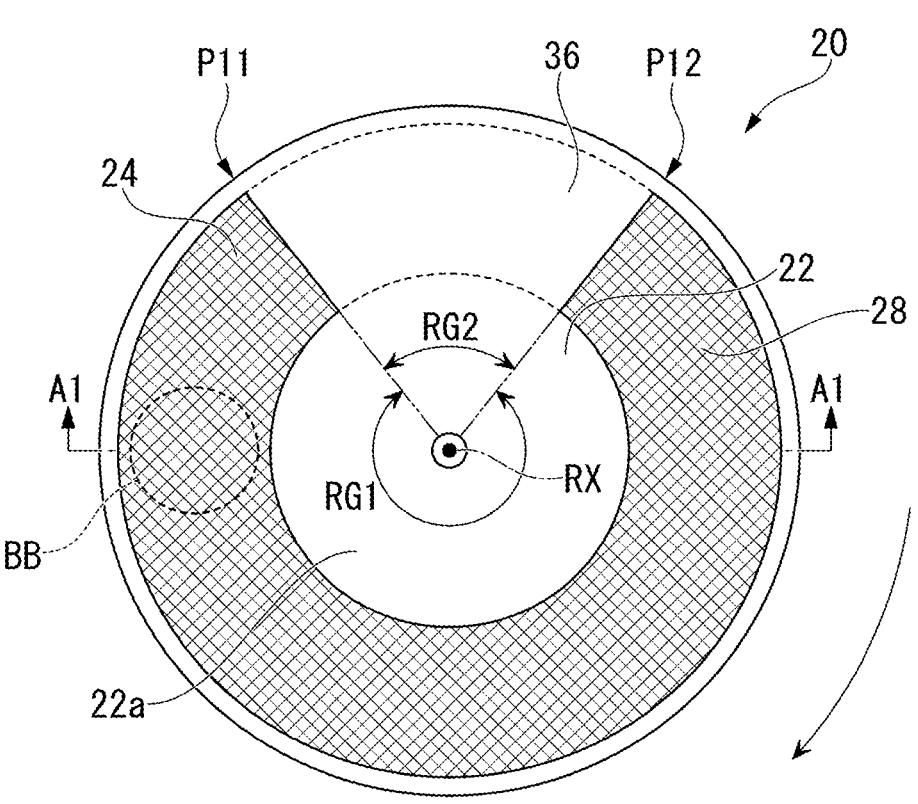
FIG. 12 is a perspective view of a modification of the rotary fluorescent plate of the projector in FIG. 1.

FIG. 12 is a plan view of the rotary fluorescent plate 20 according to the modification of the projector 301 of the first embodiment. As illustrated in FIG. 12, the substrate 22 includes a blue light output region 36 that outputs the blue light B from the light emitting element 11S.

That is, the blue light output region 36 is formed of only a translucent substrate without a fluorescent layer or a dichroic film. Also in the modification of the projector 301 of the first embodiment, since the substrate 22 outputs the blue light B in the angular range RG1 and outputs the yellow light Y in the angular range RG2 by the rotation about the rotation axis RX, the blue light B and the yellow light Y can be easily output in time series.

The projector 301 of the first embodiment includes the control device 200 in addition to the light source device 10A, the dichroic mirror 110, the first liquid crystal panel 140, and the second liquid crystal panel 150 described above. The control device 200 controls the light source device 10A, the first liquid crystal panel 140, and the second liquid crystal panel 150.

In addition, the control device 200 drives the light emitting elements 11S to cause the blue light B and the yellow light Y to be output from the light source device 10A in time series in the output periods T1 and T2.

The control device 200 supplies the drive signal D3(1), which is a green image signal for generating the green image light IG, to the first liquid crystal panel 140 in the display period T3 synchronized with the green light G that is selected by the dichroic mirror 110 after being separated by the dichroic mirror 110.

The control device 200 supplies the drive signal D3(2), which is a black image signal for performing black display, to the first liquid crystal panel 140 in the period T11 having the same duration as the holding time T10 after the display period T3.

The control device 200 supplies the drive signal D3(3), which is a blue image signal for generating the blue image light IB, to the first liquid crystal panel 140 in the display period T4 after the period T11. The control device 200 supplies the drive signal D3(4), which is the black image signal for performing black display, to the first liquid crystal panel 140 in the period T12 having the same duration as the holding time T10 after the display period T4.

The display period T3 can be defined as a first period, the period T11 as a second period, the display period T4 as a third period, and the period T12 as a fourth period. The control device 200 supplies the drive signal D4(1), which is an image signal of another color for generating the red image light IR, to the second liquid crystal panel 150 in the display period T3 synchronized with the red light R selected by the dichroic mirror 110, that is, in the first period. The control device 200 supplies the drive signals D4(2) to D4(4), which are black image signals for performing black display, to the second liquid crystal panel 150 in the display period T11, the period T4, and the display period T12 after the display period T3, that is, in the second period to the fourth period.

According to the projector 301 of the first embodiment, since the drive signals D3(1) to D3(4) are output to the first liquid crystal panel 140 and the drive signals D4(1) to D4(4) are output to the second liquid crystal panel 150 at the above-described timings, it is possible to prevent the occurrence of color mixture.

In a first modification of the projector 301 of the first embodiment, an image light generation device 100B instead of the image light generation device 100A is provided.

Figure 13:
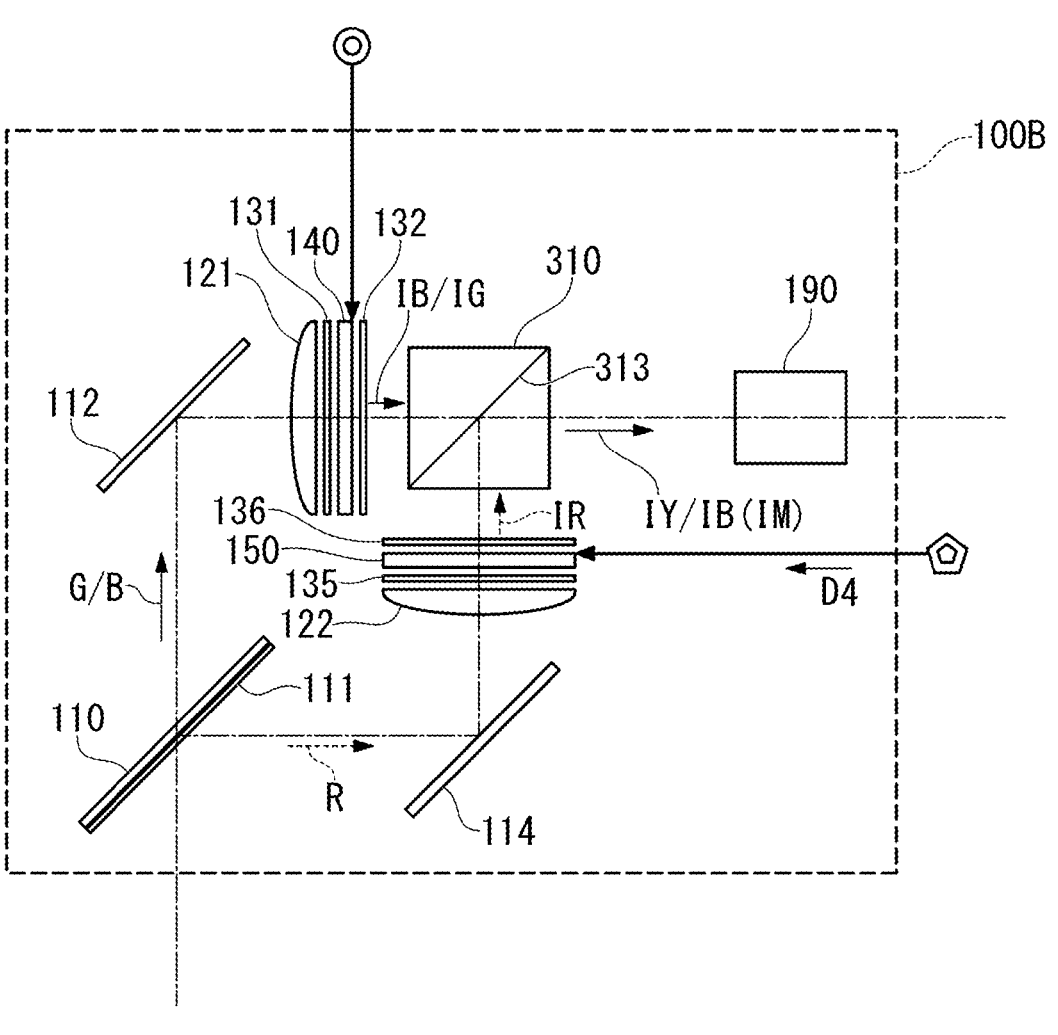
FIG. 13 is a configuration diagram of a modification of an image light generation device of the projector in FIG. 1.

FIG. 13 is a schematic diagram illustrating a configuration of the image light generation device 100B. As illustrated in FIG. 13, the image light generation device 100B may include, instead of the dichroic mirror 180 of the image light generation device 100A, a cube dichroic mirror 310 that outputs the blue image light IB or the green image light IG output from the first liquid crystal panel 140 and the red image light IR to a common optical path. The green image light IG is image light of one color, and the red image light IR is image light of another color.

The cube dichroic mirror 310 or a dichroic prism includes a reflecting layer 313 that transmits the incident blue image light IB or green image light IG and reflects the red image light IR to the same optical path as that of the image light IB or IG. The first modification of the projector 301 has the same function and effect as those of the projector 301.

Although not illustrated, the image light generation device 100B of the projector 301 of the first modification may include, instead of the dichroic mirror 110 of the image light generation device 100A, a cube dichroic mirror that transmits the blue light B and the green light G, of the blue light B or the yellow light Y output from the light source device 10A, and reflects the red light R.

Figure 14:
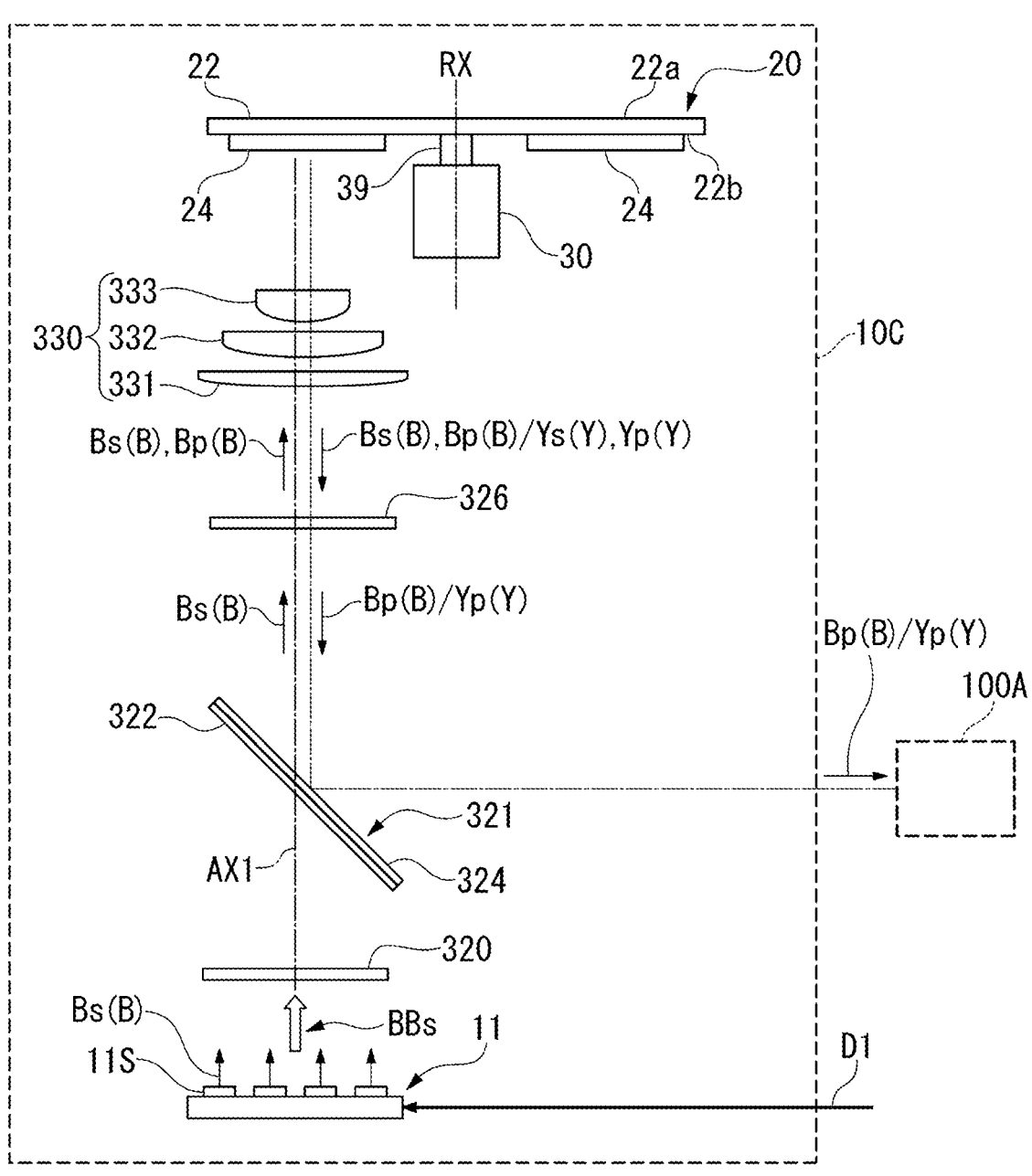
FIG. 14 is a configuration diagram of a modification of the projector in FIG. 1.

A second modification of the projector 301 includes a light source device 10C instead of the light source device 10A. FIG. 14 is a schematic diagram illustrating a configuration of the light source device 10C. As illustrated in FIG. 14, the light source device 10C includes the light source 11, a diffusion plate 320, a polarizing plate 321, a quarter-wave plate 326, a condensing optical system 330, and the rotary fluorescent plate 20.

Each of the plurality of light emitting elements 11S of the light source 11 emits P-polarized blue light Bs as the blue light B. The light source 11 outputs, as the blue light beam BB, an S-polarized blue light beam BBs obtained by collecting the blue light Bs.

The diffusion plate 320 transmits the incident blue light beam BBs, diffuses the blue light beam BBs, and brings light intensity distribution of the blue light beam BBs into a uniform state.

The polarizing plate 321 includes a mirror coating 322, a substrate (not illustrated), and a dichroic mirror 324. The mirror coating 322 is provided on a surface of the substrate of the polarizing plate 321 on which the blue light beam BBs emitted from the diffusion plate 320 is incident. The dichroic mirror 324 is provided on a surface of the substrate of the polarizing plate 321 opposite to the surface on which the mirror coating 322 is provided.

The mirror coating 322 transmits the S-polarized light and reflects the P-polarized light. The substrate of the polarizing plate 321 transmits light in a visible wavelength range. The dichroic mirror 324 transmits the blue light B and reflects the yellow light Y. The blue light beam BBs output from the diffusion plate 320 and incident on the polarizing plate 321 transmits through the mirror coating 322, the substrate (not illustrated), and the dichroic mirror 324.

The condensing optical system 330 is disposed in an optical path of the blue light Bs and Bp between the quarter-wave plate 326 and the rotary fluorescent plate 20, condenses the blue light Bs and Bp emitted from the quarter-wave plate 326, and causes the condensed blue light Bs and Bp to be incident on the fluorescent layer 24 of the rotary fluorescent plate 20. The condensing optical system 330 includes, for example, a first lens 331, a second lens 332, and a third lens 333. Each of the first lens 331, the second lens 332, and the third lens 333 is, for example, a convex lens.

The condensing optical system 330 may include an aspheric lens (not illustrated) in order to sufficiently obtain the effect of bringing light intensity distribution of the blue light Bs and Bp into a uniform state.

The rotary fluorescent plate 20 includes the substrate 22, the fluorescent layer 24, and the motor 30. The rotary fluorescent plate 20 outputs the yellow light Y including the red light R and the green light G toward the same side as the incident side of the blue light Bs and Bp. The fluorescent layer 24 is provided on the back surface 22*b* of the substrate 22. The substrate 22 is made of a material that reflects light in the visible wavelength range including the blue light B and the yellow light Y. Examples of the material of the substrate 22 include stainless steel (SUS).

In the light source device 10B, the substrate 22 that reflects the blue light beam (blue light) B is present without being cut in the angular range RG2 in the circumferential direction centering on the rotation axis RX. In the rotary fluorescent plate 20, the substrate 22 and the motor 30 are disposed with respect to the condensing optical system 330 such that the blue light Bs and Bp emitted from the condensing optical system 330 can be radiated to the fluorescent layer 24 in a region between the rotation axis RX and an outer peripheral edge of the substrate 22 in a radial direction centering on the rotation axis RX.

Although not illustrated, similarly to the light source device 10A, in the light source device 10C, the fluorescence output region 28 is provided in the angular range RG1 in the circumferential direction centering on the rotation axis RX, and is provided in a region including at least a radiation region of the blue light Bs and Bp between the outer peripheral edge and a center or an inner peripheral edge of the substrate 22 in the radial direction centering on the rotation axis RX.

In a first state of the rotary fluorescent plate 20, the blue light beams Bs and Bp, which are blue light output from the condensing optical system 330, are directly incident on the fluorescent layer 24. The fluorescent layer 24 is excited by the incident blue light Bs and Bp, converts a wavelength of the blue light Bs and Bp into that of the yellow light Y, and emits S-polarized and P-polarized yellow light Ys and Yp to a side facing the substrate 22 and a side opposite to the side facing the substrate 22 in a thickness direction of the fluorescent layer 24. The yellow light Ys and Yp emitted from the fluorescent layer 24 toward the substrate 22 is reflected by the substrate 22 and emitted to the side opposite to the side facing the substrate 22. That is, in the first state, as illustrated in FIG. 14, the yellow light Ys and Yp is output from the rotary fluorescent plate 20 to the same side as the incident side of the blue light Bs and Bp with respect to the rotary fluorescent plate 20.

In a second state, the blue light Bs and Bp is radiated to the substrate 22 in the angular range RG2 in the circumferential direction centering on the rotation axis RX, and is reflected by the substrate 22. That is, in the second state, the blue light Bs and Bp is output to the same side as the incident side of the blue light Bs and Bp with respect to the rotary fluorescent plate 20.

The yellow light Ys and Yp or the blue light Bs and Bp output from the rotary fluorescent plate 20 in time series is incident on the quarter-wave plate 326 again, and is converted into the P-polarized yellow light Yp or the P-polarized blue light Bp by the quarter-wave plate 326. The yellow light Yp or the blue light Bp emitted from the quarter-wave plate 326 is incident on the polarizing plate 321. Of the yellow light Yp or the blue light Bp incident on the polarizing plate 321, the yellow light Yp is reflected by the dichroic mirror 324. Of the yellow light Yp or the blue light Bp incident on the polarizing plate 321, the blue light Bp transmits through the dichroic mirror 324 and the substrate (not illustrated), and is reflected by the mirror coating 322 to the same optical path as the optical path of the yellow light Yp. The P-polarized yellow light Yp or the P-polarized blue light Bp is output from the polarizing plate 321 to the image light generation device 100A in time series according to the angular ranges RG1 and RG2.

Similarly to the light source device 10A described in the first embodiment, the light source device 10C having the above-described configuration includes the light emitting elements 11S that output the blue light Bs, and the fluorescent layer 24 that is a wavelength conversion element that performs fluorescent conversion on the blue light Bs output from the light emitting elements 11S to output the yellow light Ys and Yp. The light source device 10B outputs the blue light Bp and the yellow light Yp in time series. The projector 301 including the light source device 10B instead of the light source device 10A has the same function and effect as those of the projector 301 of the first embodiment.

In each of the light source devices 10A and 10C, a region of one turn of the substrate 22 of the rotary fluorescent plate 20 in the circumferential direction centering on the rotation axis RX is partitioned into the fluorescence output region 28 of the angular range RG1 in which the fluorescent layer 24 is disposed to output the yellow light Y and the blue light output region 36 of the angular range RG2 for outputting the blue light B in which the fluorescent layer 24 is not disposed.

As a third modification of the projector 301, a region of one turn of the substrate 22 in the circumferential direction centering on the rotation axis RX may be divided into a plurality of small regions, and each of the small regions may be divided into the fluorescence output region 28 and the blue light output region 36.

Figure 15:
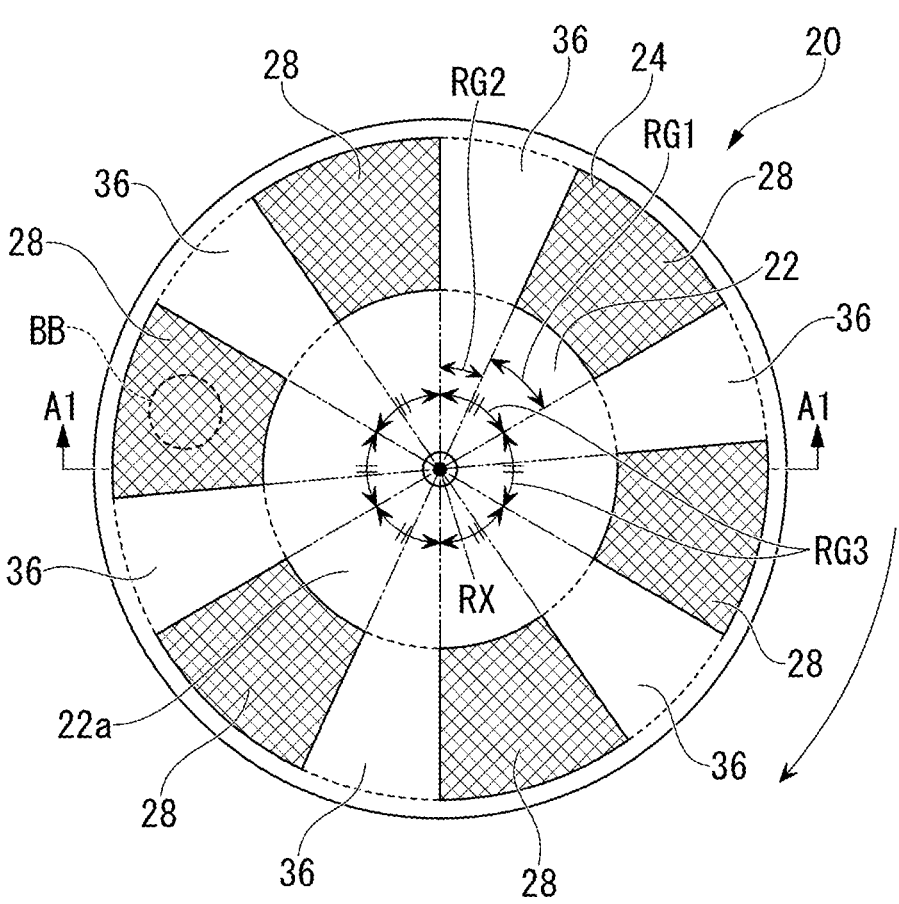
FIG. 15 is a perspective view of a modification of the rotary fluorescent plate of the projector in FIG. 1.

FIG. 15 is a plan view illustrating a configuration of a modification of the rotary fluorescent plate 20 in each of light source devices 10A and 10C. As illustrated in FIG. 15, a region of one turn of the substrate 22 in the circumferential direction centering on the rotation axis RX may be equally divided into a plurality of small regions, and, for example, may be equally divided into six small regions. An angular range RG3 of each small region is 360°/6=60°=π/3 [rad.], and is partitioned into the angular ranges RG1 and RG2. In the angular range RG3 of the small region, the fluorescent layer 24 is provided in the angular range RG1, and the fluorescent layer 24 is not provided in the angular range RG2.

That is, in the small region, in the circumferential direction centering on the rotation axis RX, the fluorescence output region 28 in which the fluorescent layer 24 is provided and the blue light output region 36 through which the blue light B is transmitted are set in a predetermined ratio.

That is, the ratio of the angular range RG1 to the angular range RG2 is set to 3:2 similarly to the example described in the first embodiment, and is set to N1:N2 that is the same as the ratio between the output periods T1 and T2 of the yellow light Y and the blue light B from the rotary fluorescent plate 20. When the ratio between the output periods T1 and T2 is 3:2, the angular range RG1=36°=π/5 [rad.], and the angular range RG2=24°=2π/15 [rad.].

As a result, when the rotary fluorescent plate 20 rotates at the optimum rotation speed ORS corresponding to the rotation control signal C2, the periods of the green light G and the blue light B incident on the first liquid crystal panel 140 with respect to each image, that is, one frame are optimized to 3:2, that is, N1:N2, and the flicker in an image output from the projector 301 is reduced.

When the region of one turn of the substrate 22 in the circumferential direction centering on the rotation axis RX is to be equally divided into Q small regions, the equally dividing number Q is appropriately set such that the ratio between the output periods T1 and T2, that is, the natural numbers N1 and N2, the optimum rotation speed ORS, the drive frequency of the first liquid crystal panel 140 and the second liquid crystal panel 150, that is, the natural number N7, and the frequency of the PWM signal S1 satisfy a predetermined relational expression or condition. Examples of the case where the predetermined relational expression or condition is satisfied include a case where a plurality of parameters have a relationship of an integral multiple as described above.

Figure 16:
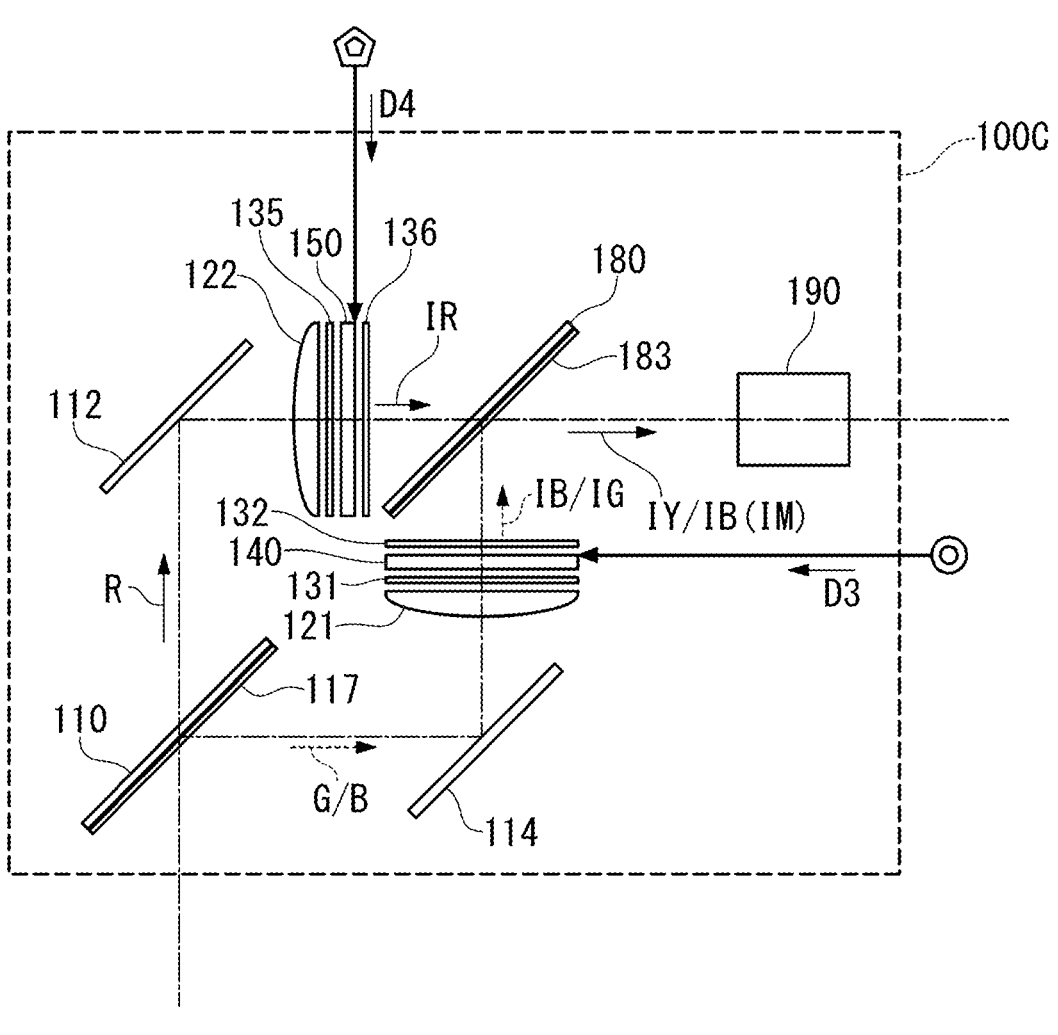
FIG. 16 is a configuration diagram of a modification of the image light generation device of the projector in FIG. 1.

A fourth modification of the projector 301 includes an image light generation device 100C instead of the image light generation device 100A. FIG. 16 is a schematic diagram illustrating a configuration of the image light generation device 100C.

As illustrated in FIG. 16, the image light generation device 100C has the same configuration as the image light generation device 100A. In the image light generation device 100C, the dichroic mirror 110 reflects the blue light B of the incident blue light B or the green light G of the yellow light Y, and transmits the red light R of the yellow light Y. A reflection dichroic coat 117 is applied to a surface of a substrate of the dichroic mirror 110 on an incident side of the blue light B or the yellow light Y. The blue light B or the yellow light Y output from the light source device 10A is incident on the dichroic mirror 110. The blue light B or the green light G of the yellow light Y is reflected by the dichroic mirror 110, or the red light R of the yellow light Y transmits through the dichroic mirror 110 in a direction different from that of the blue light B or the green light G. That is, the dichroic mirror 110 reflects the blue light B output from the light source device 10A, and separates the yellow light Y into the green light G that is light of one color and the red light R that is light of another different color.

The reflecting mirror 112 is disposed in an optical path of the red light R transmitted through the dichroic mirror 110, and reflects the incident red light R toward an image forming region of the second liquid crystal panel 150. The reflecting mirror 114 is disposed in an optical path of the blue light B or the green light G reflected by the dichroic mirror 110, and reflects the incident blue light B or the green light G toward an image forming region of the first liquid crystal panel 140.

The optical path of the red light R reflected by the reflecting mirror 112 and the optical path of the blue light B or the green light G reflected by the reflecting mirror 114 intersect each other at a predetermined position. The dichroic mirror 180 is disposed at the predetermined position described above. The condenser lens 121, the first polarizing plate 131, the first liquid crystal panel 140, and the first polarizing plate 132 are sequentially disposed in the optical path of the blue light B or the green light G between the reflecting mirror 114 and the dichroic mirror 180. The condenser lens 122, the second polarizing plate 135, the second liquid crystal panel 150, and the second polarizing plate 136 are sequentially disposed in the optical path of the red light R between the reflecting mirror 112 and the dichroic mirror 180.

A reflection dichroic coat 183 is applied to a surface of a substrate of the dichroic mirror 180 on an incident side of the blue light IB or the green light IG. The image light IR incident on the dichroic mirror 180 transmits through the dichroic mirror 180. The image light IB or the image light IG incident on the dichroic mirror 180 is reflected to the same optical path as the image light IR by the reflection dichroic coat 183. The dichroic mirror 180 outputs the image light IY and the image light IB to a common optical path in time series. The projector 301 including the image light generation device 100C instead of the image light generation device 100A has the same function and effect as those of the projector 301 of the first embodiment.

Second Embodiment

Hereinafter, a second embodiment of the present disclosure will be described with reference to FIGS. 17 to 20. Hereinafter, regarding configurations of projectors in the second embodiment and the subsequent embodiments, a configuration common to the configuration described in a former embodiment and modifications is assigned with the same reference signs as those of the common configuration, and a description of the common configuration is omitted.

Figure 17:
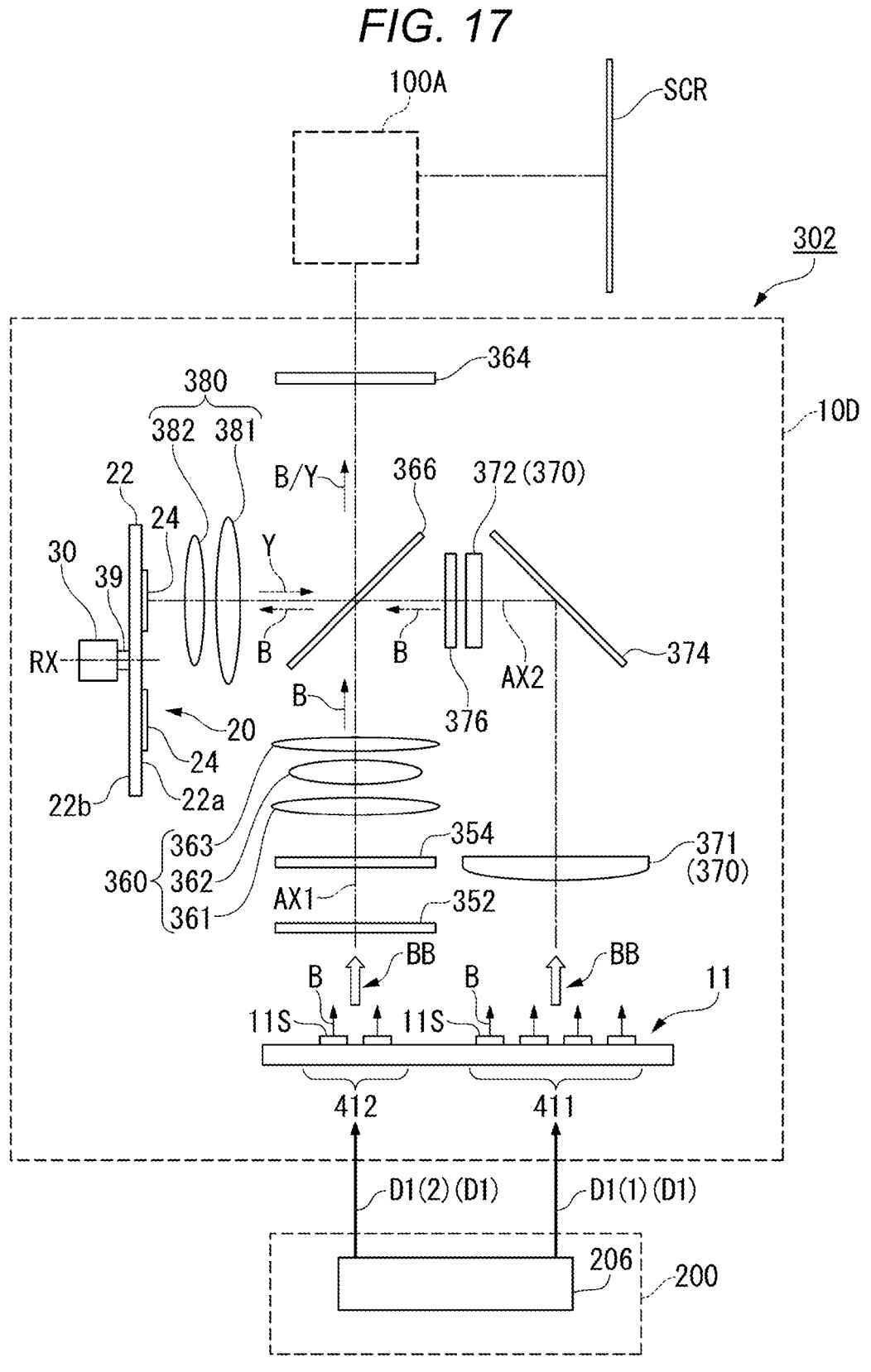
FIG. 17 is a configuration diagram of a projector according to a second embodiment.

FIG. 17 is a schematic diagram illustrating a configuration of a projector 302 according to the second embodiment. As illustrated in FIG. 17, the projector 302 includes a light source device 10D, the image light generation device 100A, and the control device 200. The light source device 10D includes the light source 11, a prism mirror 352, a diffusion element 354, a condensing optical system 360, a dichroic mirror 366, a retardation plate 364, an afocal optical system 370, a reflecting mirror 374, a diffusion element 376, a condensing optical system 380, and the rotary fluorescent plate 20. In FIG. 17, the detailed configuration of the image light generation device 100A and the detailed configuration of the control device 200 other than the light source drive device 206 are omitted.

Among the plurality of light emitting elements 11S provided in the light source 11, a part of the light emitting elements 11S disposed in a first region 411 of a surface of a substrate emit the blue light B for fluorescence conversion into the yellow light Y for generating the yellow image light IY. A part of the light emitting elements 11S disposed in a second region 412 of the surface of the substrate emit the blue light B for generating the blue image light IB. The number of the light emitting elements 11S in the first region 411 and the number of the light emitting elements 11S in the second region 412 are adjusted to a light amount ratio between the yellow light Y and the blude light B output from the light source device 10D, and are appropriately set in accordance with a light emission amount of each light emitting element 11S and a current value [A] supplied by the drive signal D1, as will be described later.

The afocal optical system 370, the reflecting mirror 374, the diffusion element 376, the dichroic mirror 366, the condensing optical system 380, and the rotary fluorescent plate 20 are disposed in an optical path of the blue light B emitted from the plurality of light emitting elements 11S in the first region 411. The afocal optical system 370 collects the blue light B emitted from each of the plurality of light emitting elements 11S in the first region 411 as a blue light beam having an appropriate light beam width. The afocal optical system 370 includes a first lens 371 and a second lens 372. The first lens 371 is implemented by, for example, a convex lens. The second lens 372 is implemented by, for example, two or more combined lenses. The reflecting mirror 374 is disposed in the optical path of the blue light B between the first lens 371 and the second lens 372, and reflects the blue light B emitted from the first lens 371. The diffusion element 376 diffuses the blue light B emitted from second lens 372, and prevents a variation in illuminance in a plane orthogonal to the optical axis AX2 of blue light B reflected by the reflecting mirror 374.

The optical axis AX2 is orthogonal to the optical axis AX1 at a reflecting surface of the dichroic mirror 366. The blue light B emitted from the diffusion element 376 transmits through the dichroic mirror 366 along the optical axis AX2, and is incident on the condensing optical system 380. The condensing optical system 380 condenses the incident blue light B on the fluorescent layer 24 of the rotary fluorescent plate 20. The condensing optical system 380 includes, for example, two condenser lenses 381 and 382. Each of the condenser lenses 381 and 382 is, for example, a convex lens.

The rotary fluorescent plate 20 of the light source device 10D includes the substrate 22, the fluorescent layer 24, and the motor 30. The rotary fluorescent plate 20 outputs the yellow light Y including the red light R and the green light G toward the same side as an incident side of the blue light B. An axis of the motor 30 and the rotation axis RX are parallel to the optical axis AX2 and are disposed at a position different from the optical axis AX2 in a plane orthogonal to the optical axis AX2. The fluorescent layer 24 is provided on the front surface 22a of the substrate 22. The front surface 22a of the substrate 22 faces the incident side of the blue light B condensed by the condensing optical system 360. Similar to the substrate 22 of the rotary fluorescent plate 20 of the light source device 10C, the substrate 22 is made of a material that reflects light in a visible wavelength range including the yellow light Y.

In the light source device 10D, the substrate 22 is present without being cut in the angular range RG2 in the circumferential direction centering on the rotation axis RX. The fluorescent layer 24 is provided on the entire circumference in the circumferential direction centering on the rotation axis RX. The substrate 22 and the motor 30 are disposed with respect to the condensing optical system 380 such that the blue light B condensed by the condensing optical system 380 is radiated to the fluorescent layer 24 in a radial direction centering on the rotation axis RX.

Therefore, when the blue light B is incident on the rotary fluorescent plate 20 rotating about the rotation axis RX, the blue light B is subjected to fluorescence conversion by the fluorescent layer 24, and the yellow light Y is always output from the rotary fluorescent plate 20.

The yellow light Y output from the rotary fluorescent plate 20 is collimated by the condensing optical system 380, travels toward the dichroic mirror 366 along the optical axis AX2, and is incident on the dichroic mirror 366. The dichroic mirror 366 reflects the incident yellow light Y. The yellow light Y or the blue light B emitted from the dichroic mirror 366 is converted into linearly polarized light in a predetermined polarization direction. The linearly polarized light in the predetermined polarization direction is S-polarized light or P-polarized light. The polarization conversion element 60 may be disposed instead of the retardation plate 364.

The blue light B emitted from the plurality of light emitting elements 11S in the second region 412 is collected as a blue light beam by the prism mirror 352. The diffusion element 354, the condensing optical system 360, the dichroic mirror 366, and the retardation plate 364 are disposed in an optical path of the blue light B emitted from the prism mirror 352. The diffusion element 354 diffuses the incident blue light B, and prevents a variation in illuminance of the blue light B in a plane orthogonal to the optical axis AX1. The diffusion element 354 may be rotatable about a rotation axis (not illustrated) parallel to the optical axis AX1. The condensing optical system 360 collimates the blue light B emitted from the diffusion element 354. The condensing optical system 360 includes, for example, three condenser lenses 361 to 363. Each of the condenser lenses 361 to 363 is, for example, a convex lens.

The types and the number of lenses constituting the condensing optical system 360 are appropriately changed so as to collimate the blue light B. The blue light B emitted from the condensing optical system 360 transmits through the dichroic mirror 366 and travels to the same optical path as the optical path of the yellow light Y reflected along the optical axis AX1.

In the light source device 10D, the drive signal D1 for the light emitting elements 11S in the first region 411 of the light source 11 and the drive signal D1 for the light emitting elements 11S in the second region 412 are supplied in time series.

That is, in the display period T0 of each image, the light source drive device 206 of the control device 200 outputs the drive signal D1(1) to the light emitting elements 11S in the first region 411 in the output period T1, and does not output the drive signal to the light emitting elements 11S in the second region 412.

On the other hand, in the display period T0 of each image, the drive signal D1(2) is output to the light emitting elements 11S in the second region 412 in the output period T2, and the drive signal is not output to the light emitting elements 11S in the first region 411.

In this way, by switching the light emitting element 11S to which the drive signals D1(1) and D1(2) are to be supplied, the yellow light Y and the blue light B are output from the light source device 10D in time series.

In the light source device 10D, a rotation speed of the rotary fluorescent plate 20 and a ratio between the output periods T1 and T2 of the yellow light Y and the blue light B are not related to each other. Therefore, the optimum rotation speed ORS of the substrate 22 of the rotary fluorescent plate 20 does not depend on the ratio of the output periods T1 and T2, and may be set to a rotation speed suitable for cooling the fluorescent layer 24. The yellow light Y or the blue light B output from the light source device 10D in time series in accordance with the output periods T1 and T2 is incident on the image light generation device 100A.

The image light generation device 100A of the projector 302 generates the yellow image light IY or the blue image light IB similarly to the image light generation device 100A of the projector 301 of the first embodiment, and displays the image light IY or IB on the screen SCR.

The projector 302 of the second embodiment described above has the same configuration as that of the projector 301 of the first embodiment, and thus has the same function and effect as those of the projector 301.

In addition, the projector 302 of the second embodiment includes the light emitting elements 11S provided in the second region 412 of the light source 11 that output the blue light B without using the rotary fluorescent plate 20 that is a rotary plate. According to the projector 302 of the second embodiment, of the yellow light Y and the blue light B output in time series from the light source device 10D, a light amount of the blue light B is made larger than a light amount of the yellow light Y, and the white balance of an image displayed on the screen SCR can be easily adjusted.

Figure 18:
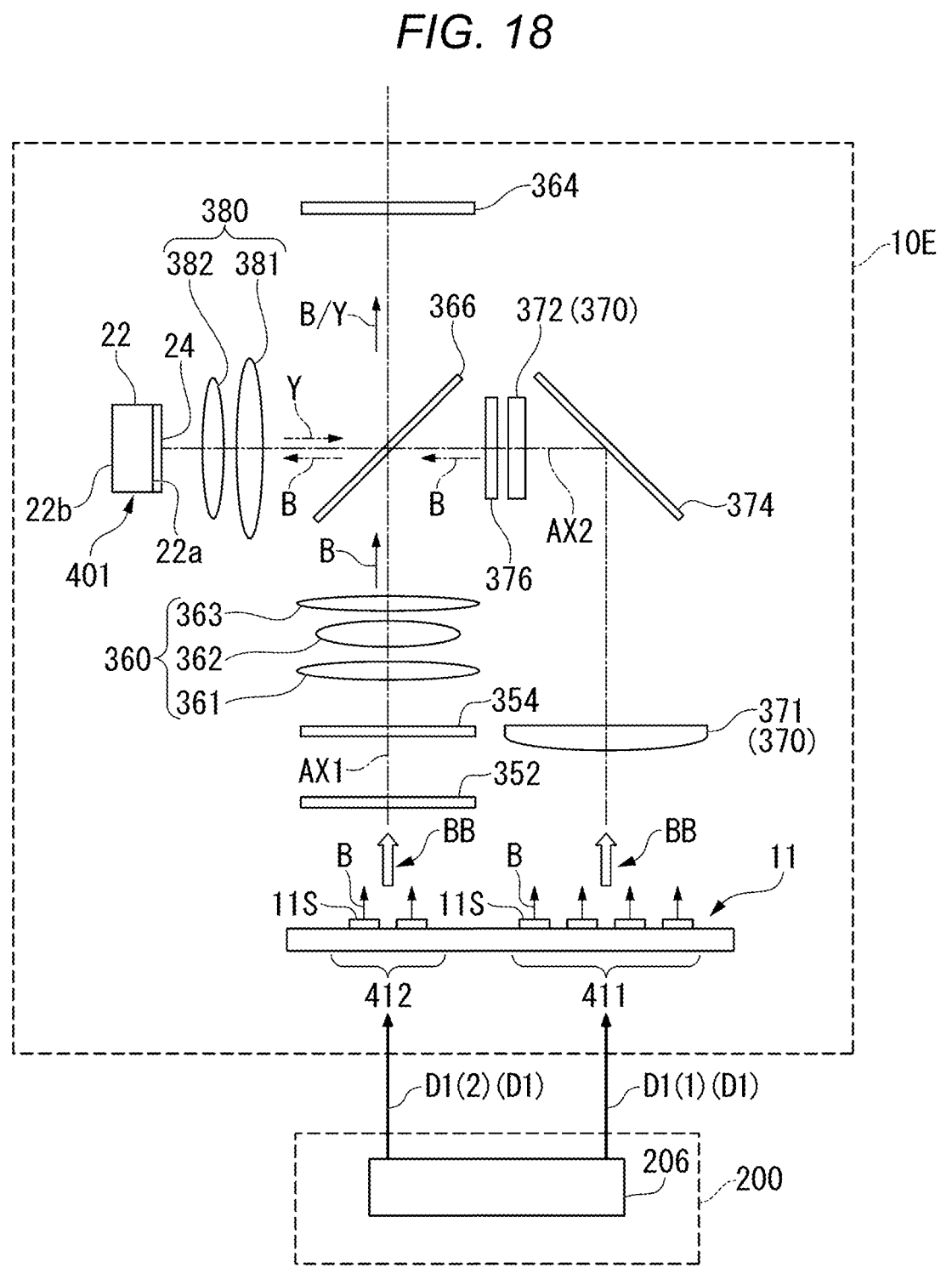

FIG. 18 is a schematic diagram illustrating a configuration of a light source device 10E according to a first modification of the light source device 10D.

The projector 302 of the second embodiment may include the light source device 10E instead of the light source device 10D.

As illustrated in FIG. 18, the light source device 10E includes a fluorescent body 401 instead of the rotary fluorescent plate 20 of the light source device 10D. The fluorescent body 401 includes the substrate 22 and the fluorescent layer 24 laminated on the front surface 22a of the substrate 22.

The fluorescent body 401 does not have a rotation axis, and does not move over time within a period in which a plurality of images are displayed in the projector 301. The fluorescent body 401 outputs the yellow light Y from the condensing optical system 380 toward the same side as an incident side of the blue light B. Since it is not necessary to rotate the fluorescent body 401 as a configuration for fluorescence conversion of the blue light B, a control device of a projector including the light source device 10E may not include the rotary fluorescent plate drive device 208.

Figure 19:
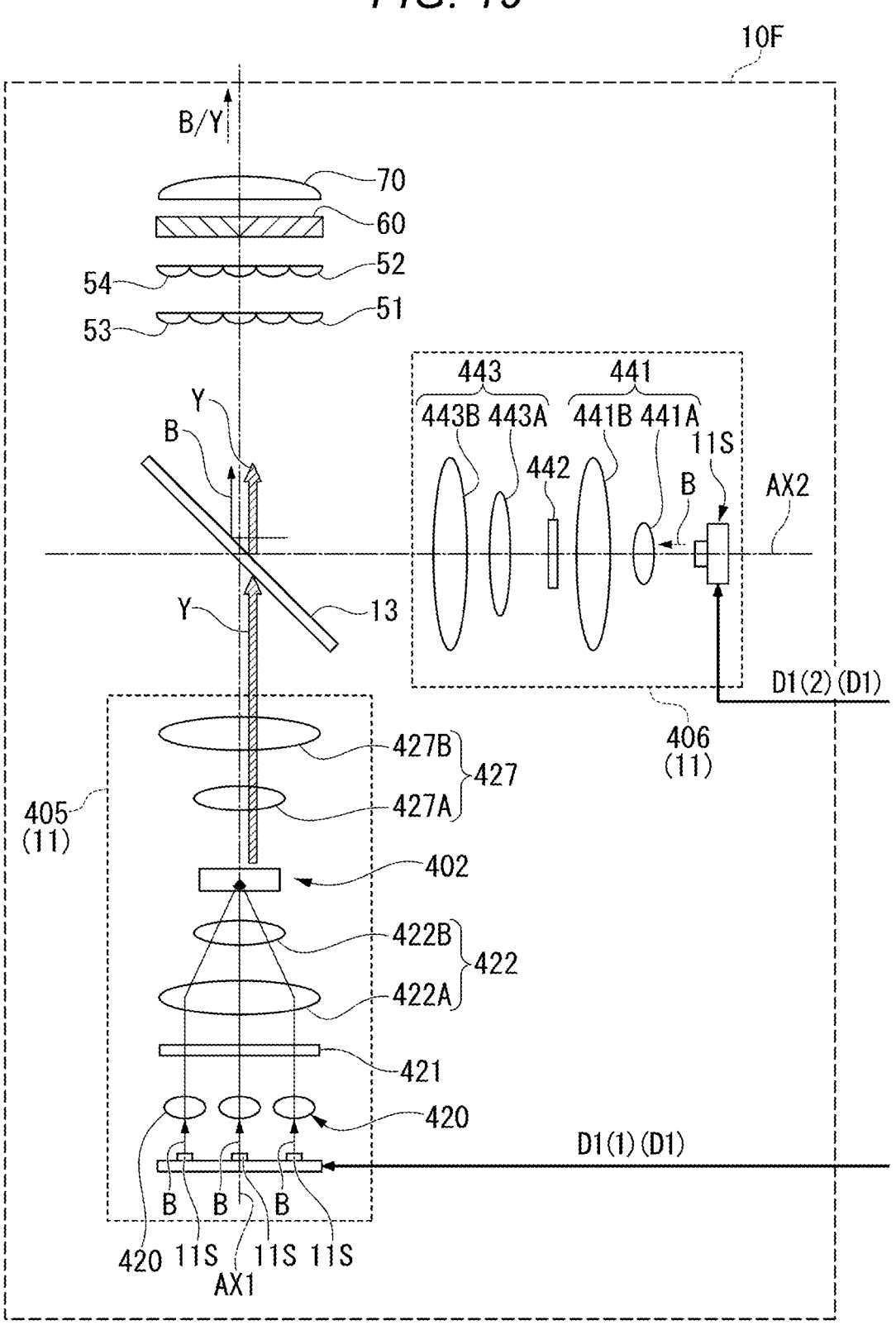
FIG. 19 is a configuration diagram of another modification of the image light generation device of the projector in FIG. 17.

FIG. 19 is a schematic diagram illustrating a configuration of a light source device 10F of a second modification of the light source device 10D.

The projector 302 of the second embodiment may include the light source device 10F instead of the light source device 10D.

As illustrated in FIG. 19, the light source device 10F includes a first light source 405, a second light source 406, a dichroic mirror 13, the first lens array 51, the second lens array 52, the polarization conversion element 60, and the superimposing lens 70. The first light source 405 includes a plurality of light emitting elements 11S that emit the blue light B, a collimating lens 420, a diffusion element 421, a condensing optical system 422, a fluorescent body 402, and a pickup optical system 427.

In the first light source 405, the same number of collimating lenses 420 as that of the light emitting element 11S are disposed ahead in a traveling direction of the blue light B from the light emitting element 11S. The blue light B emitted from each of the plurality of light emitting elements 11S is collimated by the collimating lens 420. The diffusion element 421 is implemented by, for example, a polished glass plate, and diffuses the blue light B emitted from the collimating lens 420. The condensing optical system 422 condenses the blue light B diffused by the diffusion element 421, and causes the condensed blue light B to be incident on the fluorescent body 402. The condensing optical system 422 includes a first lens 422A and a second lens 422B. Each of the first lens 422A and the second lens 422B is, for example, a convex lens. With the fluorescent body 402, the blue light B condensed by the condensing optical system 422 is subjected to fluorescence conversion into the yellow light Y. The fluorescent body 402 is made of the same material as that of the fluorescent layer 24.

The pickup optical system 427 includes a first collimating lens 427A and a second collimating lens 427B. The pickup optical system 427 collimates the yellow light Y emitted from the fluorescent body 402. Each of the first collimating lens 427A and the second collimating lens 427B is, for example, a convex lens.

The second light source 406 includes the light emitting element 11S that emits the blue light B, a condensing optical system 441, a scattering plate 442, and a pickup optical system 443. A collimating lens (not illustrated) is provided ahead in the traveling direction of the blue light B from the light emitting element 11S. The number of the light emitting elements 11S in the second light source 406 is not limited to one as illustrated in FIG. 19, and is appropriately set according to the number of the light emitting elements 11S in the first light source 405 and a light amount of the blue light B from the first light source 405.

The numbers of the light emitting elements 11S in the first light source 405 and the second light source 406 will be described later.

The condensing optical system 441 includes a first lens 441A and a second lens 441B. The condensing optical system 441 condenses the blue light B emitted from the light emitting element 11S of the second light source 406 on the scattering plate 442. Each of the first lens 441A and the second lens 441B is, for example, a convex lens.

The scattering plate 442 scatters the blue light B emitted from the condensing optical system 441, and converts the blue light B into the blue light B having a light distribution similar to a light distribution of the yellow light Y generated by the first light source 405. As the scattering plate 442, for example, polished glass is used.

The pickup optical system 443 includes a first lens 443A and a second lens 443B. The pickup optical system 443 collimates the light emitted from the scattering plate 442. Each of the first lens 443A and the second lens 443B is, for example, a convex lens.

The blue light B from the second light source 406 is reflected by the dichroic mirror 13. The blue light B reflected by the dichroic mirror 13 or the yellow light Y emitted from the first light source 405 and transmitted through the dichroic mirror 13 is incident on the first lens array 51.

The yellow light Y or the blue light B incident on the first lens array 51 of the light source device 10F behaves in the same manner as the yellow light Y or the blue light B incident on the first lens array 51 of the light source device 10A of the first embodiment.

In the light source device 10F, the drive signal D1 for the light emitting elements 11S of the first light source 405 and the drive signal D1 for the light emitting element 11S of the second light source 406 are supplied in time series.

That is, the light source drive device 206 of the control device 200 outputs the drive signal D1(1) to the light emitting elements 11S of the first light source 405 and does not output the drive signal to the light emitting element 11S of the second light source 406 in the output period T1 in the display period T0 of each image.

On the other hand, in the display period T0 of each image, in the output period T2, the drive signal D1(2) is output to the light emitting element 11S of the second light source 406, and the drive signal is not output to the light emitting elements 11S of the first light source 405.

In this way, by switching the light emitting element 11S to which the drive signals D1(1) and D1(2) are to be supplied, the yellow light Y and the blue light B are output from the light source device 10F in time series.

Figure 20:
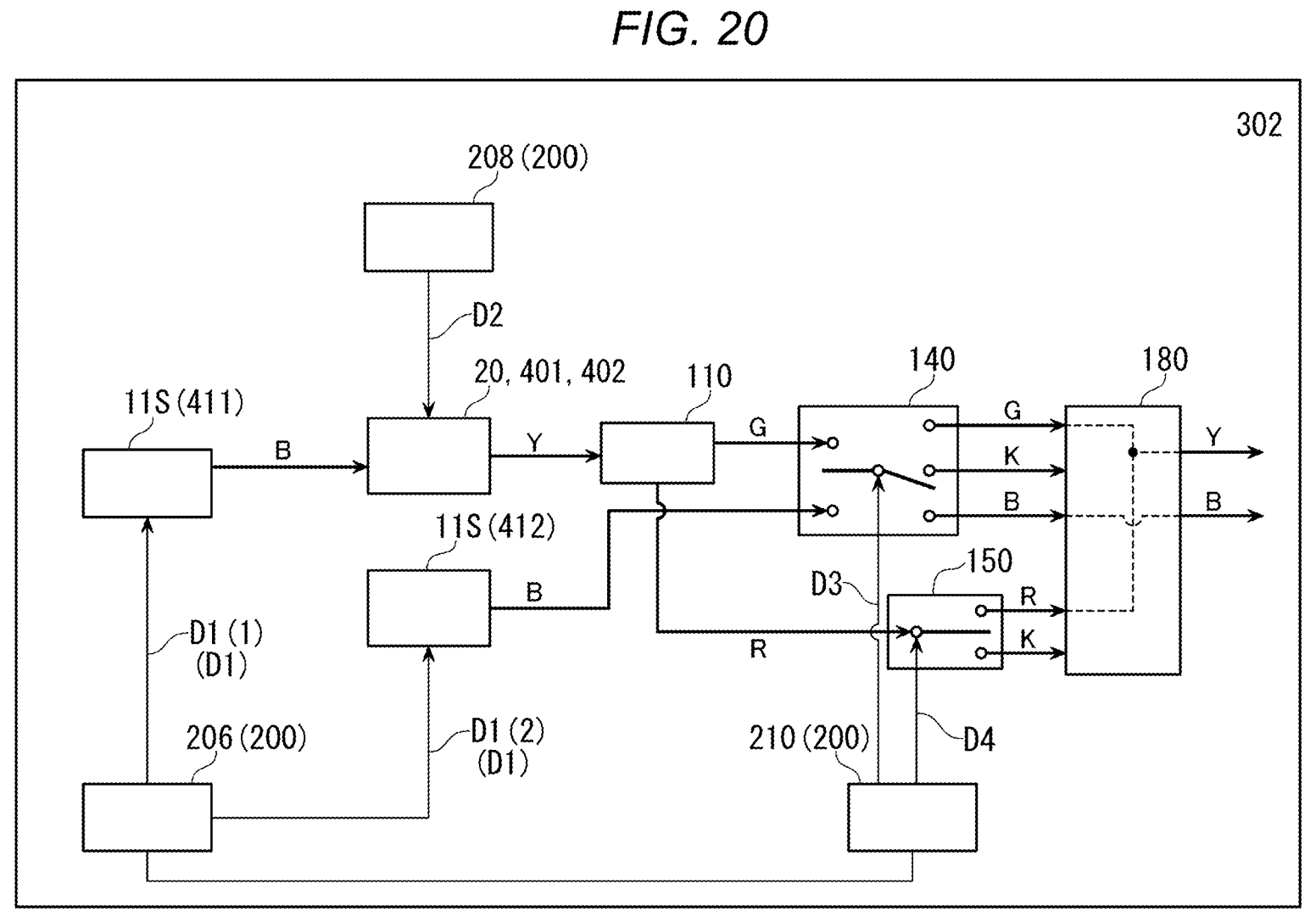

FIG. 20 is a block diagram of the projector 302 of the second embodiment including the light source device 10D.

As illustrated in FIG. 20, in the projector 302 of the second embodiment including the light source device 10D, the drive signal D1(1) is supplied from the light source drive device 206 of the control device 200 to the light emitting elements 11S in the first region 411 of the light source device 10D in the output period T1, and the drive signal D1(2) is supplied from the light source drive device 206 of the control device 200 to the light emitting elements 11S in the second region 412 of the light source device 10D in the output period T2.

The drive signal D2 is supplied to the rotary fluorescent plate 20 while the drive signal D1(1) is being supplied from the rotary fluorescent plate drive device 208 to at least the light emitting elements 11S in the first region 411 in the output period T1. The drive signal D2 causes the substrate 22 of the rotary fluorescent plate 20 to rotate at a rotation speed at which the fluorescent layer 24 is appropriately cooled when the substrate 22 rotates about the rotation axis RX.

In the projector 302 of the second embodiment including the light source device 10D, the drive signal D1 output from the light source drive device 206 and the drive signal D3 output from the liquid crystal drive device 210 are synchronized with each other.

In the projector 302 including any one of the light source devices 10E and 10F instead of the light source device 10D described above, a wavelength conversion element that subjects the blue light B to fluorescence conversion into the yellow light Y is one that does not move over time, and is the fluorescent layer 24 or the fluorescent body 402.

In the projector 302 including the light source device 10E, among the plurality of light emitting elements 11S of the light source 11, the light emitting elements 11S provided in the second region 412 can output the blue light B without using the fluorescent layer 24 of the fluorescent body 401.

In the projector 302 including the light source device 10F, among the plurality of light emitting elements 11S provided in the first light source 405 and the second light source 406, the light emitting element 11S provided in the second light source 406 can output the blue light B without using the fluorescent body 402.

According to the projector 302 including any one of the light source devices 10E and 10F, the optical device can have a simpler configuration than in the case of using the rotary fluorescent plate 20. In addition, according to the projector 302 including any one of the light source devices 10E and 10F, it is only necessary to synchronize the light source 11 with the first liquid crystal panel 140 and the second liquid crystal panel, and it is not necessary to detect a position of the substrate 22 in the circumferential direction centering on the rotation axis RX of the rotary fluorescent plate 20, and it is possible to reduce a load of the control device 200.

In the projector 302 including any one of the light source devices 10E and 10F, as described in the first embodiment, the light amount ratio between the yellow light Y in the output period T1 and the blue light B in the output period T2 is adjusted to, for example, 2:1 in accordance with N9:N10 in order to achieve the optimum white balance of an image displayed on the screen SCR.

In the projector 302 including the light source device 10E, for example, when the number of the light emitting elements 11S in the first region 411 and the number of the light emitting elements 11S in the second region 412 of the light source device 10E are the same as each other, the PWM signal S1 of a high level having a duty ratio of 100% is supplied to the light emitting elements 11S in the first region 411 in the output period T1, similarly to the projector 301 of the first embodiment. In the output period T2, the PWM signal S1 of a high level having a duty ratio of 50% is supplied to the light emitting elements 11S in the first region 411.

That is, in the output period T1, the light emitting elements 11S in the first region 411 are in a turned-on state of being driven by the current value i1, and the light emitting elements 11S in the second region 412 are in a turned-off state. In the output period T2, the light emitting elements 11S in the second region 412 are in the turned-on state of being driven by the current value i2, and the light emitting elements 11S in the first region 411 are in the turned-off state. As described above, $i2=I1\times\{(N3\times N10)/(N4\times N9)\}$.

In the projector 302 including the light source device 10E, the light amount ratio between the yellow light Y in the output period T1 and the blue light B in the output period T2 may be controlled by adjusting the number of the light emitting elements 11S in the first region 411 and the number of the light emitting elements 11S in the second region 412.

For example, in a case where output intensities of the plurality of light emitting elements 11S are equal to each other when the drive signal having the same current value is supplied to each of the plurality of light emitting elements 11S, a ratio of the number of the light emitting elements 11S in the first region 411 to the number of the light emitting elements 11S in the second region 412 is 1: $\{(N3\times N10)/(N4\times N9)\}=(N4\times N9):(N3\times N10)$, and is set to, for example, 2:1.

As a result, the number of the light emitting elements 11S in the first region 411 and the second region 412 is preferably determined according to a ratio between an output intensity I1 of the light emitting elements 11S in the first region 411 and an output intensity 12 of the light emitting elements 11S in the second region 412.

Similarly to the projector 302 including the light source device 10E, in the projector 302 including the light source device 10F, for example, when output intensities of the plurality of light emitting elements 11S are equal to each other when the drive signal having the same current value is supplied to each of the plurality of light emitting elements 11S, a ratio of the number of the light emitting elements 11S in the first light source 405 to the number of the light emitting elements 11S in the second light source 406 is 1:$\{(N3\times N10)/(N4\times N9)\}=(N4\times N9):(N3\times N10)$. For example, the ratio is set to 2:1.

As a result, the number of the light emitting elements 11S in the first light source 405 and the second light source 406 is preferably determined in accordance with a ratio between the output intensity I1 of the light emitting elements 11S of the first light source 405 and the output intensity 12 of the light emitting elements 11S of the second light source 406.

At least one modification described in the first embodiment can be appropriately applied to the projector 302 of the second embodiment.

Third Embodiment

Hereinafter, a third embodiment of the present disclosure will be described with reference to FIGS. 21 to 23.

Figure 21:
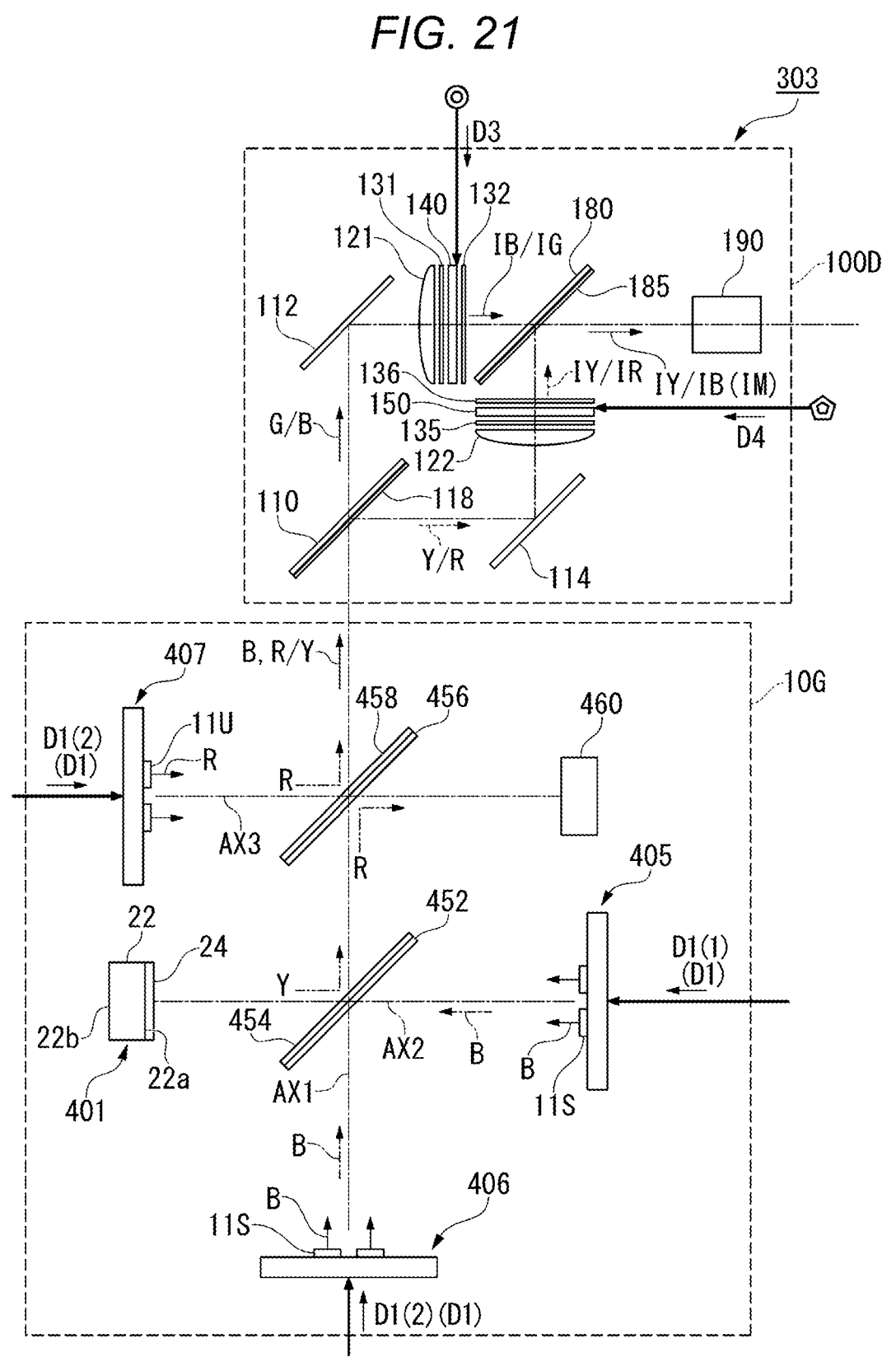

FIG. 21 is a schematic diagram illustrating a configuration of the projector 303 of the third embodiment.

As illustrated in FIG. 21, the projector 303 of the third embodiment includes a light source device 10G, an image light generation device 100D, and the control device 200. In FIG. 21, illustration of the configuration of the control device 200 is omitted, and only the drive signals D1 to D4 supplied from the control device 200 to the light source device 10G and the image light generation device 100D are illustrated.

The light source device 10G includes the first light source 405, the second light source 406, a third light source 407, the fluorescent body 401, dichroic mirrors 452 and 456, and a light absorber 460. The first light source 405 includes a plurality of light emitting elements 11S. Each of the light emitting elements 11S of the first light source 405 emits the blue light B as excitation light for generating the yellow light Y by fluorescence conversion. The second light source 406 includes a plurality of light emitting elements 11S. Each of the light emitting elements 11S of the second light source 406 emits the blue light B output from the light source device 10G.

The dichroic mirror 452 is provided at a position where the optical axis AX2 of the blue light B output from the first light source 405 and the optical axis AX1 of the blue light B output from the second light source 406 are orthogonal to each other. The dichroic mirror 452 transmits the incident blue light B and reflects the yellow light Y. In the dichroic mirror 452, a reflection dichroic coat 454 that reflects the yellow light Y and transmits colored light other than the yellow light Y is applied to a surface of a substrate on a side opposite to an incident side of the blue light B, that is, on an incident side of the yellow light Y. The blue light B output from the first light source 405 is incident on the dichroic mirror 452 along the optical axis AX2, and transmits through the dichroic mirror 452. The blue light B output from the second light source 406 is incident on the dichroic mirror 452 along the optical axis AX1, and transmits through the dichroic mirror 452.

The fluorescent body 401 is disposed in an optical path of the blue light B emitted from the dichroic mirror 452 along the optical axis AX2. The fluorescent layer 24 of the fluorescent body 401 is directed toward the incident side of the blue light B emitted from the dichroic mirror 452. The blue light B incident on the fluorescent body 401 from the first light source 405 is subjected to fluorescence conversion of the fluorescent layer 24 of the fluorescent body 401 to generate the yellow light Y.

Of the yellow light Y generated by the fluorescence conversion, the yellow light Y traveling parallel to and in an opposite direction to the blue light B incident on the fluorescent body 401 is emitted from the fluorescent body 401 as it is. Of the yellow light Y generated by the fluorescence conversion, the yellow light Y generated in parallel and in the same direction as the blue light B incident on the fluorescent body 401 is reflected by the substrate 22 and emitted from the fluorescent body 401.

The yellow light Y emitted from the fluorescent body 401 is incident on the dichroic mirror 452, and is reflected by the reflection dichroic coat 454 in a direction different from directions in which the blue light B is incident on the dichroic mirror 452 from the first light source 405 and the second light source 406.

The dichroic mirror 456 is disposed in the optical path of the blue light B output from the second light source 406 and transmitted through the dichroic mirror 452, or in the optical path of the yellow light Y reflected by the dichroic mirror 452. A reflection dichroic coat 458 is applied to a surface of a substrate of the dichroic mirror 456 on a side opposite to an incident side of the yellow light Y or the blue light B, that is, an incident side of the red light R. The reflection dichroic coat 458 reflects red light and transmits colored light having a wavelength other than that of the red light.

The third light source 407 includes a plurality of light emitting elements 11U. The light emitting element 11U is an LD capable of emitting the red light R output from the light source device 10G. A peak wavelength of an emission intensity of the red light R is included in a wavelength band of 620 nm to 700 nm, for example. An optical axis AX3 of the red light R output from the third light source 407 is orthogonal to the optical axis AX1 at a position different from the optical axis AX2. The dichroic mirror 456 is disposed at a position where the optical axis AX1 and the optical axis AX3 are orthogonal to each other. The light absorber 460 is disposed on the optical axis AX3 on a side opposite to the third light source 407 with respect to the dichroic mirror 456.

The blue light B output from the second light source 406 and transmitted through the dichroic mirror 452 transmits through the dichroic mirror 456 and is output from the light source device 10G along the optical axis AX1. The blue light B output from the first light source 405 and transmitted through the dichroic mirror 452 is incident on the fluorescent body 401 along the optical axis AX2. The yellow light Y output from the fluorescent body 401 and reflected by the dichroic mirror 452 is incident on the dichroic mirror 456. Of the yellow light Y, red light caused by YAG constituting the fluorescent layer 24 is reflected toward the light absorber 460 by the reflection dichroic coat 458 of the dichroic mirror 456. The light absorber 460 absorbs the red light caused by the material of the fluorescent layer 24 and reflected by the dichroic mirror 456.

Of the yellow light Y output from the fluorescent body 401, the red light caused by the material of the fluorescent layer 24 is removed by the light absorber 460 by being radiated thereto via the dichroic mirrors 452 and 456. That is, the red light caused by YAG constituting the fluorescent layer 24 is removed from the yellow light Y that is emitted from the fluorescent body 401 and radiated to the light absorber 460.

Therefore, a reflection characteristic of the dichroic mirror 456 is appropriately set according to the material of the fluorescent layer 24.

The red light R output from the third light source 407 is reflected by the reflection dichroic coat 458 of the dichroic mirror 456 to the same optical path as the blue light B or the yellow light Y from which the red light is removed.

In the light source device 10G, the drive signal D1(1) is supplied to the first light source 405 in the output period T1 in the holding period T10 of a plurality of images, and the drive signal D1(2) is supplied to the second light source 406 and the third light source 407 in the output period T2.

Therefore, the yellow light Y from which the red light caused by the material of the fluorescent layer 24 is removed, the blue light B, and the red light are output from the light source device 10G in time series in the output periods T1 and T2. Hereinafter, the yellow light Y from which the red light caused by the material of the fluorescent layer 24 is removed may be simply referred to as yellow light Y.

The light source device 10G may include, in optical paths of the blue light B, the yellow light Y and the red light R, a lens or an optical system (not illustrated) for collimating or condensing light, a diffusion element (not illustrated) for diffusing light, and an optical system (not illustrated) for bringing the intensity of light into a uniform state.

The image light generation device 100D has the same configuration as the image light generation device 100A. In the image light generation device 100D, the yellow light Y, the red light R, and the blue light B are incident on the dichroic mirror 110 in time series. A reflection dichroic coat 118 is applied to a surface of a substrate of the dichroic mirror 110 on an incident side of the above colored light. The reflection dichroic coat 118 transmits colored light having a wavelength equal to or shorter than a threshold wavelength and reflects colored light having a wavelength longer than the threshold wavelength. The reflection dichroic coat 118 is a long-pass filter that reflects light having a wavelength longer than the threshold wavelength. The threshold wavelength is a wavelength belonging to the yellow light, and is, for example, 570 nm. In the following description, the yellow light Y having a wavelength longer than the threshold wavelength may be simply referred to as yellow light Y.

The yellow light Y or the blue light B and the red light R output from the light source device 10G are incident on the dichroic mirror 110. Of the incident colored light, the blue light B or the green light G transmits through the dichroic mirror 110, and the yellow light Y and the red light R are reflected by the dichroic mirror 110 in a direction different from that of the blue light B or the green light G.

That is, the yellow light Y or the blue light B and the red light R output from the light source device 10G are branched into the blue light B or the green light G and the yellow light Y or the red light R by the dichroic mirror 110.

The first liquid crystal panel 140 modulates the green light G or the blue light B emitted from the condenser lens 121 and incident thereon in accordance with an image signal related to green or an image signal related to blue received from the control device 200, and generates and outputs the green image light IG or the blue image light IB. The generation of the image light IB and IG will be described in detail later.

The second liquid crystal panel 150 modulates the yellow light Y or the red light R emitted from the condenser lens 122 and incident thereon in accordance with an image signal related to yellow or an image signal related to red received from the outside, and generates and outputs the yellow image light IY or the red image light IR. The generation of the image light IY and IR will be described in detail later.

The dichroic mirror 180 transmits the incident green image light IG or blue image light IB, and reflects the yellow image light IY or red image light IR. A reflection dichroic coat 185 is applied to a surface of a substrate of the dichroic mirror 180 on an incident side of the yellow image light IY or the red image light IR. The green image light IG or the blue image light IB emitted from the first polarizing plate 132 and the yellow image light IY or the red image light IR emitted from the second polarizing plate 136 are incident on the dichroic mirror 180. The image light IB or the image light IG incident on the dichroic mirror 180 transmits through the dichroic mirror 180. The image light IY and IR incident on the dichroic mirror 180 is reflected by the reflection dichroic coat 185 to the same optical paths as the image light IB and IG.

That is, the image light IG output from the first liquid crystal panel 140 and the image light IY output from the second liquid crystal panel 150 are synthesized with each other by the dichroic mirror 180 to generate image light (IG+IY). The image light IB output from the first liquid crystal panel 140 and the image light IR output from the second liquid crystal panel 150 are synthesized with each other by the dichroic mirror 180 to generate image light (IB+IR). In the following description, the image light (IY+IG) or the image light (IB+IR) may be collectively referred to as the image light IM.

Figure 22:
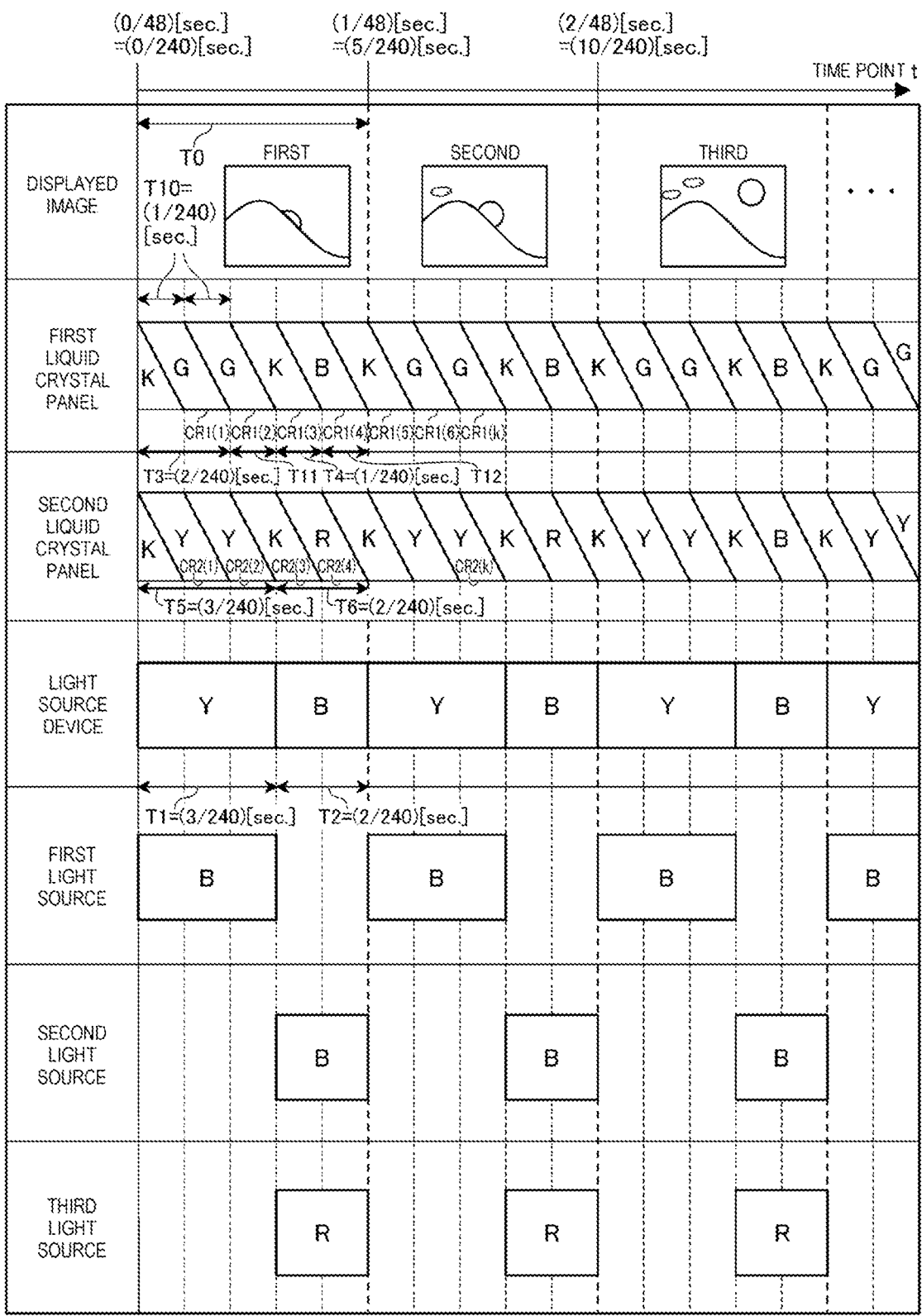
FIG. 22 is a timing chart illustrating signals used in the projector in FIG. 21, and blue light, yellow light, and red light emitted from a light source device.

FIG. 22 is a timing chart of the blue light B and the red light R or the yellow light Y emitted from the light source device 10G, the image light IG or the image light IB output from the first liquid crystal panel 140, and the image light IY or the image light IR output from the second liquid crystal panel 150 in the projector 303 of the third embodiment. Here, it is assumed that various ratios and conditions in the projector 303 are set in the same manner as in the projector 301.

As illustrated in FIG. 22, the display period T0 necessary for displaying one image is $\frac{1}{48}$ [sec.]=$\frac{5}{240}$ [sec.] based on a frame frequency and a frame rate.

In the display period T0 in which each image is displayed from the projector 301, in the output period T1, the control device 200 outputs the drive signal D1 to the first light source 405 to cause the first light source 405 to output the blue light B, and causes the light source device 10G to output the yellow light Y.

In the output period T2 of the display period T0, the control device 200 outputs the drive signal D1 to the second light source 406 and the third light source 407 to cause the second light source 406 to output the blue light B and the third light source 407 to output the red light R, and causes the light source device 10G to output the blue light B and the red light R.

It is assumed that the settings in the projector 303 of the third embodiment are as follows. For example, N3 to N10 below are any set natural numbers.

Ratio between display periods T3 and T4 of green image light IG and blue image light IB in pixels 144 of first liquid crystal panel 140 in each image . . . N3:N4

Ratio between periods T5 and T6 of yellow light Y and blue light B emitted from rotary fluorescent plate 20 . . . N5:N6

Drive frequency of first liquid crystal panel 140 and second liquid crystal panel 150 . . . N7 [Hz]=(1/N7) [sec.]

Frame frequency and frame rate of image output from projection optical system 190 . . . N8 [Hz]=(1/N8) [sec.], N8 [fps]

Light amount ratio between yellow image light IY and blue image light IB from dichroic mirror 180 based on white balance . . . N9:N10

According to the setting of the frame frequency of the image, the drive frequency of each of the first liquid crystal panel 140 and the second liquid crystal panel 150, and the setting of the ratio between the display periods T3 and T4, T1=$\frac{3}{240}$ [sec.] and T2=$\frac{2}{240}$ [sec.].

In the display period T0 of each of the plurality of images displayed from the projector 301, the light source drive device 206 of the control device 200 outputs the drive signal D1(1) for emitting the blue light B having the predetermined light intensity I1 to the first light source 405 in the output period T1=$\{(N7/N8)/N7\}\times\{(N5+1)/(N5+N6+2)\}$=$\frac{3}{240}$ [sec.].

In the output period T2=$\{(N7/N8)/N7\}\times\{(N6+1)/(N5+N6+2)\}$=$\frac{2}{240}$ [sec.] subsequent to the output period T1, the light source drive device 206 outputs the drive signal D1(2) for emitting the blue light B having the light intensity I2=I1×$\{(N3\times N10)/(N4\times N9)\}$ to the second light source 406. The light source drive device 206 supplies the drive signal D1(2) to the third light source 407 at the same timing as the timing at which the drive signal D1(2) is supplied to the second light source 406. The drive signals D1(1) and D1(2) are output to the light source 11 in time series in the output periods T1 and T2.

The yellow light Y output from the light source device 10G in the output period T1 is separated into the green light G and the yellow light Y by the dichroic mirror 110 as described above. The separated green light G is input to the first liquid crystal panel 140, and the separated yellow light Y is input to the second liquid crystal panel 150.

The blue light B and the red light R output from the light source device 10G in the output period T2 are separated from each other by the dichroic mirror 110 as described above. The separated blue light B is input to the first liquid crystal panel 140, and the separated red light R is input to the second liquid crystal panel 150.

The liquid crystal drive device 210 of the control device 200 outputs the drive signal D3(1) to the first liquid crystal panel 140 in the period $T5=\frac{3}{240}$ [sec.] in synchronization with the output period T1. The remaining pixels 144 other than the pixel 144 (1, 1) are scanned with the drive signal D3(1), and in accordance with the drive signal D3(1), the green light G incident on each pixel 144 in the display period $T3=\{(N7/N8)/N7\}\times\{N5/(N5+N6+2)\}$ [sec.]$=(\frac{2}{240})$ [sec.] is modulated and the image light IG is output from each pixel 144.

Next, the liquid crystal drive device 210 outputs the drive signal D3(2) to the first liquid crystal panel 140. The remaining pixels 144 other than the pixel 144 (1, 1) are scanned sequentially with the drive signal D3(2), and each pixel 144 displays black in the shortest period $\{(N7/N8)/N7\}\times\{1/(N5+N6+2)\}$ [sec.]$=\frac{1}{240}$ [sec.] according to the drive signal D3(2).

Next, the liquid crystal drive device 210 of the control device 200 outputs the drive signal D3(3) to the first liquid crystal panel 140 in the period T6=T2 in synchronization with the output period T2. The remaining pixels 144 other than the pixel 144 (1, 1) are scanned sequentially with the drive signal D3(3), and in accordance with the drive signal D3(3), the green light G incident on each pixel 144 in the display period T4 is modulated and the image light IG is output from each pixel 144. Subsequently, the liquid crystal drive device 210 outputs the drive signal D3(4) to the first liquid crystal panel 140. The remaining pixels 144 other than the pixel 144 (1, 1) are scanned sequentially with the drive signal D3(4), and each pixel 144 displays black in the shortest period according to the drive signal D3(4).

The liquid crystal drive device 210 of the control device 200 outputs the drive signal D4(1) to the second liquid crystal panel 150 in the period T5 in synchronization with the output period T1. The remaining pixels 154 other than the pixel 154 (1, 1) are scanned sequentially with the drive signal D4(1), and in accordance with the drive signal D4(1), the yellow light Y incident on each pixel 154 in the display period T3 is modulated and the image light IY is output from each pixel 154.

Next, the liquid crystal drive device 210 outputs the drive signal D4(2) to the second liquid crystal panel 150. The remaining pixels 154 other than the pixel 154 (1, 1) are sequentially scanned with the drive signal D4(2), and each pixel 154 displays black in the shortest period according to the drive signal D4(2).

Next, the liquid crystal drive device 210 outputs the drive signal D4(3) to the second liquid crystal panel 150. The remaining pixels 154 other than the pixel 154 (1, 1) are scanned sequentially with the drive signal D4(3), and in accordance with the drive signal D4(3), the red light R incident on each pixel 154 in the display period T4 is modulated and the image light IR is output from each pixel 154. Subsequently, the liquid crystal drive device 210 outputs the drive signal D4(4) to the second liquid crystal panel 150. The remaining pixels 154 other than the pixel 154 (1, 1) are sequentially scanned with the drive signal D4(4), and each pixel 154 displays black in the shortest period according to the drive signal D4(4).

As described above, the drive signal D1(1) is output from the light source drive device 206 of the control device 200 to the first light source 405, and the drive signal D1(2) is output to the second light source 406 and the third light source 407. In addition, as described above, the liquid crystal drive device 210 causes a timing of the drive signal D3 (p) and a timing of the drive signal D4 (p) (p=1 to 4) to coincide with each other in the display period T0 of each image displayed from the projector 301.

The drive signals D3(1) and D3(2) are sequentially output from the liquid crystal drive device 210 to the first liquid crystal panel 140 in synchronization with the drive signal D1(1), and the drive signals D4(1) and D4(2) are sequentially input to the second liquid crystal panel 150 in synchronization with the drive signal D1(1). The drive signals D3(3) and D3(4) are sequentially output from the liquid crystal drive device 210 to the first liquid crystal panel 140 in synchronization with the drive signal D1(2), and the drive signals D4(3) and D4(4) are sequentially input to the second liquid crystal panel 150 in synchronization with the drive signal D1(2).

As a result, the image light (IB+IY) and the image light (IB+IR) are output from the image light generation device 100D in time series at timings and light amounts optimized according to the various ratios and the various setting values described above, the occurrence of color mixture in the full-color image light is prevented, and the full-color image light can be observed on the screen SCR.

Figure 23:
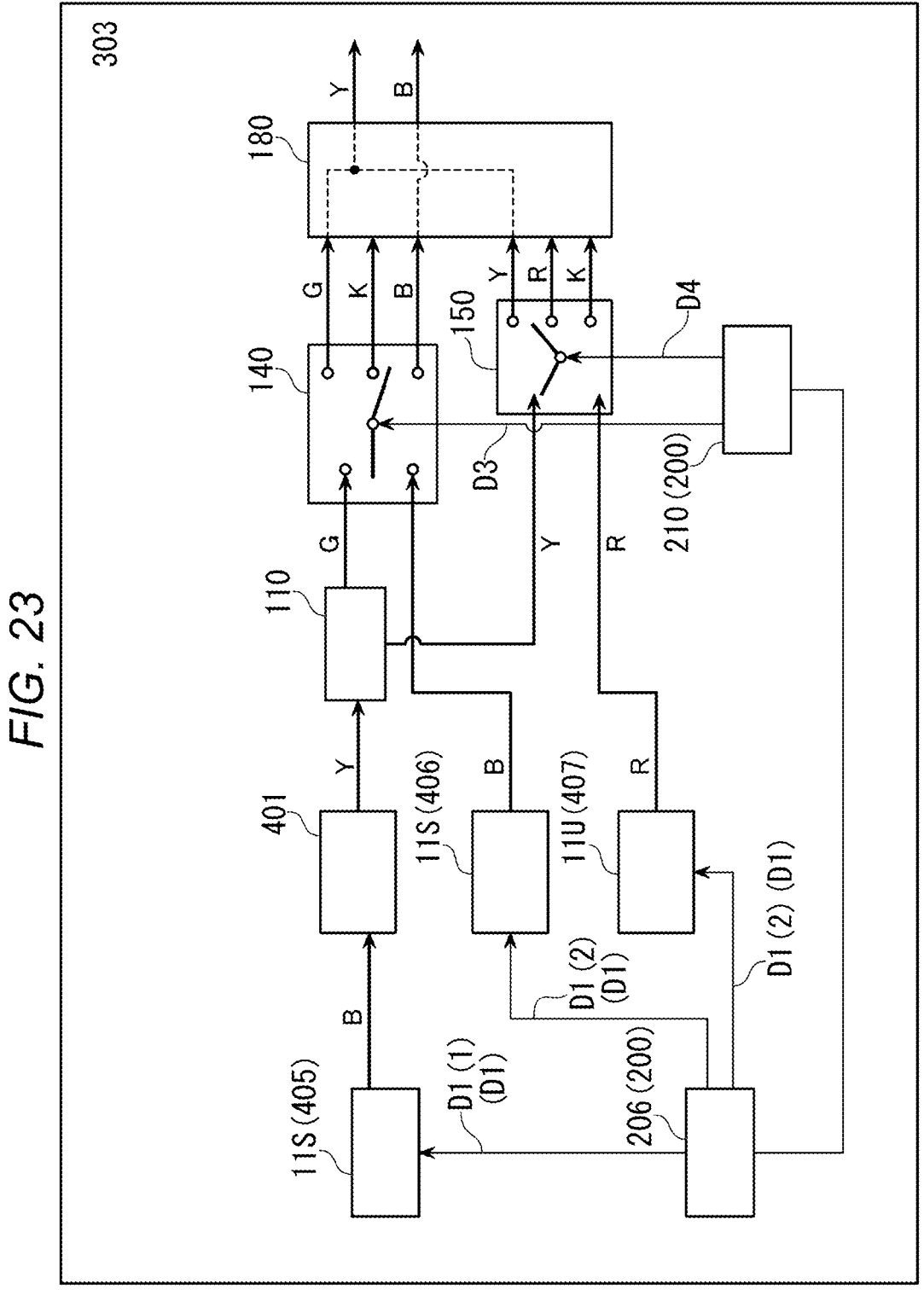
FIG. 23 is a block diagram of the projector in FIG. 21.

FIG. 23 is a block diagram of the projector 303 of the third embodiment. As illustrated in FIG. 23, in the projector 303 of the third embodiment, from the light source drive device 206 of the control device 200, the drive signal D1(1) is supplied to the light emitting element 11S of the first light source 405 in the output period T1, the drive signal D1(2) is supplied to the light emitting element 11S of the second light source 406 in the output period T2, and the drive signal D1(2) is supplied to the light emitting element 11U of the third light source 407 in the output period T2.

In the projector 303 of the third embodiment, the drive signal D1 output from the light source drive device 206 and the drive signal D3 output from the liquid crystal drive device 210 are synchronized with each other.

The projector 303 of the third embodiment described above has the same configuration as that of the projector 301 of the first embodiment, and thus has the same function and effect as those of the projector 301. In addition, the projector 303 of the third embodiment includes the light emitting elements 11U that output the red light R.

The dichroic mirror 110 of the projector 303 of the third embodiment transmits the blue light B and reflects the red light R. The projector 303 of the third embodiment causes the blue light B and the red light R to be incident on the dichroic mirror 110 simultaneously.

"Causing the blue light B and the red light R to be incident simultaneously" includes not only a situation in which incident times thereof are the same as each other, but also a situation in which the blue light B and the red light R are incident within the same periods of the respective output periods T1 and T2 in the display period T0 of each image.

According to the projector 303 of the third embodiment, it is possible to project an image, whose color purity of red is improved, by outputting the red light R using the output period T2 in which the blue light B is output.

In addition, the projector 303 of the third embodiment includes the light emitting elements 11S of the second light source 406 that outputs the blue light B without using the fluorescent body. According to the projector 303 of the third embodiment, of the yellow light Y and the blue light B output in time series from the light source device 10G, a light amount of the blue light B is made larger than a light amount of the yellow light Y, and the white balance of an image displayed on the screen SCR can be easily adjusted.

In the projector 303 of the third embodiment, the dichroic mirror 110 separates the light into colored light including the green light G and the yellow light Y. According to the projector 303 of the third embodiment, since an image is formed from the blue light B, the red light R, the green light G, and the yellow light Y, for example, it is possible to expand the color gamut and improve color reproducibility as compared with the case where an image is formed from three colors of RGB.

The projector 303 of the third embodiment includes the light source device 10G, the dichroic mirror 110, the first liquid crystal panel 140, the second liquid crystal panel 150, and the control device 200. The light source device 10G includes the blue light emitting elements 11S that are a plurality of light emitting elements for outputting the blue light B, the fluorescent layer 24 that performs fluorescence conversion on the blue light B output from the light emitting elements 11S of the first light source 405 to output the yellow light Y, and the red light emitting element 11U that is a light emitting element for outputting the red light R.

The light source device 10G outputs the blue light B and the red light R in time series with respect to the yellow light Y.

The dichroic mirror 110 transmits the blue light B, separates the yellow light Y, which is fluorescence, into the green light G of one color and the yellow light Y of another color having a wavelength longer than a threshold wavelength different from that of the fluorescence, transmits the green light G, and reflects the yellow light Y having a wavelength longer than the threshold wavelength. The blue light B and the green light G are incident on the first liquid crystal panel 140, and the first liquid crystal panel 140 outputs the blue image light IB and the green image light IG. The red light R and the yellow light Y having a wavelength longer than the threshold wavelength are incident on the second liquid crystal panel 150, and the second liquid crystal panel 150 outputs the red image light IR and the yellow image light IY.

The control device 200 controls the light source device 10G, the first liquid crystal panel 140, and the second liquid crystal panel 150.

In addition, the control device 200 drives the light emitting elements 11S to cause the light source device 10G to output the yellow light Y and the blue light B in time series in the output periods T1 and T2.

The control device 200 supplies the drive signal D3(1), which is a green image signal for generating the green image light IG, to the first liquid crystal panel 140 in the display period T3 synchronized with the green light G that is selected by the dichroic mirror 110 after being separated by the dichroic mirror 110.

The control device 200 supplies the drive signal D3(2), which is a black image signal for performing black display, to the first liquid crystal panel 140 in the period T11 having the same duration as the holding time T10 after the display period T3.

The control device 200 supplies the drive signal D3(3), which is a blue image signal for generating the blue image light IB, to the first liquid crystal panel 140 in the display period T4 after the period T11. The control device 200 supplies the drive signal D3(4), which is the black image signal for performing black display, to the first liquid crystal panel 140 in the period T12 having the same duration as the holding time T10 after the display period T4. The control device 200 supplies the drive signal D4(1), which is an image signal of another color for generating the yellow image light IY having a wavelength longer than the threshold wavelength, to the second liquid crystal panel 150 in the display period T3 synchronized with the yellow light Y selected by the dichroic mirror 110.

The control device 200 supplies the drive signal D4(2), which is the black image signal for performing black display, to the second liquid crystal panel 150 in the period T11 having the same duration as the holding time T10 after the display period T3.

The control device 200 supplies the drive signal D4(3), which is a red image signal for generating the red image light IR, to the second liquid crystal panel 150 in the display period T4 after the period T11.

The control device 200 supplies the drive signal D4(4), which is the black image signal for performing black display, to the second liquid crystal panel 150 in the period T12 having the same duration as the holding time T10 after the display period T4.

The display period T3 can be defined as a first period, the period T11 as a second period, the display period T4 as a third period, and the period T12 as a fourth period.

According to the projector 303 of the third embodiment, since the drive signals D3(1) to D3(4) are output to the first liquid crystal panel 140 and the drive signals D4(1) to D4(4) are output to the second liquid crystal panel 150 at the above-described timings, it is possible to improve the color gamut of four colors of blue, green, yellow having a wavelength longer than the threshold wavelength, and red, and to prevent the occurrence of color mixture.

As a first modification of the projector 303 according to the third embodiment, although not illustrated, the rotary fluorescent plate 20 similar to that of the projector 302 according to the second embodiment may be provided instead of the fluorescent body 401.

When the projector 303 of the third embodiment includes the rotary fluorescent plate 20 instead of the fluorescent body 401, the blue light B emitted from the light emitting elements 11S of the first light source 405 of the projector 303 and transmitted through the dichroic mirror 452 along the optical axis AX2 is incident on the rotary fluorescent plate 20. The front surface 22a of the substrate 22 of the rotary fluorescent plate 20 faces an incident side of the blue light B transmitted through the dichroic mirror 452. In a plane orthogonal to the optical axis AX2, the fluorescent layer 24 of the rotary fluorescent plate 20 and a radiation region of the blue light B overlap each other.

When the projector 303 of the third embodiment includes the rotary fluorescent plate 20 instead of the fluorescent body 401, the control device 200 includes the rotary fluorescent plate drive device 208. The rotary fluorescent plate drive device 208 rotates the substrate 22 in the circumferential direction about the rotation axis RX at a rotation speed suitable for cooling the fluorescent layer 24.

One or more modifications described in the first embodiment and the second embodiment can be appropriately applied to the projector 303 of the third embodiment.

Fourth Embodiment

Figure 24:
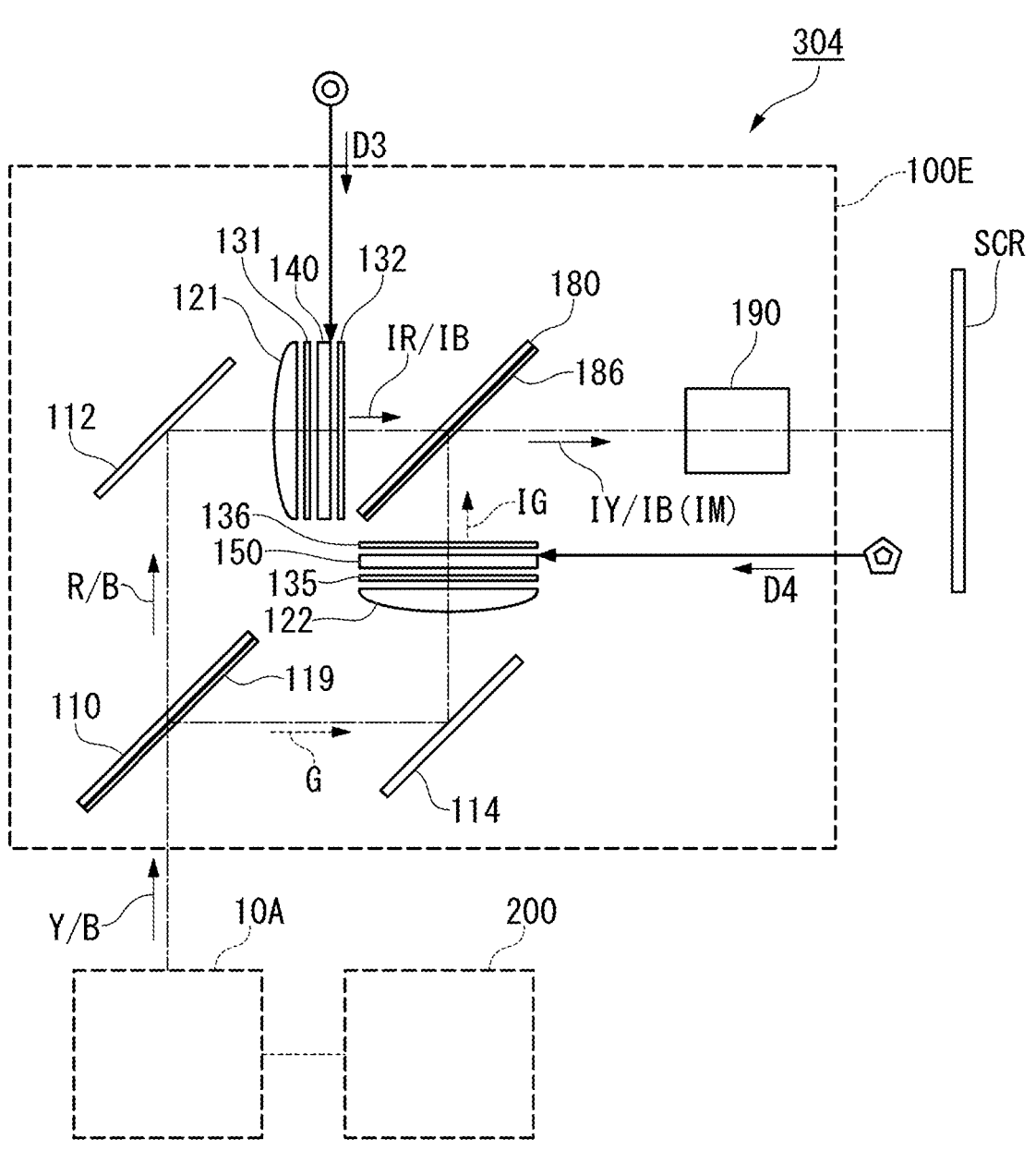
FIG. 24 is a configuration diagram of a projector according to a fourth embodiment.

Hereinafter, a fourth embodiment of the present disclosure will be described with reference to FIGS. 24 to 26.

A projector 304 of the fourth embodiment includes the light source device 10A, an image light generation device 100E, and the control device 200. FIG. 24 is a schematic diagram illustrating a configuration of the image light generation device 100E. The image light generation device 100E has the same configuration as the image light generation device 100A.

In the image light generation device 100E, the yellow light Y or the blue light B from the light source device 10A is incident on the dichroic mirror 110 in time series. As illustrated in FIG. 24, a reflection dichroic coat 119 is applied to a surface of a substrate of the dichroic mirror 110 on an incident side of the yellow light Y or the blue light B. The reflection dichroic coat 119 is implemented by, for example, a bandpass filter that reflects the green light G and transmits colored light having a wavelength shorter than that of the green light G and colored light having a wavelength longer than that of the green light G.

Of the yellow light Y or the blue light B output from the light source device 10A and incident on the dichroic mirror 110, the red light R or the blue light B transmits through the dichroic mirror 110, and the green light G is reflected by the dichroic mirror 110 in a direction different from that of the red light R or the blue light B.

That is, the yellow light Y or the blue light B output from the light source device 10A is branched into the red light R or the blue light B and the green light G by the dichroic mirror 110.

The first liquid crystal panel 140 modulates the red light R or the blue light B emitted from the condenser lens 121 and incident thereon in accordance with an image signal related to red or an image signal related to blue received from the control device 200, and generates and outputs the red image light IR or the blue image light IB. The generation of the image light IR and IB will be described in detail later.

The second liquid crystal panel 150 modulates the green light G emitted from the condenser lens 122 and incident thereon in accordance with an image signal related to green received from the outside, and generates and outputs the green image light IG. That is, in the image light generation device 100E, the second liquid crystal panel 150 operates as a dedicated liquid crystal panel for modulating the green light G of the colored light. The generation of the image light IG will be described in detail later.

The dichroic mirror 180 transmits the incident red image light IR or blue image light IB and reflects the green image light IG. A reflection dichroic coat 186 is applied to a surface of a substrate of the dichroic mirror 180 on an incident side of the green image light IG. The reflection dichroic coat 186 is implemented by, for example, a bandpass filter that reflects the green light G and transmits colored light having a wavelength shorter than that of the green light G and colored light having a wavelength longer than that of the green light G. The red image light IR or the blue image light IB emitted from the first polarizing plate 132 and the green image light IG emitted from the second polarizing plate 136 are incident on the dichroic mirror 180. The image light IR or the image light IB incident on the dichroic mirror 180 transmits through the dichroic mirror 180. The image light IG incident on the dichroic mirror 180 is reflected by the reflection dichroic coat 186 to the same optical path as the image light IR and IB.

That is, the image light IR output from the first liquid crystal panel 140 and the image light IG output from the second liquid crystal panel 150 are synthesized with each other by the dichroic mirror 180 to generate the image light IY.

Figure 25:
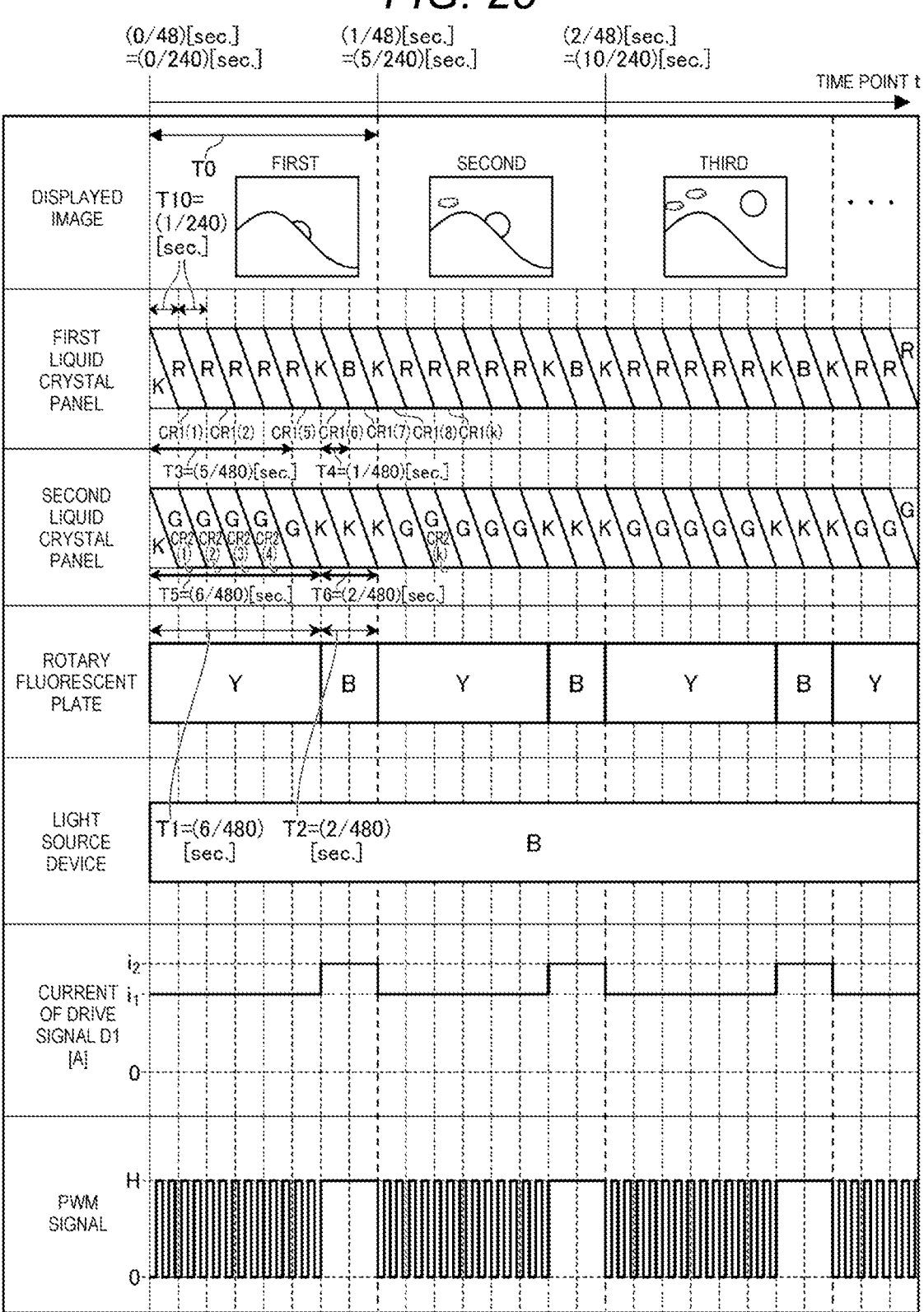
FIG. 25 is a timing chart illustrating signals used in the projector in FIG. 24, blue light and yellow light emitted from a light source device, and signals supplied to a light source.

FIG. 25 is a timing chart of the blue light B or the yellow light Y emitted from the light source device 10A, the image light IR or the image light IB output from the first liquid crystal panel 140, and the image light IG output from the second liquid crystal panel 150 in the projector 304 of the fourth embodiment.

It is assumed that the settings in the projector 304 are as follows.

Ratio between output periods T1 and T2 of yellow light Y and blue light B emitted from rotary fluorescent plate 20 . . . N1:N3=3:1

Ratio between display periods T3 and T4 of green image light IG and blue image light IB in pixels 144 of first liquid crystal panel 140 in each image . . . N3:N4=5:1

Ratio between periods T5 and T6 of yellow light Y and blue light B emitted from rotary fluorescent plate 20 . . . N5:N6=3:1

Drive frequency of first liquid crystal panel 140 and second liquid crystal panel 150 . . . N7 [Hz]=(1/N7) [sec.]=480 [Hz]

Frame frequency and frame rate of image output from projection optical system 190 . . . N8 [Hz]=(1/N8) [sec.], N8 [fps]=60 [Hz]

Light amount ratio between yellow image light IY and blue image light IB from dichroic mirror 180 based on white balance . . . N9:N10=4:1

As illustrated in FIG. 25, in the above-described various settings and conditions, the display period T0 is equal to the frame frequency and is $\frac{1}{60}$ [sec.]=$\frac{8}{480}$ [sec.].

In the display period T0 in which each image is displayed from the projector 304, the control device 200 causes the light source device 10A to output the yellow light Y in the output period T1 and causes the light source device 10A to output the blue light B in the output period T2. According to the setting of the frame frequency of the image, the drive frequency of each of the first liquid crystal panel 140 and the second liquid crystal panel 150, and the setting of the ratio between the display periods T3 and T4, T1=$\frac{6}{480}$ [sec.] and T2=$\frac{2}{480}$ [sec.].

In the display period T0 of each of the plurality of images displayed from the projector 304, the light source drive device 206 of the control device 200 outputs the drive signal D1(1) for emitting the blue light B having the predetermined light intensity I1 to the light source 11 in the output period T1={(N7/N8)/N7}×{(N3+1)/(N3+N4+2)}=$\frac{6}{480}$ [sec.].

In the output period T2={(N7/N8)/N7}×{(N4+1)/(N3+N4+2)}=$\frac{2}{480}$ [sec.] subsequent to the output period T1, the light source drive device 206 outputs the drive signal D1(2) for emitting the blue light B having the light intensity I2=I1×{(N3×N10)/(N4×N9)}=I1×(5/4) to the light source 11.

That is, the output intensity of the blue light B from the light source 11 in the output period T2 is set to 1.25 times its output intensity in the output period T1.

The yellow light Y output from the light source device 10A in the output period T1 is separated into the red light R and the green light G by the dichroic mirror 110 as described above. The separated red light R is input to the first liquid crystal panel 140, and the separated green light G is input to the second liquid crystal panel 150.

The blue light B output from the light source device 10A in the output period T2 transmits through the dichroic mirror 110 as described above, and is input to the first liquid crystal panel 140.

The optimum rotation speed ORS of the substrate 22 of the rotary fluorescent plate 20 in the light source device 10A is N8×60=60×60=3600 [rpm] based on 60 [Hz] that is the frame frequency of the image displayed on the screen SCR and 48 [Hz] that is the drive frequency of the first liquid crystal panel 140 and the second liquid crystal panel 150.

The liquid crystal drive device 210 of the control device 200 outputs the drive signal D3(1) to the first liquid crystal panel 140 in the period T5=$\frac{6}{480}$ [sec.] in synchronization with the output period T1.

The remaining pixels 144 other than the pixel 144 (1, 1) are scanned sequentially with the drive signal D3(1), and in accordance with the drive signal D3(1), the red light R incident on each pixel 144 in the display period T3={(N7/N8)/N7}×{N3/(N3+N4+2)} [sec.]=($\frac{5}{480}$) [sec.] is modulated and the image light IR is output from each pixel 144.

Subsequently, the liquid crystal drive device 210 outputs the drive signal D3(2) to the first liquid crystal panel 140.

The remaining pixels 144 other than the pixel 144 (1, 1) are scanned sequentially with the drive signal D3(2), and each pixel 144 displays black in the shortest period {(N7/N8)/N7}×{1/(N3+N4+2)} [sec.]=$\frac{1}{480}$ [sec.] according to the drive signal D3(2).

Next, the liquid crystal drive device 210 of the control device 200 outputs the drive signal D3(3) to the first liquid crystal panel 140 in the period T6=$\frac{2}{480}$ [sec.] in synchronization with the output period T2.

The remaining pixels 144 other than the pixel 144 (1, 1) are scanned sequentially with the drive signal D3(3), and in accordance with the drive signal D3(3), the blue light B incident on each pixel 144 in the display period T4 is modulated and the image light IB is output from each pixel 144.

Subsequently, the liquid crystal drive device 210 outputs the drive signal D3(4) to the first liquid crystal panel 140.

The remaining pixels 144 other than the pixel 144 (1, 1) are scanned sequentially with the drive signal D3(4), and each pixel 144 displays black in the shortest period according to the drive signal D3(4).

The liquid crystal drive device 210 of the control device 200 outputs the drive signal D4(1) to the second liquid crystal panel 150 in the period T5 in synchronization with the output period T1.

The remaining pixels 154 other than the pixel 154 (1, 1) are scanned sequentially with the drive signal D4(1), and in accordance with the drive signal D4(1), the green light G incident on each pixel 154 in the display period T3 is modulated and the image light IG is output from each pixel 154.

Subsequently, the liquid crystal drive device 210 outputs the drive signal D4(2) to the second liquid crystal panel 150.

The remaining pixels 154 other than the pixel 154 (1, 1) are sequentially scanned with the drive signal D4(2), and each pixel 154 displays black in the shortest period according to the drive signal D4(2).

Next, the liquid crystal drive device 210 outputs the drive signal D4(3) to the second liquid crystal panel 150.

The remaining pixels 154 other than the pixel 154 (1, 1) are sequentially scanned with the drive signal D4(3), and each pixel 154 displays black in the display period T4 according to the drive signal D4(3).

Subsequently, the liquid crystal drive device 210 outputs the drive signal D4(4) to the first liquid crystal panel 140.

The remaining pixels 154 other than the pixel 154 (1, 1) are sequentially scanned with the drive signal D4(4), and each pixel 154 displays black in the shortest period according to the drive signal D4(4).

As described above, the drive signal D1 (p) is output from the light source drive device 206 of the control device 200 to the light source 11. The liquid crystal drive device 210 of the control device 200 causes a timing of the drive signal D3 (p) (p=1 to 4) and a timing of the drive signal D4 (p) (p=1 to 4) to coincide with each other in the display period T0 of each image displayed from the projector 304.

The drive signals D3(1) and D3(2) are sequentially output from the liquid crystal drive device 210 to the first liquid crystal panel 140 in synchronization with the drive signal D1(1), and the drive signals D4(1) and D4(2) are sequentially input to the second liquid crystal panel 150 in synchronization with the drive signal D1(1).

The drive signals D3(3) and D3(4) are sequentially output from the liquid crystal drive device 210 to the first liquid crystal panel 140 in synchronization with the drive signal D1(2), and the drive signals D4(3) and D4(4) are sequentially input to the second liquid crystal panel 150 in synchronization with the drive signal D1(2).

As a result, the image light IY and the image light IB are output in time series from the image light generation device 100E at timings and light amounts optimized according to the various ratios and the various setting values described above, the occurrence of color mixture in the full-color image light is prevented, and the full-color image light can be observed on the screen SCR.

As illustrated in FIG. 25, in the output period T1, the PWM signal generation device 204 of the control device 200 outputs the PWM signal S1 of a high level having a duty ratio of 80% to the light source drive device 206.

That is, in the output period T1, a ratio between the light emission time and the light off time of the light source 11 is 4:1.

Subsequently, in the output period T2, the light source drive device 206 outputs the drive signal D1 for causing each of the light emitting elements 11S of the light source 11 to output the blue light B for forming the blue light beam BB having a light intensity that is $\frac{4}{5}$ times the predetermined light intensity. The current value i2 of the drive signal D1 at this time is i1×(5/4).

In order to set the current value of the drive signal D1 to i2, in the output period T2, the PWM signal generation device 204 outputs a high-level PWM signal S1 having a duty ratio of 100% to the light source drive device 206.

That is, in the output period T2, the ratio between the light emission time and the light off time of the light source 11 is 1:0.

Similarly to the projector 301 of the first embodiment, in the projector 304 of the fourth embodiment, it is preferable that the cycle T20 of the PWM signal S1 in the output period T2 is an integer fraction of the holding period T10 of the electric signal in each pixel 144 of the first liquid crystal panel 140 and the holding period T10 of the electric signal in each pixel 154 of the second liquid crystal panel 150.

By setting the cycle T20 in this manner, the occurrence of flicker in each of the yellow image light IY and the blue image light IB is favorably prevented.

The projector 304 of the fourth embodiment described above has the same configuration as that of the projector 301 of the first embodiment, and thus has the same function and effect as those of the projector 301 of the first embodiment.

In the projector 304 of the fourth embodiment, the second liquid crystal panel 150 is used as a green light-dedicated liquid crystal panel for modulating the green light G to generate the image light IG. The amount of heat generated when the green light G is incident on the liquid crystal panel and modulated is larger than the amount of heat generated when, for example, the blue light B or the red light R, which is colored light different from the green light, is incident on the liquid crystal panel and modulated.

Therefore, as in the projector 301 of the first embodiment, when the green light G and the blue light B are modulated by the common first liquid crystal panel 140, the load of management and control of cooling the first liquid crystal panel 140 may be larger than that for the second liquid crystal panel 150 that modulates only the red light R.

In such a case, according to the projector 304 of the fourth embodiment, since the red light R and the blue light B are modulated by the first liquid crystal panel 140, and the green light G generating a large amount of heat is modulated by the second liquid crystal panel 150, a balance can be obtained in the management and control of cooling of the liquid crystal panels.

As a result, the first liquid crystal panel 140 and the second liquid crystal panel 150 can be easily controlled and used for a long period of time.

Figure 26:
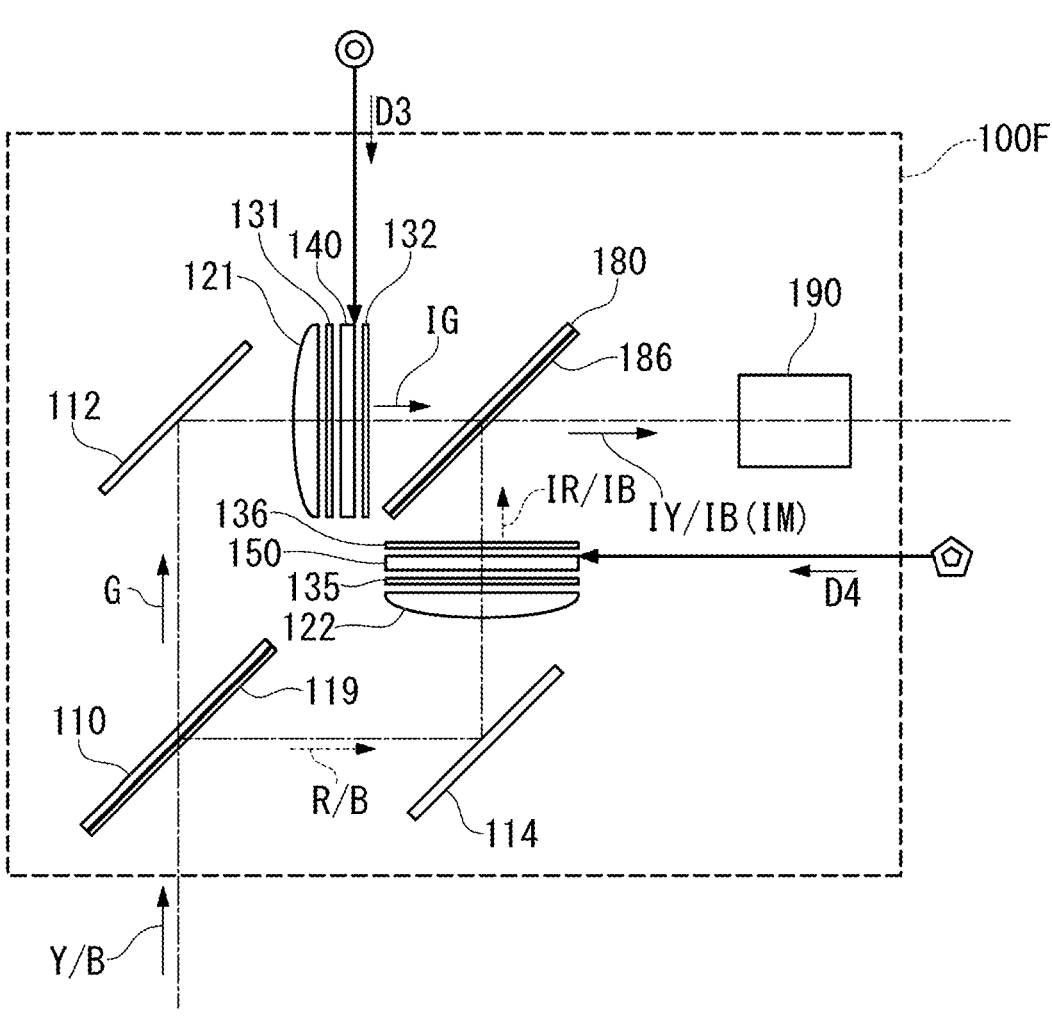
FIG. 26 is a configuration diagram of a modification of an image light generation device of the projector in FIG. 24.

FIG. 26 is a schematic diagram illustrating a configuration of an image light generation device 100F that is a modification of the image light generation device 100E. The projector 304 of the fourth embodiment may include the image light generation device 100F instead of the image light generation device 100E.

As illustrated in FIG. 26, the image light generation device 100F has the same configuration as the image light generation device 100E. The reflection dichroic coat 119 provided in the dichroic mirror 110 of the image light generation device 100E is implemented by, for example, a bandpass filter that transmits the green light G and reflects colored light having a wavelength shorter than that of the green light G and colored light having a wavelength longer than that of the green light G.

Of the yellow light Y or the blue light B output from the light source device 10A and incident on the dichroic mirror 110, the green light G transmits through the dichroic mirror 110, and the red light R or the blue light B is reflected by the dichroic mirror 110 in a direction different from that of the green light G.

The first liquid crystal panel 140 of the image light generation device 100F modulates the green light G emitted from the condenser lens 121 and incident thereon in accordance with an image signal related to green received from the control device 200, and generates and outputs the green image light IG. The generation of the image light IG by the first liquid crystal panel 140 in the image light generation device 100F is the same as the generation of the image light IG by the second liquid crystal panel 150 in the image light generation device 100E described above.

The second liquid crystal panel 150 of the image light generation device 100F modulates the red light R or the blue light B emitted from the condenser lens 122 and incident thereon according to an image signal related to red or an image signal related to blue received from the outside, and generates and outputs the red image light IR or the blue image light IB. The generation of the image lights IR and IB in the second liquid crystal panel 150 in the image light generation device 100F is the same as the generation of the image lights IR and IB in the first liquid crystal panel 140 in the image light generation device 100E described above.

The dichroic mirror 180 of the image light generation device 100F transmits the incident green image light IG and reflects the red image light IR or the blue image light IB. The reflection dichroic coat 186 of the dichroic mirror 180 is implemented by, for example, a bandpass filter that transmits the green light G and reflects colored light having a wavelength shorter than that of the green light G and colored light having a wavelength longer than that of the green light G. The image light IG incident on the dichroic mirror 180 transmits through the dichroic mirror 180. The image light IR or the image light IB incident on the dichroic mirror 180 is reflected by the reflection dichroic coat 186 to the same optical path as the image light IG.

That is, the image light IG output from the first liquid crystal panel 140 and the image light IR output from the second liquid crystal panel 150 are synthesized with each other by the dichroic mirror 180 to generate the image light IY.

The projector including the image light generation device 100F instead of the image light generation device 100E has the same function and effect as those of the projector 304 of the fourth embodiment.

The projector 304 of the fourth embodiment may include the light source device 10D described in the second embodiment instead of the light source device 10A.

By providing the light source device 10D instead of the light source device 10A, in the projector 304 of the fourth embodiment, for example, the number of the light emitting elements 11S in the second region 412 is set to {(N3×N10)/(N4×N9)} times, that is, (5/4) times the number of the light emitting elements 11S in the first region 411, so that the light amount ratio N9:N10 of the yellow image light IY and the blue image light IB from the dichroic mirror 180 based on the white balance can be optimized. For example, the ratio can be set to 4:1.

One or more modifications described in the first to third embodiments can be appropriately applied to the projector 304 of the fourth embodiment.

In addition, in order to set a ratio between the fluorescence and the blue light at 4:1 in which white light with high color purity is obtained, a time ratio is used for the implementation, but when the ratio is not an accurate ratio, an adjustment method may be used.

For example, the adjustment can be made by controlling a transmittance of a liquid crystal panel. Alternatively, the adjustment can be made by controlling a light emission amount by controlling the number of elements emitting light among the blue light emitting elements and a current value.

Other Embodiments

Hereinafter, another embodiment according to the present disclosure will be described with reference to FIGS. 27 and 28.

Figure 27:
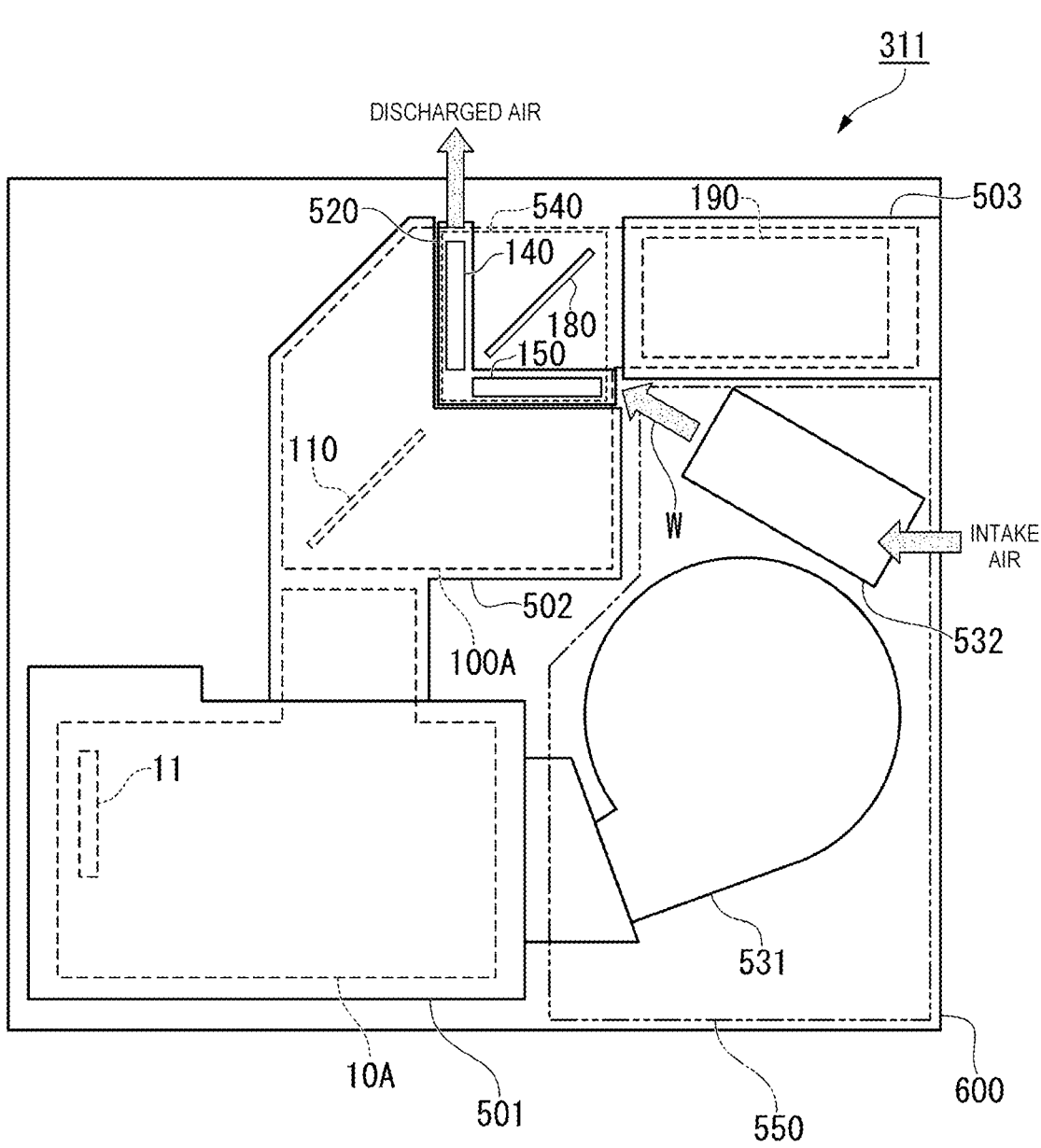
FIG. 27 is a configuration diagram of a projector according to another embodiment.

FIG. 27 is a diagram illustrating a configuration of a projector 311 according to an embodiment of the present disclosure. The light source device, the image light generation device, and the control device according to the first to fourth embodiments are provided. As illustrated in FIG. 27, the projector 311 includes housings 501, 502, and 503 accommodated in an exterior body 600, a panel unit 540, a duct 520, and cooling fans 531 and 532.

Hereinafter, it is assumed that the projector 311 includes the light source device 10A of the projector 301 of the first embodiment, the image light generation device 100A, and the control device 200.

The housing 501 is a light source housing. In the housing 502, at least the light source 11 of the light source device 10A is accommodated. For example, the light source 11, the afocal optical system 12, the homogenizer optical system 14, the condensing optical system 18, and the rotary fluorescent plate 20 of the light source device 10A, electronic components for controlling each of these components, and members for supporting the components are accommodated. The housing 502 is a light guide housing, and is coupled to the housing 501 along an optical path of the blue light B or the yellow light Y. In the housing 502, at least the dichroic mirror 110 of the image light generation device 100A is accommodated. For example, the collimating optical system 40, the first lens array 51, the second lens array 52, the polarization conversion element 60, and the superimposing lens 70 of the light source device 10A, and the dichroic mirror 110 and the reflecting mirrors 112 and 114 of the image light generation device 100A are accommodated.

The condenser lenses 121 and 122, the first polarizing plates 131 and 132, and the second polarizing plates 135 and 136, which are not illustrated in FIG. 27, and the first liquid crystal panel 140, the second liquid crystal panel 150, and the dichroic mirror 180, which are illustrated in FIG. 27, are disposed outside the housing 502 inside the exterior body 600. In FIG. 27, a part of the components of the image light generation device 100A, the components of the light source device 10A, and the control device 200 are omitted.

In the projector 311, the first liquid crystal panel 140 and the second liquid crystal panel 150 constitute the panel unit 540 fixed to the dichroic mirror 180. The housing 503 is a projection housing. In the housing 503, the projection optical system 190 is accommodated in such an arrangement that the emission of the image light IB and IY to the outside of the exterior body 600 is not interfered.

The duct 520 is disposed between the housing 502 and the dichroic mirror 180, and passes by the first liquid crystal panel 140 and the second liquid crystal panel 150. The cooling fan 531 blows air into the housing 501. The cooling fan 531 is a sirocco fan, for example. The cooling fan 532 takes in air from the outside of the exterior body 600 and blows the air to the duct 520. The cooling fan 532 is, for example, a thin POP type fan. The cold air W blown to the duct 520 is subjected to heat exchange with the first liquid crystal panel 140 and the second liquid crystal panel 150 in a process of cooling the first liquid crystal panel 140 and the second liquid crystal panel 150, and then is discharged to the outside of the exterior body 600 through the duct 520.

In the projector 311 described above, the light source device 10A includes the housing 501 that is a light source housing. The projector 311 includes the housing 502 that is coupled to the housing 501 and that includes the dichroic mirror 110 that is a wavelength selection element. In the projector 311 described above, the first liquid crystal panel 140 and the second liquid crystal panel 150 constitute the panel unit 540 fixed to the dichroic mirror 180 that is an optical element for outputting the image light IY and IB to a common optical path. The projection optical system 190 includes the housing 503. In the projector 311 described above, the duct 520 passing by the first liquid crystal panel 140 and the second liquid crystal panel 150 is disposed between the housing 502 and the dichroic mirror 180. The cooling fan 532, which is a fan, blows air to the duct 520 to cool the first liquid crystal panel 140 and the second liquid crystal panel 150. According to the projector 311, it is possible to efficiently cool the first liquid crystal panel 140 and the second liquid crystal panel 150 that generate a larger amount of heat than other components.

In addition, in the projector 311 described above, the cooling fans 531 and 532, which are fans, are disposed in a region 550 partitioned by the housings 501, 502, and 503 inside the exterior body 600. This makes it possible to reduce a size of the projector 311.

Figure 28:
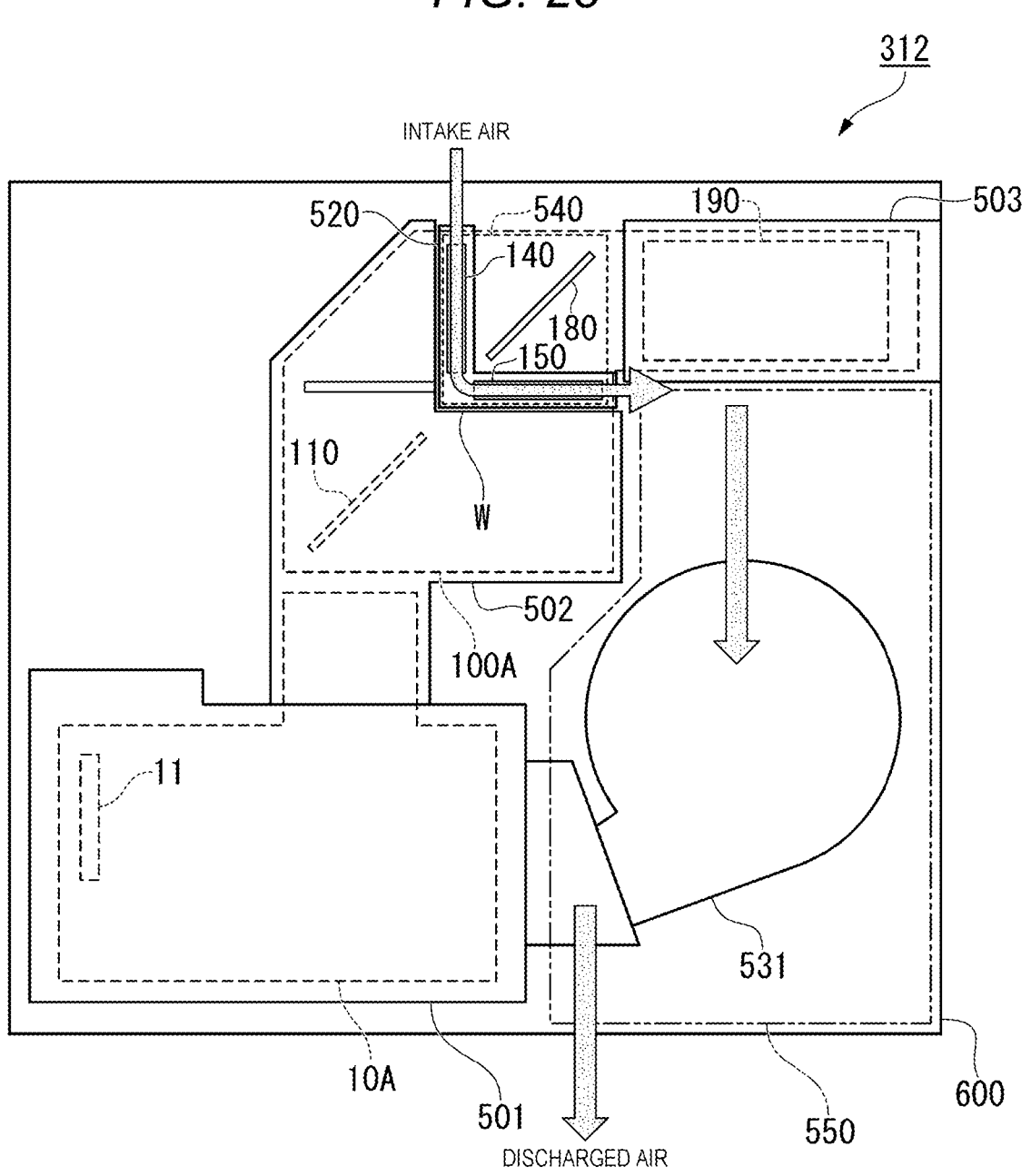
FIG. 28 is a configuration diagram of a projector according to another embodiment.

FIG. 28 is a schematic diagram illustrating a configuration of a projector 312 that is a modification of the projector 311 described above. As illustrated in FIG. 28, the projector 312 is configured similarly to the projector 311. In the projector 312, the cooling fan 532 of the projector 311 is omitted, and the cooling fan 531 communicates with the duct 520 and also serves as the cooling fan 532.

That is, in the projector 312, the outside air is taken into the duct 520 as the cold air W from the outside of the exterior body 600 via an intake port of the duct 520 on a side of a liquid crystal panel closer to the outside of the exterior body 600, that is, on the side of the first liquid crystal panel 140.

The cold air W subjected to heat exchange with the first liquid crystal panel 140 and the second liquid crystal panel 150 in the process of cooling the first liquid crystal panel 140 and the second liquid crystal panel 150 is taken into the cooling fan 531 and is discharged from the cooling fan 531 to the outside of the exterior body 600.

According to the projector 312, since the cooling fan 531 communicating with the duct 520 also blows air to the housing 501, it is possible to efficiently cool the light source 11 of the light source device 10A and to reduce the size of the entire device.

As described above, the projectors 311 and 312 may be any one of the projectors described in the second to fourth embodiments.

Although the preferred embodiments of the present disclosure have been described in detail above, the present disclosure is not limited to the specific embodiments, and various modifications and changes can be made within the scope of the present disclosures.

The light source device according to an aspect of the present disclosure may have the following configuration.

A projector according to an aspect of the present disclosure includes: a light source device including a plurality of light emitting elements configured to output blue light and a wavelength conversion element configured to perform fluorescence conversion on the blue light output by the light emitting elements to output fluorescence, and configured to output the blue light and the fluorescence in time series; a wavelength selection element configured to transmit or reflect the blue light, separate the fluorescence into different colored light, transmit light of one color of the different colored light, and reflect the other colored light; a first liquid crystal panel configured to receive the blue light and the light of one color and output blue image light and image light of one color; a second liquid crystal panel configured to receive the other colored light and output image light of another color; an optical element configured to output the blue image light, the image light of the one color, and the image light of the other color to a common optical path; and a projection optical system configured to project the blue image light, the image light of the one color, and the image light of the other color emitted from the optical element.

In the projector according to one aspect of the present disclosure, the wavelength conversion element may include a rotary plate, and the rotary plate may include a fluorescence output region in which a fluorescent body is provided.

In the projector according to one aspect of the present disclosure, the rotary plate may include a blue light output region configured to output the blue light from the light emitting element, and may output the blue light and the fluorescence in time series by rotation.

In the projector according to one aspect of the present disclosure, the light emitting element may include a light emitting element configured to output the blue light without using the rotary plate.

In the projector according to one aspect of the present disclosure, the wavelength conversion element may be a fluorescent body that does not move over time, and the plurality of light emitting elements may include a light emitting element configured to output the blue light without using the fluorescent body.

In the projector according to one aspect of the present disclosure, the light emitting elements may include a light emitting element configured to output red light, and the wavelength selection element may transmit the blue light and reflect the red light, or reflect the blue light and transmit the red light, and the blue light and the red light may be incident on the wavelength selection element simultaneously.

In the projector according to one aspect of the present disclosure, the wavelength selection element may separate light into colored light including green light and yellow light.

In the projector according to one aspect of the present disclosure, the light source device may include a light source housing, a light guide housing coupled to the light source housing and including the wavelength selection element may be provided, the first liquid crystal panel and the second liquid crystal panel may constitute a panel unit fixed to the optical element configured to output image light to a common optical path, the projection optical system may include a projection housing, a duct passing by the first liquid crystal panel and the second liquid crystal panel may be disposed between the light guide housing and the optical element, and a fan configured to blow air to the duct may be provided.

In the projector according to one aspect of the present disclosure, the fan may be disposed in a region partitioned by the light source housing, the light guide housing, and the projection housing.

In the projector according to one aspect of the present disclosure, the fan may blow air into the light source housing.

A projector according to an aspect of the present disclosure includes: a light source device including a plurality of light emitting elements configured to output blue light and a wavelength conversion element configured to perform fluorescence conversion on the blue light output by the light emitting elements to output fluorescence, and configured to output the blue light and the fluorescence in time series; a wavelength selection element configured to transmit or reflect the blue light, separate the fluorescence into green light and other colored light, transmit light of one color, and reflect other colored light; a first liquid crystal panel configured to receive the blue light and the green light and output blue image light and green image light; a second liquid crystal panel configured to receive the other colored light and output image light of another color; and a control device configured to control the light source device, the first liquid crystal panel, and the second liquid crystal panel. The control device drives the light emitting elements to output the blue light and the fluorescence from the light source device, supplies a green image signal to the first liquid crystal panel in a first period synchronized with the green light selected by the wavelength selection element, supplies a black image signal to the first liquid crystal panel in a second period after the first period, supplies a blue image signal to the first liquid crystal panel in a third period synchronized with the blue light after the second period, supplies a black image signal to the first liquid crystal panel in a fourth period after the third period, supplies an image signal for another color to the second liquid crystal panel in the first period synchronized with the other colored light selected by the wavelength selection element, and supplies a black image signal to the second liquid crystal panel from the second period after the first period to the fourth period.

A projector according to an aspect of the present disclosure includes: a light source device including a plurality of blue light emitting elements configured to output blue light, a wavelength conversion element configured to perform fluorescence conversion on the blue light output by the blue light emitting elements to output fluorescence, and a red light emitting element configured to output red light, and configured to output the blue light and the red light in time series with respect to the fluorescence; a wavelength selection element configured to transmit or reflect the blue light, separate the fluorescence into green light and other colored light and transmit light of one color, and reflect other colored light; a first liquid crystal panel configured to receive the blue light and the green light, and output blue image light and green image light; a second liquid crystal panel configured to receive the red light and the other colored light, and output red image light and image light of another color; and a control device configured to control the light source device, the first liquid crystal panel and the second liquid crystal panel. The control device drives the blue light emitting element to output the fluorescence and the blue light from the light source device, supplies a green image signal to the first liquid crystal panel in a first period synchronized with the green light selected by the wavelength selection element, supplies a black image signal to the first liquid crystal panel in a second period after the first period, supplies a blue image signal to the first liquid crystal panel in a third period synchronized with the blue light after the second period, supplies a black image signal to the first liquid crystal panel in a fourth period after the third period, supplies an image signal of the other color to the second liquid crystal panel in the first period synchronized with the other colored light selected by the wavelength selection element, supplies a black image signal to the second liquid crystal panel in the second period after the first period, supplies a red image signal to the second liquid crystal panel in the third period synchronized with the red light after the second period, and supplies a black image signal to the second liquid crystal panel in the fourth period after the third period.

What is claimed is:

1. A projector comprising:
a light source device including a plurality of light emitting elements configured to output blue light and a wavelength conversion element configured to perform fluorescence conversion on the blue light output by the light emitting elements to output fluorescence, and configured to output the blue light and the fluorescence in time series;
a wavelength selection element configured to transmit or reflect the blue light, separate the fluorescence into different colored light, transmit light of one color of the different colored light, and reflect the other colored light;
a first liquid crystal panel configured to receive the blue light and the light of one color and output blue image light and image light of one color;

a second liquid crystal panel configured to receive the other colored light and output image light of another color;

an optical element configured to output the blue image light, the image light of the one color, and the image light of the other color to a common optical path;

a projection optical system configured to project the blue image light, the image light of the one color, and the image light of the other color emitted from the optical element; and a control device configured to control the light source device, the first liquid crystal panel, and the second liquid crystal panel, wherein the control device drives the light emitting elements to output the blue light and the fluorescence from the light source device, supplies a green image signal to the first liquid crystal panel in a first period synchronized with the green light selected by the wavelength selection element, and supplies a black image signal to the first liquid crystal panel in a second period after the first period.

2. The projector according to claim 1, wherein the wavelength conversion element includes a rotary plate, and the rotary plate includes a fluorescence output region in which a fluorescent body is provided.

3. The projector according to claim 2, wherein the rotary plate includes a blue light output region configured to output the blue light from the light emitting elements, and outputs the blue light and the fluorescence in time series by rotation.

4. The projector according to claim 2, wherein the plurality of light emitting elements include a light emitting element configured to output the blue light without using the rotary plate.

5. The projector according to claim 1, wherein the wavelength conversion element is a fluorescent body that does not move over time, and the plurality of light emitting elements include a light emitting element configured to output the blue light without using the fluorescent body.

6. The projector according to claim 5, wherein the light emitting elements include a light emitting element configured to output red light, the wavelength selection element transmits the blue light and reflects the red light, or reflects the blue light and transmits the red light, and the blue light and the red light are incident on the wavelength selection element simultaneously.

7. The projector according to claim 6, wherein the wavelength selection element separates light into colored light including green light and yellow light.

8. The projector according to claim 1, wherein the light source device includes a light source housing, a light guide housing coupled to the light source housing and including the wavelength selection element is provided, the first liquid crystal panel and the second liquid crystal panel constitute a panel unit fixed to the optical element configured to output image light to a common optical path, the projection optical system includes a projection housing, a duct passing by the first liquid crystal panel and the second liquid crystal panel is disposed between the light guide housing and the optical element, and a fan configured to blow air to the duct is provided.

9. The projector according to claim 8, wherein the fan is disposed in a region partitioned by the light source housing, the light guide housing, and the projection housing.

10. The projector according to claim 9, wherein the fan blows air into the light source housing.

11. A projector comprising:

a light source device including a plurality of light emitting elements configured to output blue light and a wavelength conversion element configured to perform fluorescence conversion on the blue light output by the light emitting elements to output fluorescence, and configured to output the blue light and the fluorescence in time series;

a wavelength selection element configured to transmit or reflect the blue light, separate the fluorescence into green light and other colored light, transmit light of one color, and reflect other colored light;

a first liquid crystal panel configured to receive the blue light and the green light and output blue image light and green image light;

a second liquid crystal panel configured to receive the other colored light and output image light of another color; and a control device configured to control the light source device, the first liquid crystal panel, and the second liquid crystal panel, wherein the control device drives the light emitting elements to output the blue light and the fluorescence from the light source device, supplies a green image signal to the first liquid crystal panel in a first period synchronized with the green light selected by the wavelength selection element, supplies a black image signal to the first liquid crystal panel in a second period after the first period, supplies a blue image signal to the first liquid crystal panel in a third period synchronized with the blue light after the second period, supplies a black image signal to the first liquid crystal panel in a fourth period after the third period, supplies an image signal of another color to the second liquid crystal panel in the first period synchronized with the other colored light selected by the wavelength selection element, and supplies a black image signal to the second liquid crystal panel from the second period after the first period to the fourth period.

12. The projector according to claim 11, wherein the wavelength conversion element includes a rotary plate, and the rotary plate includes a fluorescence output region in which a fluorescent body is provided.

13. The projector according to claim 12, wherein the rotary plate includes a blue light output region configured to output the blue light from the light emitting elements, and outputs the blue light and the fluorescence in time series by rotation.

14. The projector according to claim 12, wherein the light emitting elements include a light emitting element configured to output the blue light without using the rotary plate.

15. The projector according to claim 11, wherein
the wavelength conversion element is a fluorescent body
that does not move over time, and
the plurality of light emitting elements include a light
emitting element configured to output the blue light
without using the fluorescent body.

16. The projector according to claim 15, wherein
the plurality of light emitting elements include a light
emitting element configured to output red light,
the wavelength selection element transmits the blue light
and reflects the red light, or reflects the blue light and
transmits the red light, and
the blue light and the red light are incident on the
wavelength selection element simultaneously.

17. The projector according to claim 16, wherein
the wavelength selection element separates light into
colored light including green light and yellow light.

18. A projector comprising:
a light source device including a plurality of blue light
emitting elements configured to output blue light, a
wavelength conversion element configured to perform
fluorescence conversion on the blue light output by the
blue light emitting elements to output fluorescence, and
a red light emitting element configured to output red
light, and configured to output the blue light and the red
light in time series with respect to the fluorescence;
a wavelength selection element configured to transmit or
reflect the blue light, separate the fluorescence into
green light and other colored light and transmit light of
one color, and reflect other colored light;
a first liquid crystal panel configured to receive the blue
light and the green light, and output blue image light
and green image light;
a second liquid crystal panel configured to receive the red
light and the other colored light, and output red image
light and image light of another color; and
a control device configured to control the light source
device, the first liquid crystal panel and the second
liquid crystal panel, wherein the control device
drives the blue light emitting elements to output the
fluorescence and the blue light from the light source
device,
supplies a green image signal to the first liquid crystal
panel in a first period synchronized with the green
light selected by the wavelength selection element,
supplies a black image signal to the first liquid crystal
panel in a second period after the first period,
supplies a blue image signal to the first liquid crystal
panel in a third period synchronized with the blue
light after the second period,
supplies a black image signal to the first liquid crystal
panel in a fourth period after the third period,
supplies an image signal of another color to the second
liquid crystal panel in the first period synchronized
with the other colored light selected by the wave-
length selection element,
supplies a black image signal to the second liquid
crystal panel in the second period after the first
period,
supplies a red image signal to the second liquid crystal
panel in the third period synchronized with the red
light after the second period, and
supplies a black image signal to the second liquid
crystal panel in the fourth period after the third
period.

19. The projector according to claim 18, wherein
the wavelength conversion element includes a rotary
plate, and
the rotary plate includes a fluorescence output region in
which a fluorescent body is provided.

20. The projector according to claim 19, wherein
the rotary plate includes a blue light output region con-
figured to output the blue light from the light emitting
elements, and outputs the blue light and the fluores-
cence in time series by rotation.

* * * * *